(12) United States Patent
Kent et al.

(10) Patent No.: US 12,496,331 B2
(45) Date of Patent: Dec. 16, 2025

(54) COMBINATION THERAPIES OF PREDNISONE AND URICASE MOLECULES AND USES THEREOF

(71) Applicant: Horizon Therapeutics USA, Inc., Lake Forest, IL (US)

(72) Inventors: Jeffrey D. Kent, Deerfield, IL (US); Brian Lamoreaux, Lake Forest, IL (US)

(73) Assignee: Horizon Therapeutics USA, Inc., Deerfield, IL (US)

( * ) Notice: Subject to any disclaimer, the term of this patent is extended or adjusted under 35 U.S.C. 154(b) by 1252 days.

(21) Appl. No.: 16/347,900

(22) PCT Filed: Nov. 10, 2017

(86) PCT No.: PCT/US2017/061126
§ 371 (c)(1),
(2) Date: May 7, 2019

(87) PCT Pub. No.: WO2018/089808
PCT Pub. Date: May 17, 2018

(65) Prior Publication Data
US 2023/0085022 A1 Mar. 16, 2023

Related U.S. Application Data

(60) Provisional application No. 62/421,079, filed on Nov. 11, 2016.

(51) Int. Cl.
| | | |
|---|---|---|
| *A61K 38/44* | (2006.01) | |
| *A61K 9/00* | (2006.01) | |
| *A61K 31/381* | (2006.01) | |
| *A61K 31/519* | (2006.01) | |
| *A61K 31/573* | (2006.01) | |
| *A61P 37/00* | (2006.01) | |

(52) U.S. Cl.
CPC .......... *A61K 38/443* (2013.01); *A61K 9/0019* (2013.01); *A61K 31/381* (2013.01); *A61K 31/519* (2013.01); *A61K 31/573* (2013.01); *A61P 37/00* (2018.01); *C12Y 107/03003* (2013.01)

(58) Field of Classification Search
None
See application file for complete search history.

(56) References Cited

U.S. PATENT DOCUMENTS

| | | |
|---|---|---|
| 1,141,973 A | 6/1915 | Nichols |
| 3,451,996 A | 6/1969 | Sumyk et al. |
| 3,613,231 A | 10/1971 | Pugh et al. |
| 3,616,231 A | 10/1971 | Bergmeyer et al. |
| 3,931,399 A | 1/1976 | Bohn et al. |
| 4,027,676 A | 6/1977 | Mattei |
| 4,064,010 A | 12/1977 | Harris et al. |
| 4,141,973 A | 2/1979 | Balazs |
| 4,169,764 A | 10/1979 | Takezawa et al. |
| 4,179,337 A | 12/1979 | Davis et al. |
| 4,251,431 A | 2/1981 | Carswell et al. |
| 4,297,344 A | 10/1981 | Schwinn et al. |
| 4,301,153 A | 11/1981 | Rosenberg |
| 4,312,979 A | 1/1982 | Takemoto et al. |
| 4,315,852 A | 2/1982 | Leibowitz et al. |
| 4,317,878 A | 3/1982 | Nakanishi et al. |
| 4,343,735 A | 8/1982 | Menge et al. |
| 4,343,736 A | 8/1982 | Uemura et al. |
| 4,376,110 A | 3/1983 | David et al. |
| 4,421,650 A | 12/1983 | Nagasawa et al. |
| 4,425,431 A | 1/1984 | Takemoto et al. |
| 4,445,745 A | 5/1984 | Cartesse |
| 4,450,103 A | 5/1984 | Konrad et al. |
| 4,460,575 A | 7/1984 | D'Hinterland et al. |
| 4,460,683 A | 7/1984 | Gloger et al. |
| 4,485,176 A | 11/1984 | Bollin, Jr. et al. |
| 4,753,796 A | 6/1988 | Moreno et al. |
| 4,766,106 A | 8/1988 | Katre et al. |
| 4,797,474 A | 1/1989 | Patroni et al. |
| 4,816,567 A | 3/1989 | Cabilly et al. |
| 4,847,079 A | 7/1989 | Kwan |
| 4,847,325 A | 7/1989 | Shadle et al. |
| 4,917,888 A | 4/1990 | Katre et al. |
| 4,945,086 A | 7/1990 | Benitz et al. |
| 4,946,778 A | 8/1990 | Ladner et al. |
| 4,966,963 A | 10/1990 | Patroni |

(Continued)

FOREIGN PATENT DOCUMENTS

| | | |
|---|---|---|
| AU | 5251599 A | 2/2000 |
| CA | 2193993 A1 | 1/1996 |

(Continued)

OTHER PUBLICATIONS

Abstract Review: "Management of Gout AfterPegloticase; Observations of US Clinical Practice from Trio Health and the American Rheumatology Network (ARN)," ACR Convergence, 2020, Abstract ID: 903234, 9 pages.

Abstract Review: "Management of Gout withPegloticase; Real-World Utilization and Outcomes from Trio Health and the American Rheumatology Network (ARN)," ACR Convergence, 2020, Abstract ID: 903292, 11 pages.

Bessen et al., "Recapture and improved outcome of pegloticase response with methotrexate—A report of two cases and review of the literature," Seminars in Arthritis and Rheumatism, Accepted Manuscript, (2018), 12 pages.

(Continued)

*Primary Examiner* — Nghi V Nguyen
(74) *Attorney, Agent, or Firm* — David Roadcap

(57) ABSTRACT

Described herein are methods for reducing an antibody response to uricase therapy, improving the treatment of gout, reducing uric acid levels, and preventing and/or delaying infusion reactions. The methods may include administration of a uricase and a steroid as described herein.

7 Claims, 3 Drawing Sheets
Specification includes a Sequence Listing.

(56) References Cited

U.S. PATENT DOCUMENTS

| | | |
|---|---|---|
| 4,987,076 A | 1/1991 | Takashio et al. |
| 4,992,531 A | 2/1991 | Patroni et al. |
| 5,008,377 A | 4/1991 | Patroni et al. |
| 5,010,183 A | 4/1991 | Macfarlane |
| 5,114,916 A | 5/1992 | Shirahata et al. |
| 5,122,614 A | 6/1992 | Zalipsky |
| 5,225,539 A | 7/1993 | Winter |
| 5,283,317 A | 2/1994 | Saifer et al. |
| 5,286,637 A | 2/1994 | Veronese et al. |
| 5,362,641 A | 11/1994 | Fuks et al. |
| 5,382,518 A | 1/1995 | Caput et al. |
| 5,428,128 A | 6/1995 | Mensi-Fattohi et al. |
| 5,458,135 A | 10/1995 | Patton et al. |
| 5,468,478 A | 11/1995 | Saifer et al. |
| 5,529,915 A | 6/1996 | Phillips et al. |
| 5,541,098 A | 7/1996 | Caput et al. |
| 5,567,422 A | 10/1996 | Greenwald |
| 5,585,089 A | 12/1996 | Queen et al. |
| 5,612,460 A | 3/1997 | Zalipsky |
| 5,624,903 A | 4/1997 | Muller et al. |
| 5,633,227 A | 5/1997 | Muller et al. |
| 5,637,749 A | 6/1997 | Greenwald |
| 5,643,575 A | 7/1997 | Martinez et al. |
| 5,653,974 A | 8/1997 | Hung et al. |
| 5,711,944 A | 1/1998 | Gilbert et al. |
| 5,762,923 A | 6/1998 | Gross et al. |
| 5,766,897 A | 6/1998 | Braxton |
| 5,811,096 A | 9/1998 | Aleman et al. |
| 5,816,397 A | 10/1998 | Pratt |
| 5,824,784 A | 10/1998 | Kinstler et al. |
| 5,880,255 A | 3/1999 | Delgado et al. |
| 5,919,455 A | 7/1999 | Greenwald et al. |
| 5,929,231 A | 7/1999 | Malkki et al. |
| 5,932,462 A | 8/1999 | Harris et al. |
| 5,948,668 A | 9/1999 | Hartman et al. |
| 5,955,336 A | 9/1999 | Shigyo et al. |
| 6,006,753 A | 12/1999 | Efendic |
| 6,130,318 A | 10/2000 | Wild et al. |
| 6,201,110 B1 | 3/2001 | Olsen et al. |
| 6,211,341 B1 | 4/2001 | Zeelon et al. |
| 6,245,901 B1 | 6/2001 | Von et al. |
| 6,468,210 B2 | 10/2002 | Iliff |
| 6,475,143 B2 | 11/2002 | Iliff |
| 6,524,241 B2 | 2/2003 | Iliff |
| 6,527,713 B2 | 3/2003 | Iliff |
| 6,569,093 B2 | 5/2003 | Iliff |
| 6,575,235 B2 | 6/2003 | Zupanick et al. |
| 6,576,235 B1 | 6/2003 | Williams et al. |
| 6,608,892 B2 | 8/2003 | Shaffer et al. |
| 6,783,965 B1 | 8/2004 | Sherman et al. |
| 6,913,915 B2 | 7/2005 | Ensor et al. |
| 7,056,713 B1 | 6/2006 | Hershfield et al. |
| 7,723,089 B2 | 5/2010 | Williams et al. |
| 7,811,800 B2 | 10/2010 | Hartman et al. |
| 7,927,589 B2 | 4/2011 | Williams et al. |
| 7,927,852 B2 | 4/2011 | Sherman et al. |
| 7,964,381 B2 | 6/2011 | Hartman et al. |
| 8,034,594 B2 | 10/2011 | Hartman et al. |
| 8,067,553 B2 | 11/2011 | Williams et al. |
| 8,148,123 B2 | 4/2012 | Hartman et al. |
| 8,178,334 B2 | 5/2012 | Hartman et al. |
| 8,188,224 B2 | 5/2012 | Hartman et al. |
| 8,293,228 B2 | 10/2012 | Hartman et al. |
| 8,465,735 B2 | 6/2013 | Hartman et al. |
| 8,541,205 B2 | 9/2013 | Hartman et al. |
| 8,618,267 B2 | 12/2013 | Williams et al. |
| 8,913,915 B2 | 12/2014 | Makino |
| 8,921,064 B2 | 12/2014 | Sherman et al. |
| 9,017,980 B2 | 4/2015 | Hartman et al. |
| 9,377,454 B2 | 6/2016 | Rosario-Jansen et al. |
| 9,402,827 B2 | 8/2016 | Miner et al. |
| 9,534,013 B2 | 1/2017 | Fischer et al. |
| 9,670,467 B2 | 6/2017 | Hartman et al. |
| 9,885,024 B2 | 2/2018 | Williams et al. |
| 9,926,537 B2 | 3/2018 | Hartman et al. |
| 9,926,538 B2 | 3/2018 | Hartman et al. |
| 10,139,399 B2 | 11/2018 | Rosario-Jansen et al. |
| 10,160,958 B2 | 12/2018 | Hartman et al. |
| 10,731,139 B2 | 8/2020 | Hartman et al. |
| 10,823,727 B2 | 11/2020 | Rosario-Jansen et al. |
| 11,345,899 B2 | 5/2022 | Hartman et al. |
| 11,598,767 B2 | 3/2023 | Rosario-Jansen et al. |
| 11,639,927 B2 | 5/2023 | Rosario-Jansen et al. |
| 11,781,119 B2 | 10/2023 | Hartman et al. |
| 2002/0010319 A1 | 1/2002 | Ansaldi et al. |
| 2002/0151703 A1 | 10/2002 | Yokoyama et al. |
| 2003/0082786 A1 | 5/2003 | Ensor et al. |
| 2003/0166249 A1 | 9/2003 | Williams et al. |
| 2005/0014240 A1 | 1/2005 | Sherman et al. |
| 2005/0084478 A1 | 4/2005 | Liu et al. |
| 2006/0188971 A1 | 8/2006 | Hershfield et al. |
| 2007/0274977 A1 | 11/2007 | Hartman et al. |
| 2008/0031864 A1 | 2/2008 | Williams et al. |
| 2008/0057048 A1 | 3/2008 | Sherman et al. |
| 2008/0145876 A1 | 6/2008 | Armstrong et al. |
| 2008/0159976 A1 | 7/2008 | Hartman et al. |
| 2009/0023715 A1 | 1/2009 | Brown et al. |
| 2009/0169534 A1 | 7/2009 | Hartman et al. |
| 2009/0209021 A1 | 8/2009 | Hartman et al. |
| 2009/0317889 A1 | 12/2009 | Fischer et al. |
| 2010/0152305 A1 | 6/2010 | Cedarbaum |
| 2010/0160351 A1* | 6/2010 | Jenkins ............... A61K 31/519 |
| | | 514/262.1 |
| 2010/0323422 A1 | 12/2010 | Williams et al. |
| 2010/0323423 A1 | 12/2010 | Williams et al. |
| 2011/0104751 A1 | 5/2011 | Hartman et al. |
| 2011/0217755 A1 | 9/2011 | Hartman et al. |
| 2011/0287466 A1 | 11/2011 | Sherman et al. |
| 2012/0070876 A1 | 3/2012 | Hartman et al. |
| 2012/0149083 A1 | 6/2012 | Williams et al. |
| 2012/0225046 A1 | 9/2012 | Hartman et al. |
| 2012/0301454 A1 | 11/2012 | Rosario-Jansen et al. |
| 2012/0309085 A1 | 12/2012 | Hartman et al. |
| 2013/0052677 A1 | 2/2013 | Williams et al. |
| 2013/0084273 A1 | 4/2013 | Hartman et al. |
| 2013/0330803 A1 | 12/2013 | Hartman et al. |
| 2014/0363414 A1 | 12/2014 | Sherman et al. |
| 2015/0197732 A1* | 7/2015 | Hartman ............... A61P 13/12 |
| | | 424/94.4 |
| 2016/0035091 A1 | 2/2016 | Kubassova |
| 2016/0158318 A1 | 6/2016 | Cohen et al. |
| 2016/0160188 A1 | 6/2016 | Williams et al. |
| 2016/0377604 A1 | 12/2016 | Rosario-Jansen et al. |
| 2017/0166873 A1 | 6/2017 | Fischer et al. |
| 2017/0258927 A1 | 9/2017 | Johnston |
| 2017/0298326 A1 | 10/2017 | Hartman et al. |
| 2017/0313993 A1 | 11/2017 | Hartman et al. |
| 2017/0313994 A1 | 11/2017 | Hartman et al. |
| 2017/0313995 A1 | 11/2017 | Hartman et al. |
| 2017/0321193 A1 | 11/2017 | Hartman et al. |
| 2018/0008665 A1 | 1/2018 | Qiao et al. |
| 2018/0127432 A1 | 5/2018 | Trzupek et al. |
| 2018/0188242 A1 | 7/2018 | Rosario-Jansen et al. |
| 2018/0223263 A1 | 8/2018 | Sherman et al. |
| 2018/0289776 A1 | 10/2018 | Johnston |
| 2019/0316097 A1 | 10/2019 | Hartman et al. |
| 2019/0317083 A1 | 10/2019 | Rosario-Jansen et al. |
| 2020/0056160 A1 | 2/2020 | Fischer et al. |
| 2020/0237879 A1 | 7/2020 | Kent et al. |
| 2020/0237880 A1 | 7/2020 | Kent et al. |
| 2020/0237881 A1 | 7/2020 | Kent et al. |
| 2020/0353057 A1 | 11/2020 | Kent et al. |
| 2021/0079362 A1 | 3/2021 | Hartman et al. |
| 2021/0181187 A1 | 6/2021 | Rosario-Jansen et al. |
| 2022/0323445 A1 | 10/2022 | Peloso et al. |
| 2022/0323550 A1 | 10/2022 | Peloso |
| 2022/0409620 A1 | 12/2022 | Kent et al. |
| 2023/0028134 A1 | 1/2023 | Rosario-Jansen et al. |
| 2023/0034252 A1 | 2/2023 | Hartman et al. |
| 2023/0173035 A1 | 6/2023 | Kent et al. |
| 2023/0251247 A1 | 8/2023 | Rosario-Jansen et al. |

(56) References Cited

U.S. PATENT DOCUMENTS

FOREIGN PATENT DOCUMENTS

| | | |
|---|---|---|
| CN | 1322141 A | 11/2001 |
| CN | 1322243 A | 11/2001 |
| CN | 101168052 A | 4/2008 |
| CN | 101198693 A | 6/2008 |
| CN | 104066324 A | 9/2014 |
| DE | 837379 C | 8/1955 |
| DE | 279486 A1 | 6/1990 |
| DE | 279489 A1 | 6/1990 |
| EP | 0028033 A2 | 5/1981 |
| EP | 0034307 A2 | 8/1981 |
| EP | 0043980 A2 | 1/1982 |
| EP | 0055188 A1 | 6/1982 |
| EP | 0204283 A2 | 12/1986 |
| EP | 0226448 A2 | 6/1987 |
| EP | 0279486 A2 | 8/1988 |
| EP | 0321134 A2 | 6/1989 |
| EP | 0408461 A1 | 1/1991 |
| EP | 0727437 A2 | 8/1996 |
| EP | 1100542 A2 | 5/2001 |
| EP | 1100880 A2 | 5/2001 |
| EP | 2349280 A1 | 8/2011 |
| JP | S5599189 A | 7/1980 |
| JP | S55135590 A | 10/1980 |
| JP | S57192435 A | 11/1982 |
| JP | S6255079 A | 3/1987 |
| JP | S62223192 A | 10/1987 |
| JP | H01216939 A | 8/1989 |
| JP | H0354581 A | 3/1991 |
| JP | H03148298 A | 6/1991 |
| JP | H06255079 A | 9/1994 |
| JP | H09154581 A | 6/1997 |
| JP | H10500565 A | 1/1998 |
| JP | H10502360 A | 3/1998 |
| JP | H1175876 A | 3/1999 |
| JP | 3148208 B2 | 3/2001 |
| JP | 3148298 B2 | 3/2001 |
| JP | 2002522399 A | 7/2002 |
| JP | 2002524053 A | 8/2002 |
| JP | 2003521937 A | 7/2003 |
| JP | 2005241424 A | 9/2005 |
| JP | 2008505656 A | 2/2008 |
| JP | 2008535499 A | 9/2008 |
| JP | 2008535500 A | 9/2008 |
| JP | 2013009960 A | 1/2013 |
| JP | 5599189 B2 | 10/2014 |
| KR | 19980069019 A | 10/1998 |
| KR | 0159107 B1 | 11/1998 |
| KR | 100318706 B1 | 12/2001 |
| KR | 100333148 B1 | 12/2002 |
| KR | 100365606 B1 | 2/2003 |
| KR | 100369838 B1 | 9/2003 |
| KR | 100488848 B1 | 5/2005 |
| RU | 2246318 C2 | 2/2005 |
| RU | 2281954 C2 | 8/2006 |
| RU | 2290439 C2 | 12/2006 |
| WO | WO-8604145 A1 | 7/1986 |
| WO | WO-8700056 A1 | 1/1987 |
| WO | WO-9216221 A1 | 10/1992 |
| WO | WO-9419007 A1 | 9/1994 |
| WO | WO-9419470 A1 | 9/1994 |
| WO | WO-9423735 A1 | 10/1994 |
| WO | WO-9423740 A1 | 10/1994 |
| WO | WO-9511987 A1 | 5/1995 |
| WO | WO-9525785 A1 | 9/1995 |
| WO | WO-9601274 A1 | 1/1996 |
| WO | WO-9623064 A1 | 8/1996 |
| WO | WO-9808873 A1 | 3/1998 |
| WO | WO-9831383 A1 | 7/1998 |
| WO | WO-0007629 A2 | 2/2000 |
| WO | WO-0008196 A2 | 2/2000 |
| WO | WO-0008196 A3 | 3/2000 |
| WO | WO-0159078 A2 | 8/2001 |
| WO | WO-02070007 A1 | 9/2002 |
| WO | WO-03011211 A2 | 2/2003 |
| WO | WO-03045436 A1 | 6/2003 |
| WO | WO-2004092393 A1 | 10/2004 |
| WO | WO-2005110386 A2 | 11/2005 |
| WO | WO-2006110761 A2 | 10/2006 |
| WO | WO-2006110819 A2 | 10/2006 |
| WO | WO-2007100741 A2 | 9/2007 |
| WO | WO-2008051178 A2 | 5/2008 |
| WO | WO-2010071865 A1 | 6/2010 |
| WO | WO-2010151823 A1 | 12/2010 |
| WO | WO-2010151831 A1 | 12/2010 |
| WO | WO-2011032175 A1 | 3/2011 |
| WO | WO-2013066353 A1 | 5/2013 |
| WO | WO-2017156513 A1 | 9/2017 |
| WO | 2018089808 | 5/2018 |
| WO | WO-2020160322 A1 | 8/2020 |
| WO | WO-2020160324 A1 | 8/2020 |
| WO | WO-2020160325 A1 | 8/2020 |
| WO | WO-2022035828 A1 | 2/2022 |

OTHER PUBLICATIONS

Gaffo et al., "Developing a provisional definition of flare in patients with established gout," May 2012, 64(5), pp. 1508-1517, https://pubmed.ncbi.nlm.nih.gov/22083456/.

International Preliminary Report on Patentability for International Application No. PCT/US2021/045350 dated Feb. 23, 2023, 8 pages.

Keenan et al., "Use of Pre-Infusion Serum Uric Acid Levels as a Biomarker for Infusion Reaction Risk in Patients on Pegloticase," Rheumatology and Therapy, Jun. 2019, 6(2), pp. 299-304, Epub Mar. 14, 2019, https://pubmed.ncbi.nlm.nih.gov/30875075/.

Kidney International, "Kidney Disease: Improving Global Outcomes (KDIGO) Guidelines," Aug. 2009, vol. 76, Supplement 113, 140 pages, https://kdigo.org/wp-content/uploads/2017/02/KDIGO-2009-CKD-MBD-Guideline-English.pdf.

Malamet et al., "SAT0355 Real World Risk of Infusion Reactions with Pegloticase Treatment: Findings from Post-Approval US Safety Data," Annals of the Rheumatic Diseases, Jun. 2013, 72(Suppl 3), pp. A703-A704, https://ard.bmj.com/content/72/Suppl_3/A703.3.

Male et al., "Immunology," 8th edition, Chapter 11, pp. 183-198 and Chapter 19, pp. 307-321, Philadelphia, PA, Elsevier Inc., 2013.

U.S. Appl. No. 60/670,520, filed Apr. 11, 2005 and titled "Purification of proteins with cationic surfactant," 53 pages.

Abeles, A.M., "PEG-ing down (and preventing?) the cause of pegloticase failure," Arthritis Research & Therapy, Jun. 2014, 16:112., 2 pages.

Abuchowski, A. et al., "Effect of Covalent Attachment of Polyethylene Glycol on Immunogenicity and Circulating Life of Bovine Liver Catalase," The Journal of Biological Chemistry, American Society for Biochemistry and Molecular Biology, United States, Jun. 10, 1977, vol. 252, No. 11, pp. 3582-3586.

Abuchowski, A. et al., "Reduction of Plasma Urate Levels in the Cockerel With Polyethylene Glycol-Uricase," The Journal of Pharmacology Experimental Therapeutics, Nov. 1981, vol. 219, No. 2, pp. 352-354.

Abukhalaf et al., "Nonsteroidal Anti-inflammatory Drugs, Disease-Modifying Antirheumatic Drugs, and Agents used in Gout," Handbook of Drug Interactions, Jul. 2011, pp. 415-475.

Acetaminophen Extra Strength-acetaminophen tablet, Physicians Total Care, Inc., Apr. 29, 2016 (Apr. 29, 2016), pp. 1-4. Retrieved from the Internet: https://bit.ly/36wVn98 on Nov. 7, 2020 (Nov. 7, 2020).

Adams, P., et al., "Current Estimates From the National Health Interview Survey, 1996," Vital Health Study, Oct. 1999, Series 10, No. 200, 212 Pages.

"Aggregate", Stedman's Medical Dictionary 27th Edition, PDR Electronic Library, Accessed on Jun. 10, 2009, 1 Page, Retrieved from URL: http://www.thomsonhe.com/pdrel/librarian/ND.

Akkemik et al., "Effects of some drugs on human erythrocyte glocose 6-phosphate dehydrogenzse: an in vitro study," Journal of Enzyme Inhibition and Medicinal Chemistry, 25(6), Dec. 2010, pp. 871-875, DOI: 10.3109/14756360903489581.

Alamillo J.M., et al, "Purification and Molecular Properties of Urate Oxidase From Chlamydomonas Reinhardtii," Biochimica et Biophysica

(56) References Cited

OTHER PUBLICATIONS

Acta, Elsevier Science Publishers B.V., Netherlands, Jan. 29, 1991, vol. 1076, pp. 203-208.

Albert et al., "Increased Efficacy and Tolerability of Pegloticase in Patients With Uncontrolled Gout Co-Treated With Methotrexate: A Retrospective Study," Rheumatology and Therapy, Sep. 2020, vol. 7, pp. 639-648.

Al-Shawi A., et al., "A Novel Immunoradiometric Assay for Human Liver Ferritin," Journal of Clinical Pathology, Apr. 1983, vol. 36, No. 4, pp. 440-444, Abstract only.

Altschul, Stephen F., et al., "Basic local alignment search tool", Journal of Molecular Biology (1990); 215(3): 403-410.

Altschul, Stephen F., et al., "Gapped BLAST and PSI-BLAST: a new generation of protein database search programs", Nucleic Acids Research (1997); 25(17): 3389-3402.

Alvares K., et al., "Rat Urate Oxidase Produced by Recombinant Baculovirus Expression: Formation of Peroxisome Crystalloid Core-like Structures," Cell Biology, Proceedings of the National Academy of Sciences of the USA, Jun. 1992, vol. 89, pp. 4908-4912.

Alvares K., et al., "The Nucleotide Sequence of a Full Length cDNA Clone Encoding Rat Liver Urate Oxidase," Biochemical and Biophysical Research Communications, Academic Press, Inc., United States, Feb. 15, 1989, vol. 158, No. 3, pp. 991-995.

Alvarez-Lario et al., "Uric acid and evolution," Rheumatology, Jul. 2010, 49, pp. 2010-2015.

"Amino Acid Sequence of Amino Truncated Chimeric Pig-Baboon Uricase," May 30, 2000, Retrieved from EBI Accession No. GSP: AAY69153, 2 Pages, XP002404207.

Antonopoulos C.A., et al., "The Precipitation of Polyanions by Long-Chain Aliphatic Ammonium Compounds," Biochimica et Biophysica Acta, Dec. 9, 1961, vol. 54, pp. 213-226.

Arellano et al., "Allopurinol hypersensitivity syndrome: a review," Mar. 1993, 27(3), pp. 337-343.

Asci et al., "The impact of gallic acid on the methotrexate-induced kidney damage in rats," Journal of Food and Drug Analysis, vol. 25, Issue 4, Oct. 2017, pp. 890-897.

Assadi F., "Managing New Onset Gout in Pediatric Renal Transplant Recipients: when, how, to what extent," Journal of Nephrology, Jul.-Aug. 2013, 26(4), pp. 624-628 2013.

Augustsson J., et al., "Low-Dose Glucocorticoid Therapy Decreases Risk for Treatment-Limiting Infusion Reaction to Infliximab in Patients with Rheumatoid Arthritis," Extended Report, Annals of the Rheumatic Diseases, Nov. 2007, vol. 66, pp. 1462-1466.

Baert et al., "Influence of Immunogenicity on the Long-Term Efficay of Infliximab in Crohn's Disease," The New England Journal of Medicine 348, No. 7, Feb. 2003, pp. 601-608.

Baraf et al., "Infusion-related reactions with pegloticase, a recombinant uricase for the treatment of chronic gout refractory to conventional therapy," Journal of Clinical Rheumatology, Dec. 2014, 20(8):427-432.

Baraf H.S.B., et al., "Resolution of Tophi With Intravenous Peguricase in Refractory Gout," Arthritis & Rheumatism, Sep. 2005, Supplement, vol. 52, No. 9, p. S105.

Baraf H.S.B., et al., "Resolution of Tophi With Intravenous Peguricase in Refractory Gout," Presented at American College of Rheumatology, Annual Scientific Meeting, San Diego, CA, Poster 194, Nov. 13-17, 2005, 1 Page.

Baraf H.S.B., et al., "Resolution of Tophi With Intravenous Peguricase in Treatment-Failure Gout," Presented at the EULAR—Annual European Congress of Rheumatology, Amsterdam, Netherlands, Poster 465, Annals of the Rheumatic Diseases, Jun. 21-24, 2006, vol. 65, Supplement 2: 256, 1 Page.

Baraf H.S.B., et al., "Tophus Burden Reduction With Pegloticase: Results From Phase 3 Randomized Trials and Open-Label Extension in Patients With Chronic Gout Refractory to Conventional Therapy," Arthritis Research & Therapy, Sep. 26, 2013, vol. 15, No. 5:R137, 11 Pages.

Bastos et al., "Methotrexate: Studies on cellular metabolism. IV. Effect on the mitochondrial oxidation of cytosolic-reducing equivalents in HeLa cells," Cell Biochemistry & Function, Oct. 1990, vol. 8, Issue 4, pp. 199-203.

Bayat S., et al., "Development of a Dual-Energy Computed Tomography Scoring System for Measurement of Urate Deposition in Gout," Arthritis Care & Research, Jun. 2016, vol. 68, No. 6, pp. 769-775.

Becker M., et al., "Activation of Hydroxylic Polymers—by Reaction with Carbonate or Chloroformate Ester in Presence of Amine," English Abstract, Derwent World Patents Index, Accession No. 8448552, 2004, 1 Page.

Becker M.A., et al., "Febuxocat Compared with Allopurinol in Patients with Hyperuricemia and Gout," The New England Journal of Medicine, Dec. 8, 2005, vol. 353, No. 23, pp. 2450-2461.

Becker M.A., "Hyperuricemia and Gout," The Metabolic and Molecular Bases of Inherited Disease, Edited by Scriver C.R, Beaudet A.L, Sly W.S, Valle D, 8th Edition, New York, McGraw-Hill, 2001, vol. 11, pp. 2513-2535.

Benbacer L., et al., "Interspecies Aminopeptidase-n Chimeras Reveal Species-specific Receptor Recognition by Canine Coronavirus, Feline Infectious Peritonitis Virus, and Transmissible Gastroenteritis Virus," Journal of Virology, Jan. 1997, vol. 71, No. 1, pp. 734-737, JPN6014045520.

Ben-Bassat A., et al., "Amino-Terminal Processing of Proteins," Nature, Mar. 19, 1987, vol. 326, 1 Page.

Ben-Bassat A., et al., "Processing of the Initiation Methionine From Proteins: Properties of the *Escherichia coli* Methionine Aminopeptidase and Its Gene Structure," Journal of Bacteriology, Feb. 1987, vol. 169, No. 2, pp. 751-757.

Ben-Horin et al., "Addition of an Immunomodulator to Infliximab Therapy Eliminates Antidrug Antibodies in Serum and Restores Clinical Response of Patients With Inflammatory Bowel Disease," Clinical Gastroenterology and Hepatology, vol. 11, Issue 4, Apr. 2013, pp. 444-447.

Berendsen H.J.C., "A Glimpse of the Holy Grail?," Science, Oct. 23, 1998, vol. 282, pp. 642-643.

Berhanu A., et al., "Pegloticase Failure and a Possible Solution: Immunosuppression to Prevent Intolerance and Inefficacy in Patients With Gout," Seminars in Arthritis and Rheumatism, 2017, vol. 46, No. 6, pp. 754-758.

Bessen et al., "Concomitant immunosuppressant use with pegloticase in patients with tophaceous gout—a case series," International Journal of Clinical Rheumatology 2019;14(6):238-245.

Bessen et al., "Recapture and improved outcome of pegloticase response with methotrexate—A report of two cases and review of the literature," Seminars in Arthritis and Rheumatism, Aug. 2019, vol. 49, No. 1, pp. 56-61.

Biggers et al., "Pegloticase, a polyethylene glycol conjugate of uricase for the potential intravenous treatment of gout," Current Opinion in Investigational Drugs (London, England: 2000), vol. 9, Issue 4, Apr. 1, 2008, pp. 422-429.

Bird, R.E. et al. (Oct. 1988) "Single-chain antigen-binding proteins." Science 242(4877):423-426.

Blumberg B.S., et al., "Further Evidence on the Protein Complexes of Some Hyauronic Acids," Biochemical Journal, Jan. 1958, vol. 68, pp. 183-188.

Bossavy J.P., et al., "Comparison of the Antithrombotic Effect of PEG-Hirudin and Heparin in a Human Ex Vivo Model of Arterial Thrombosis," Arteriosclerosis, Thrombosis and Vascular Biology, Journal of the American Heart Association, United States, May 1999, vol. 19, pp. 1348-1353.

Botson et al., "Pegloticase in combination with methotrexate in patients with uncontrolled gout: A multicenter, open-label study (Mirror)," The Journal of Rheumatology, May 2021;48:767-774, doi: 10.3899/jrheum.200460.

Botson et al., "Pretreatment and Coadministration with Methotrexate Improved Durability of Pegloticase (Krystexxa) Response: A Prospective, Proof-of-Concept, Case Series," Abstract, Arthritis Rheumatology, 2018; 70 (suppl 10), https://acrabstracts.org/abstract/pretreatment-andcoadministration- with-methotrexate-improved-durability-of-pegloticase-krystexxa-response-aprospective- proof-of-concept-case-series/, Accessed Sep. 11, 2018, 2 pages.

(56) References Cited

OTHER PUBLICATIONS

Botson et al., "Pretreatment and co-administration with methotrexate improved durability of pegloticase response: a prospective observational, proof-of-concept, case series [Abstract]," SAT0404 Annals of the Rheumatic Diseases, Jun. 2019, vol. 78, Issue Suppl. 2, A1289-A1290.

Botson et al., "Pretreatment and Co-Administration with Methotrexate Improved Durability of Pegloticase Response: A Prospective, Observational, Proof-of-Concept, Case Series," Poster presented at the 2018 Annual Scientific Meeting of the American College of Rheumatology, Oct. 19-24, 2018, 1 page.

Botson et al., "Pretreatment and co-administration with methotrexate improved durability of pegloticase response," Journal of Clinical Rheumatology, vol. 28, No. 1, Jan. 2022, e129-e134, doi: 10.1097/RHU.0000000000001639.

Bradley C.M., et al., "Limits of Cooperativity in a Structurally Modular Protein: Response of the Notch Ankyrin Domain to Analogous Alanine Substitutions in Each Repeat," Journal of Molecular Biology, Nov. 22, 2002, vol. 324, pp. 373-386.

Braun A., et al., "Development and Use of Enzyme-Linked Immunosorbent Assays (ELISA) for the Detection of Protein Aggregates in Interferon-Alpha (IFN-.alpha) Formulations," Pharmaceutical Research, Plenum Publishing Corporation, United States, Oct. 1997, vol. 14, No. 10, pp. 1394-1400.

Braun A., et al., "Protein Aggregates Seem to Play a Key Role Among the Parameters Influencing the Antigenicity of Interferon Alpha (IFN-.alpha.) in Normal and Transgenic Mice," Pharmaceutical Research, Plenum Publishing Corporation, United States, Oct. 1997, vol. 14, No. 10, pp. 1472-1478.

Brenda Enzyme Database: "E.C. 1.7.3.3, Urate Oxidase," 42 Pages, [Retrieved on Mar. 27, 2008] Retrieved from URL: www.brenda-enzymes.info.

Bringham, M. D. et al., "Immunosuppressant Use and Gout in the Prevalent Solid Organ Transplantation Population," J of the American Society of Nephrology, Progress in Transplantation, Jun. 2020, 30(2), pp. 103-110.

Broadwell et al., "Community Practice Experiences with a Variety of Immunomodulatory Agents Co-Administered with Pegloticase for the Treatment of Uncontrolled Gout," Rheumatology and Therapy, Dec. 2022, 9(6), pp. 1549-1558.

Buch M.H., et al., "Shortening Infusion Times for Infliximab Administration," Rheumatology, Apr. 2006, vol. 45, pp. 485-486.

Burnham N.L., "Polymers for Delivering Peptides and Proteins," American Journal of Hospital Pharmacy, American Society of Hospital Pharmacists, Inc., United States, Jan. 15, 1994, vol. 51, pp. 210-218.

Caetano et al., "Effect of methotrexate (MTX) on NAD(P)+ dehydrogenases of HeLa cells" malic enzyme, 2-oxoglutarate and isocitrate dehydrogenases, Cell Biochemistry & Function, Dec. 1997, vol. 15, Issue 4, pp. 259-264.

Calabrese L.H., et al., "Frequency, Distribution and Immunologic Nature of Infusion Reactions in Subjects Receiving Pegloticase for Chronic Refractory Gout," Arthritis Research & Therapy, Dec. 2017, vol. 19, No. 1:19, 1-7 Pages.

Caliceti P., et al., "Biopharmaceutical Properties of Uricase Conjugated to Neutral and Amphiphilic Polymers," Bioconjugate Chemistry, American Chemical Society, Jun. 2, 1999, vol. 10, No. 4, pp. 638-646.

Carter W.A., "Interferon: Evidence for Subunit Structure," Proceedings of the National Academy of Sciences of the United States of America, Oct. 1970, vol. 67, No. 2, pp. 620-628.

Chen et al., "Contemporary Prevalence of Gout and Hyperuricemia in the United States and Decadal Trends: The National Health and Nutrition Examination Survey 2007-2016," Arthritis Rheumatology, Jun. 2019; 71(6), pp. 991-999.

Chen R.H.-L., et al., "Properties of Two Urate Oxidases Modified by the Covalent Attachment of Poly(Ethylene Glycol)," Biochimica et Biophysica Acta (BBA)-Enzymology, Aug. 13, 1981, vol. 660, pp. 293-298.

Chinese Second Office Action for Chinese Application No. 01807750.1, dated Mar. 21, 2008, Chinese Patent Office, Beijing, China, 6 Pages.

Choe et al., "Association between serum uric acid and inflammation in rheumatoid arthritis: Perspective on lowering serum uric acid of leflunomide," Clinica Chimica acta, vol. 438, Jan. 1, 2015, pp. 29-34, https://doi.org/10.1016/j.cca.2014.07.039.

Chua C.C., et al., "Use of Polyethylene Glycol-Modified Uricase (PEG-Uricase) to Treat Hyperuricemia in a Patient with Non-Hodgkin Lymphoma," Annals of Internal Medicine, American College of Physicians, United States, Jul. 15, 1988, vol. 109, pp. 114-117.

Clark R., et al., "Long-acting Growth Hormone Produced by Conjugation with Polyethylene Glycol," Journal of Biological Chemistry, Sep. 6, 1996, vol. 271, No. 36, pp. 21969-21977.

ClinicaiTrials.gov Identifier NCT02598596 (Year: 2015), 14 pages.

ClinicaiTrials.gov Identifier NCT03303989 (Year: 2017), 30 pages.

Clive, D. M. "Renal Transplant-Associated Hyperuricemia and Gout," Journal of the American Society of Nephrology, May 1, 2000, vol. 11, pp. 974-979.

Coiffier et al., "Efficacy and safety of rasburicase (recombinant urate oxidase) for the prevention and treatment of hyperuricemia during induction chemotherapy of aggressive non-hodgkin's lymphoma: Results of the GRAAL1 (Groupe d'Etude des lymphomes de l'adulte trial on rasburicase activity in adult lymphoma) study," Journal of Clinical Oncology, vol. 21, No. 23, Dec. 2003, pp. 4402-4406.

Cole S.P.C., et al., "The EBV-Hybridoma Technique and its Application to Human Lung Cancer," Monoclonal Antibodies and Cancer Therapy, 1985, pp. 77-96.

Cole-Showers et al., "Effects of proanthocyanidin and methotrexate on glucose-6-phosphate dehydrogenase (G6PD) and glutathione reductase (GR) in an animal model," Journal of Food Agriculture and Environment, vol. 10, Issue 1, Jan. 2012, pp. 231-234.

Colloc'h N., et al., "Crystal Structure of the Protein Drug Urate Oxidase-Inhibitor Complex at 2.05 ANG. Resolution," Nature Structural Biology, Nature Publishing Group, Nov. 1997, vol. 4, No. 11, pp. 947-952.

Conley T.G., et al., "Thermodynamics and Stoicheiometry of the Binding of Substrate Analogues to Uricase," Biochemical Journal, The Biochemical Society, United Kingdom, Jun. 1, 1980, vol. 187, pp. 727-732.

Cooper J.F., "Resolving LAL Test Interferences," Journal of Parenteral Science and Technology, Jan.-Feb. 1990, vol. 44, No. 1, pp. 13-15.

Cote R.J., et al., "Generation of Human Monoclonal Antibodies Reactive with Cellular Antigens," Proceedings of the National Academy of Sciences of the United States of America, Immunology, Apr. 1983, vol. 80, pp. 2026-2030.

Cotton et al., "Glucose-6-Phosphate Dehydrogenase in the Blood of Psoriatics, and the Effects of Methotrexate," Dermatology, 1973, vol. 147, No. 6, pp. 399-405.

Crews et al., "Effect of Allopurinol Versus Urate Oxidase on Methotrexate Pharmacolinetics in Children With Newly Diagnosed Acute Lymphoblastic Leukemia," Cancer, Jan. 2010, pp. 227-232.

Crivelli E., et al., "A Single Step Method for the Solubilization and Refolding of Recombinant Protein from *E. coli* Inclusion Bodies," Australian Journal of Biotechnology, Apr. 1991, vol. 5, No. 2, pp. 78-80, 86.

Dady et al., "Methotrexate with thymidine, inosine, and allopurinol rescue: a phase I clinical study," Cancer Treatment Report 65, Jan. 1, 1981, pp. 37-43.

Davis F.F., et al., "Enzyme-Polyethylene Glycol Adducts: Modified Enzymes with Unique Properties," In Enzyme Engineering, Edited by Broun G.B., et al., Plenum Press, New York, 1978, vol. 4, pp. 169-173.

Davis S., et al., "Hypouricaemic Effect of Polyethyleneglycol Modified Urate Oxidase," The Lancet, London, GB, Aug. 8, 1981, pp. 281-283, XP000577404.

Dean et al., "Pegloticase Therapy and G6PD Genotype," National Center of Biotechnology Information, Oct. 2020, pp. 1-10.

Delgado et al., "The uses and properties of PEG-linked proteins". Critical Reviews in Therapeutic Drug Carrier Systems (Jan. 1, 1992); 9(3-4): 249-304.

(56) References Cited

OTHER PUBLICATIONS

Derynck R., et al., "Expression of Human Fibroblast Interferon Gene in *Escherichia coli*," Nature, Sep. 18, 1980, vol. 287, pp. 193-197.

Donadio, D., et al., "Anaphylaxis-like Manifestations After Intravenous Injection of Urate Oxidase in an Asthmatic Child With Acute Leukemia," La Nouvelle Presse Medicale, 1981, vol. 10, pp. 711-712. (1 page English Translation).

Doyle et al., "Treatment with Infliximab plus Methotrexate Improves Anemia in Patients with Rheumatoid Arthritis Independent of Improvement in Other Clinical Outcome Measures—A Pooled Analysis from Three Large, Multicenter, Doubled-Blind, Randomized Clinical Trials," Seminars in Arthritis and Rheumatism, vol. 39, Issue 2, Oct. 2009, pp. 123-131.

Ducourau et al., "Methotrexate effect on immunogenicity and long-term maintenance of adalimumab in axial spondyloarthritis: a multicentric randomised trial," Rheumatic & Musculoskeletal Diseases Open, Jan. 2020, 6:e001047, pp. 1-9.

"EC 1.7.3.3, urate oxidase," Brenda Enzyme Database, available via internet at www.brenda.uni-koeln.de/ (in related U.S. Appl. No. 09/501,730, filed Feb. 10, 2000, in Notice of Allowance dated Jan. 13, 2004), 25 pages.

Embery, G., "Glycosaminoglycans of Human Dental Pulp," Journal de Biologie Buccale, Sep. 1976, vol. 4, pp. 229-236.

Emmerson, B.T., "The Management of Gout," The New England Journal of Medicine, Feb. 15, 1996, vol. 334, No. 7, pp. 445-451.

Estimated Glomerular Filtration Rate (eGFR), Kidney Health Australia, May 31, 2017, (Apr. 31, 2017), Retrieved from the Internet: https://kidney.org.au/uploads/resources/egfr-fact-sheet.pdf, Nov. 7, 2020 (Nov. 7, 2020). pp. 1-3.

European Examination Report for European Application No. 01923265.1, dated Dec. 13, 2007, European Patent Office, Munich, DE, 6 Pages.

European Search Report for European Application No. 05011069.1, mailed Aug. 5, 2005, 6 Pages.

European Search Report for European Application No. 99938996.8, mailed Mar. 4, 2002, 2 Pages.

"ExPasy ProtParam Tool," pp. 1-2, [Retrieved on Dec. 19, 2018], Retrieved from the Internet: URL: https://web.expasy.org/cgi-bin/protparam/protparam.

Extended European Search Report for European Application No. 09175303.8, mailed Jan. 26, 2010, 6 Pages.

Extended European Search Report for European Application No. 10007912.8, mailed Oct. 25, 2010, 06 Pages.

Extended European Search Report for European Application No. 10158016.5, mailed May 11, 2010, 10 Pages.

Extended European Search Report for European Application No. 10180428.4, mailed Feb. 24, 2011, 7 Pages.

Extended European Search Report for European Application No. 10180672.7, mailed Mar. 30, 2011, 6 Pages.

Extended European Search Report for European Application No. 10792756.8, mailed Oct. 18, 2013, 04 Pages.

Extended European Search Report for European Application No. 14192835.8, mailed Jun. 5, 2015, 9 Pages.

Extended European Search Report for European Application No. 15156612.2, mailed Aug. 14, 2015, 7 Pages.

Extended European Search Report for European Application No. 17192971.4, mailed Feb. 7, 2018, 8 Pages.

Extended European Search Report for European Application No. 17869608.4, mailed Jul. 1, 2020, 10 Pages.

Extended European Search Report for European Application No. 18214393.3, mailed Apr. 12, 2019, 5 Pages.

Fam, A.G., "Strategies and Controversies in the Treatment of Gout and Hyperuricaemia," Bailliere's Clinical Rheumatology: International Practice and Research, Elsevier Science Ltd., Aug. 1990, vol. 4, No. 2, pp. 177-192.

FDA—Drug Safety Brouchure—Ref ID 3116893, Published on the Web for Krystexxa, Apr. 2012, pp. 1-14, Retrieved from URL: http://www.accessdata.fda.gov/drugsatfda_docs/label/2012/125293s034lbl.pdf.

"FDA Approves Krystexxa® (pegloticase) Injection Co-Administered with Methotrexate, Expaning the Labeling to Help More People with Uncontrolled Gout Achieve a Complete Response to Therapy," Benzinga, Business Wire Press Releases, Jul. 8, 2022, 4 pages.

"FDA Approves Krystexxa® (pegloticase) Injection Co-Administered with Methotrexate, Expaning the Labeling to Help More People with Uncontrolled Gout Achieve a Complete Response to Therapy," BioSpace, Jul. 8, 2022, 5 pages.

"FDA Approves Krystexxa® (pegloticase) Injection Co-Administered with Methotrexate, Expaning the Labeling to Help More People with Uncontrolled Gout Achieve a Complete Response to Therapy," StreetInsider, Business Wire, Press Releases, Jul. 8, 2022, 3 pages.

"FDA Approves Krystexxar (pegloticase) Injection Co-Administered with Methotrexate, Expaning the Labeling to Help More People with Uncontrolled Gout Achieve a Complete Response to Therapy," Yahoo!Finance, Business Wire, Press Releases, Jul. 8, 2022, 4 pages.

"FDA Approves Peglioticase Injection Plus Methotrexate for Patients with Uncontrolled Gout," Rheumatology Network, Jul. 8, 2022, 1 page.

"FDA approves peglioticase, methotrexate combo in patients with uncontrolled gout," Healio Rheumatology, Jul. 8, 2022, 2 pages.

"FDA Approves Peglioticase Plus Methotrexate for Uncontrolled Gout," HCPLive, Jul. 8, 2022, 1 page.

"FDA approves pegloticase injection coadministered with methotrexate for gout," AJMC, Jul. 8, 2022, 2 pages.

"FDA decisions to watch in rheumatology in Second Half of 2022," Rheumatology Network, Jun. 29, 2022, 3 pages.

Feagan et al., "Methotrexate in combination with infliximab is no more effectve than infliximab alone in patients with crohn's disease," Gastroenterology, Mar. 2014, 146(3), pp. 681-688.

Flinta, C., et al., "Sequence Determinants of Cytosolic N-Terminal Protein Processing," European Journal of Biochemistry, Jan. 2, 1986, vol. 154, No. 1, pp. 193-196.

Forrest A., et al., "A New Approach for Designing Population Sparse Sampling Strategies—Applied to Ciprofloxacin PKS," Abstracts of Papers, Feb. 1991, vol. 49, No. 2, p. 153.

Francis, G., et al., "PEGylation of Cytokines and other Therapeutic Proteins and Peptides: the Importance of Biological Optimisation of Coupling Techniques," International Journal of Hematology, Jul. 1998, vol. 68, pp. 1-19.

Freyne, B., "A Case Report of Immunosuppressant Medication-Associated Polyarticular Tophaceous Gout Successfully Treated Using the Polyethylene Glycol-Conjugated Uricase Enzyme Pegloticase," Transplantation Proceedings, vol. 50, Dec. 2018, E-published Mar. 9, 2018, pp. 4099-4101.

Fridovich I., "The Competitive Inhibition of Uricase by Oxonate and by Related Derivatives of s-Triazines," The Journal of Biological Chemistry, Jun. 1965, vol. 240, No. 6, pp. 2491-2494.

Friedman T., et al., "THe Urate Oxidase Gene of *Drosophila pseudoobscura* and *Drosophila Melanogaster*: Evolutionary Changes of Sequence and Regulation," Journal of Molecular Evolution, Jan. 1992, vol. 34, No. 1, pp. 62-77, Abstract only.

Fuertges F., et al., "The Clinical Efficacy of Poly (Ethylene Glycol)-Modified Proteins," Journal of Controlled Release, Elsevier Science, The Netherlands, Jan. 1990, vol. 11, pp. 139-148.

Fujita T., et al., Tissue Distribution of "In-Labeled Uricase Conjugated with Charged Dextrans and Polyethylene Glycol," Journal of Pharmacobio-Dynamics, Pharmaceutical Society of Japan, Nov. 1991, vol. 14, pp. 623-629.

Gaertner H.F., et al., "Site-Specific Attachment of Functionalized Poly(ethylene glycol) to the Amino Terminus of Proteins," Bioconjugate Chemistry, American Chemical Society, United States, Jan. 30, 1996, vol. 7, No. 1, pp. 38-44.

Ganson N.J., et al., "Antibodies to Polyethylene Glycol (PEG) during Phase I Investigation of PEG-Urate Oxidase (PEG-uricase; Puricase.RTM.) for Refractory Gout," Presented at American College of Rheumatology Annual Scientific Meeting at San Antonio, TX, Oct. 16-21, 2004, Poster 808, 7 Pages.

Ganson N.J., et al., "Control of Hyperuricemia in Subjects with Refractory Gout, and Induction of Antibody against Poly(ethylene

(56) References Cited

OTHER PUBLICATIONS

Glycol) (PEG), in a Phase I Trial of Subcutaneous PEGylated Urate Oxidase," Arthritis Research and Therapy, 2006, vol. 8, No. 1 : (R12), pp. 1-10.
Garay et al., "Antibodies against polyethylene glycol in healthy subjects and in patients treated with PEG-conjugated agents," Expert Opinion on Drug Delivery, Nov. 2012, 9(11), pp. 1319-1323.
Giglione C., et al., "Control of Protein Life-span by N-terminal Methionine Excision," The EMBO—European Molecular Biology Organization Journal, Jan. 2, 2003, vol. 22, No. 1, pp. 13-23.
Goeddel D.V., et al., "Human Leukocyte Interferon Produced by *E. coli* Is Biologically Active," Nature, Oct. 2, 1980, vol. 287, 6 Pages.
Goldman S.C., et al., "A Randomized Comparison Between Rasburicase and Allopurinol in Children with Lymphoma or Leukemia at High Risk for Tumor Lysis," Blood, May 15, 2001, vol. 97, No. 10, pp. 2998-3303.
Goss et al., "Methotrexate Dose in Patients With Early Rheumatoid Arthritis Impacts Methotrexate Polyglutamate Pharmacokinetics, Adalimumab Pharmacokinetics, and Efficacy: Phacmacokinetic and Exposure-response Analysis of the Concerto Trial," Clinical Therapeutics, vol. 40, Issue 2, Feb. 2018, pp. 309-319.
Greenberg M.L., et al., "A Radiochemical-High-Performance Liquid Chromatographic Assay for Urate Oxidase in Human Plasma," Analytical Biochemistry, Academic Press, Inc., United States, Feb. 1, 1989, vol. 176, pp. 290-293.
"Guidance for Industry: Immunogenicity Assessment for Therapeutic Protein Products," U.S. Department of Health and Human Services Food and Drug Administration, Aug. 2014, 39 pages.
Guttmann A., et al., "Pegloticase in Gout Treatment—Safety Issues, Latest Evidence and Clinical Considerations," Therapeutic Advances in Drug Safety, Dec. 2017, vol. 8, No. 12, pp. 379-388.
Hamburger, S., et al., "Arthritis Advisory Committee Meeting, Pegloticase (Krystexxa) IV fusion," dated Jun. 16, 2009, pp. 1-155, [Retrieved on Aug. 4, 2010], Available on the internet: <url: http="" <a=href=>www.fda.gov/downloads/AdvisoryCommittees/CommitteesMeetingMaterials/DrugsAdvisoryCommittee/UCM167777.pdf, Especially, pp. 108-115.</url:>.
Hande K.R., et al., "Severe Allopurinol Toxicity. Description and Guidelines for Prevention in Patients in Renal Insufficiency," The American Journal of Medicine, Excerpta Medica, United States, Jan. 1984, vol. 76, pp. 47-56.
Harris J.M., et al., "Effect of Pegylation on Pharmaceuticals," Nature Reviews Drug Discovery, Mar. 2003, vol. 2, No. 3, pp. 214-221.
Hartmann G., "Exchange In Vitro of Subunits between Enzymes from Different Organisms: Chimeras of Enzymes," Angewandte Chemie International edition in English, Apr. 1976, vol. 15, No. 4, pp. 181-186, JPN6014045522.
Hascall V., et al., "Aggregation of Cartilage Proteoglycans," Journal of Biological Chemistry, Jul. 10, 1974, vol. 249, No. 13, pp. 4232-4241, pp. 4242-4249, and pp. 4250-4256.
Hazen J., "Adjuvants-Terminology, Classification, and Chemistry," Weed Technology, Oct. 2000, vol. 14, pp. 773-784.
Hedlund L., et al., "Magnetic Resonance Microscopy of Toxic Renal Injury by Bromoethylamine in Rats," Fundamental and Applied Toxicology, Academic Press, May 1991, vol. 16, pp. 787-797.
Heftmann E., et al., "Chromatography: Fundamentals and Applications of Chromatographic and Electrophoretic Methods. Part A: Fundamentals and Techniques," Journal of Chromatography, 1983, vol. 22A, pp. A104-A110.
Heinegard D., et al., "Characterization of Chondroitin Sulfate Isolated from Trypsin-Chymotrypsin Digests of Cartilage Proteoglycans," Archives of Biochemistry and Biophysics, Nov. 1974, vol. 165, No. 1, pp. 427-441.
Henney C., et al., "Antibody Production to Aggregated Human gamma.G-Globulin in Acquired Hypogammaglobulinemia," New England Journal of Medicine, Massachusetts Medical Society, United States, May 23, 1968, vol. 278, pp. 1144-1146.
Herbst R., et al., "Folding of Firefly (*Photinus pyralis*) Luciferase: Aggregation and Reactivation of Unfolding Intermediates," Biochemistry, Apr. 17, 1998, vol. 37, No. 18, pp. 6586-6597.
Hershfield M., "Biochemistry and Immunology of Poly(ethylene glycol)-Modified Adenosine Deaminase (PEG-ADA)," In: ACS Symposium Series 680, Poly(ethylene glycol), Chemistry and Biological Applications, Harris J.M., and Zaplipsky S., eds., American Chemical Society, Washington, DC, Apr. 1997, pp. 145-154.
Hershfield M. et al., "Induced and Pre-Existing Anti-Polyethylene Glycol Antibody in a Trial of Every 3-Week Dosing of Pegloticase for Refractory Gout, including in organ transplant recipients," Arthritis Research & Therapy, Mar. 2014, 16(2), pp. 1-11.
Hershfield M.S., et al., "Use of Site-Directed Mutagenesis to Enhance the Epitope-Shielding Effect of Covalent Modification of Proteins with Polyethylene Glycol," Proceedings of the National Academy of Sciences of the United States of America, Aug. 15, 1991, vol. 88, pp. 7185-7189.
Hess et al., "Cancer metabolism and oxidative stress: Insights into carcinogenesis and checmotherapy via the non-dihydrofolate reductase effects on methotrexate," BB Clinical 3, Jun. 2015, pp. 152-161.
Highlights of Prescribing Information for Allegra (fexofenadine hydrochloride) tablets, ODT 1-18, orally disintegrating tablets) and oral suspension, Jul. 31, 2007 (Apr. 31, 2007), pp. 1-19. Retrieved from the Internet www.accessdata.fda.gov/drugsatfda_docs/label/2008/020872s018,021963s0021bl.pdf on Nov. 7, 2020 (Nov. 7, 2020).
Hinds K., et al., "Synthesis and Characterization of Poly(Ethylene Glycol)-Insuline Conjugates," Bioconjugate Chemistry, American Chemical Society, United States, Feb. 15, 2000, vol. 11, pp. 195-201.
Hirel P., et al., "Extent of N-terminal Methionine Excision from *Escherichia coli* Proteins is Governed by the Side-Chain Length of the Penultimate Amino Acid," Proceedings of the National Academy of Sciences of the United States of America, Jul. 24, 1989, vol. 86, pp. 8247-8251.
"Horizon gets FDA approval for Krystexxa's use with methotrexate for uncontrolled gout," Seeking Alpha, Ravikash, SA News Editor, Jul. 8, 2022, 2 pages.
Horizon, "Horizon Therapeutics plc announces FDA has granted priority review of the supplemental biologics license application (sBLA) for the concomitant use of Krystexxa® (pegloticase injection) plus methotrexate for people living with uncontrolled gout," Mar. 7, 2022, 3 pages.
"Horizon's Krystexxa wins FDA combo nod to fight drug resistance," Fierce Pharm, Jul. 8, 2022, 3 pages.
"Horizon nabs FDA expanded label for gout med Krystexxa," Endpoints, Jul. 8, 2022, 2 pages.
"Horizon Therapeutics: FDA Approves Expanded Labeling for Krystexxa With Methotrexate," Nasdaq, Jul. 8, 2022, 1 page.
"Horizon Therapeutics: FDA approves expanded labeling for Krystexxa with methotrexate," RTTNews, Published Jul. 8, 2022, 5 pages.
"Horizon therapeutics receives FDA approval for uncontrolled gout candidate," Benzinga, Jul. 8, 2022, 7 pages.
Hortnagl H., et al., "Membrane Proteins of Chromaffin Granules, Dopamine-Hydroxylase, a Major Constituent," Biochemical Journal, Aug. 1972, vol. 129, No. 1, pp. 187-195.
Huse W.D., et al., "Generation of a Large Combinatorial Library of the Immunoglobulin Repertoire in Phage Lambda," Research Article, Dec. 8, 1989, vol. 246, pp. 1275-1281.
Huston J.S., et al., "Protein Engineering of Antibody Binding Sites: Recovery of Specific Activity in an Anti-Digoxin Single-Chain Fv Analogue Produced in *Escherichia coli*," Proceedings of the National Academy of Sciences of the United States of America, Aug. 1988, vol. 85, pp. 5879-5883.
Inada Y., et al. "Biomedical and Biotechnological Applications of PEG- and PM—Modified Proteins," Trends Biotechnology, Elsevier Science Limited, Mar. 1995, vol. 13, pp. 86-91.
Information on EC 1.7.3.3—Urate Oxidase: Retrieved from URL: www.brenda-enzymes.org/php/flat.sub.--result.php4?ecno=1.7.3.3 &organisms-ub.--list=&Suchword=, Date Jul. 20, 2009, 53 pages.

(56) References Cited

OTHER PUBLICATIONS

International Preliminary Report on Patentability for International Application No. PCT/US1999/017678, mailed Aug. 24, 2000, 5 Pages.
International Preliminary Report on Patentability for International Application No. PCT/US2001/040069, mailed May 24, 2002, 2 Pages.
International Preliminary Report on Patentability for International Application No. PCT/US2006/013502, mailed Jul. 16, 2007, 5 Pages.
International Preliminary Report on Patentability for International Application No. PCT/US2006/013660, mailed Mar. 20, 2012, 5 Pages.
International Preliminary Report on Patentability for International Application No. PCT/US2006/013751, date of completion Apr. 11, 2005, 05 Pages.
International Preliminary Report on Patentability for International Application No. PCT/US2010/040082, mailed Jan. 12, 2012, 7 Pages.
International Preliminary Report on Patentability for International Application No. PCT/US2020/015956, mailed Aug. 12, 2021, 10 Pages.
International Preliminary Report on Patentability for International Application No. PCT/US2020/015958, mailed Aug. 12, 2021, 12 Pages.
International Preliminary Report on Patentability for International Application No. PCT/US2020/015959, mailed Aug. 12, 2021, 13 Pages.
International Preliminary Report on Patentability for International Application No. PCT/US2020/048803, mailed Mar. 10, 2022, 9 Pages.
International Search Report and Written Opinion for International Application No. PCT/US2001/040069, mailed Dec. 12, 2001, 4 Pages.
International Search Report and Written Opinion for International Application No. PCT/US2006/013751, mailed Sep. 6, 2006, 10 Pages.
International Search Report and Written Opinion for International Application No. PCT/US2010/040082, mailed Aug. 19, 2010, 8 Pages.
International Search Report and Written Opinion for International Application No. PCT/US2020/015956, mailed May 5, 2020, 13 Pages.
International Search Report and Written Opinion for International Application No. PCT/US2020/015959, date of mailing Apr. 8, 2020, 16 pages.
International Search Report and Written Opinion for International Application No. PCT/US2020/048803, mailed Nov. 24, 2020, 13 Pages.
International Search Report and Written Opinion for International Application No. PCT/US2021/045350, mailed Dec. 27, 2021, 10 Pages.
International Search Report and Written Opinion of the International Search Authority for International Application No. PCT/US2006/013660, mailed Nov. 17, 2006, 10 Pages.
International Search Report and Written Opinion of the International Searching Authority for International Application No. PCT/US2006/013502, mailed Dec. 13, 2006, 10 Pages.
International Search Report and Written Opinion of the International Searching Authority for International Application No. PCT/US2010/040093, mailed Aug. 19, 2010, 6 Pages.
International Search Report and Written Opinion of the International Searching Authority for International Application No. PCT/US2020/015958, mailed Apr. 14, 2020, 14 Pages.
International Search Report for International Application No. PCT/US1999/017514, mailed Mar. 17, 2000, 5 Pages.
International Search Report for International Application No. PCT/US1999/017678, mailed Feb. 2, 2000, 4 Pages.
International Search Report for International Application No. PCT/US2000/017398, mailed Dec. 6, 2000, 3 Pages.

Ishino, K., et al., "Protein Concentration Dependence on Aggregation Behavior and Properties of Soybean 7S and 11S Globulins during Alkali-Treatment," Agricultural and Biological Chemistry, Jun. 1980, vol. 44, No. 6, pp. 1259-1266.
Ito M., et al., "Identification of an Amino Acid Residue Involved in the Substrate-binding Site of Rat Liver Uricase by Site-directed Mutagenesis," Biochemical and Biophysical Research Communications, Academic Press, United States, Aug. 31, 1992, vol. 187, pp. 101-107.
Jani et al., "The role of DMARDs in reducing the immunogenicity of TNF inhibitors in chronic inflammatory diseases," Rheumatology, 53(2), Feb. 2014, pp. 213-222.
Jaques L., "The Reaction of Heparin with Proteins and Complex Bases," Biochemical Journal, Jul. 1943, vol. 37, pp. 189-195.
Jones A., "The Isolation of Bacterial Nucleic Acids using Cetyltrimethylammonium Bromide," Biochimica et Biophysica Acta, Apr. 1953, vol. 10, pp. 607-612.
Kabat E.A., et al., "Sequences of Proteins of Immunological Interest," US Department of Health and Human Services, 1983, 4 Pages.
Kahn K., et al., "Kinetic Mechanism and Cofactor Content of Soybean Root Nodule Urate Oxidase," Biochemistry, American Chemical Society, United States, Apr. 15, 1997, vol. 36, pp. 4731-4738.
Karri et al., "Methotrexate and Leucovorin exposure modulates biochemical markers in female accessory reproductive organs of albino rats," General Endocrinology, Jul. 2012, pp. 369-386, doi: 10.4183/aeb.2012.369.
Kawata AK., et al., "Validation of the Sf-36 and Haq-Di in Patients With Treatment-Failure Gout," Annals of the Rheumatic Diseases, 2007, 66 (Suppl II), 236, Poster 359, 1 Page.
Keenan et al., "The effect of immunomodulators on the efficacy and tolerability of pegloticase: a systematic review," Seminars in Arthritis and Rheumatism, vol. 51, No. 2, Apr. 2021, pp. 347-352.
Kelly S.J., et al., "Diabetes Insipidus in Uricase-Deficient Mice: A Model for Evaluating Therapy with Poly(Ethylene Glycol)-Modified Uricase," Journal of the American Society of Nephrology, Lippincott Williams & Wilkins, United States, May 2001, vol. 12, pp. 1001-1009.
Khanna et al., "2012 American College of Rheumatology Guidelines for Management of Gout Part I: Systematic Non-Pharmacologic and Pharmacologic Therapeutic Approaches to Hyperuricemia," Arthritis Care & Research, Oct. 2012, 64(10), pp. 1431-1466 (28 pages).
Khanna et al., "2012 American College of Rheumatology Guidelines for Management of Gout Part II: Therapy and Anti-Inflammatory Prophylaxis of Acute Gouty Arthritis," Arthritis Care & Research, Oct. 2012, 64(10), pp. 1447-1461 (23 pages).
Khanna et al., "Reducing Immunogenicity of Pegloticase (Recipe) with Concomitant use of Mycophenolate Mofetil in Patients with Refractory Gout—a Phase II Double Blind Ramdomized Controlled Trial," ACR Convergence 2020, Abstract #0952, Nov. 2020, 5 pages.
Khanna et al., "Reducing Immunogenicity of Pegloticase (Recipe) with Concomitant use of Mycophenolate Mofetil in Patients with Refractory Gout—a Phase II Double Blind Ramdomized Controlled Trial," ACR Convergence Where Rheumatology Meets, Abstract #0952, Nov. 2020, Final Presentation, 17 pages.
Khanna et al., "Reducing Immunogenicity of Pegloticase with Concomitant use of Mycophenolate Mofetil in Patients with Refractory Gout: A Phase II, Ramdomized, Double-Blind, Placebo-Controlled Trial," Arthritis & Rheumatology, vol. 73, No. 8, Aug. 2021, pp. 1523-1532.
Kinsella, J.E., et al., "Uricase From Fish Liver: Isolation and Some Properties," Comparative Biochemistry and Physiology, American Society of Zoologists, Division of Comparative Physiology, Elsevier, Great Britain, Dec. 30, 1985, vol. 82B, No. 4, pp. 621-624.
Kinstler O.B., et al., "Characterization and Stability of N-Terminally PEGylated rhG-CSF," Pharmaceutical Research, Plenum Publishing Corporation, United States, Jul. 1996, vol. 13, No. 7, pp. 996-1002.
Kishimoto et al., "Improving the efficacy and safety of biologic drugs with tolerogenic nanoparticles," Nature Nanotechnology 11, Aug. 2016, pp. 890-899.

(56) References Cited

OTHER PUBLICATIONS

Kissel P., et al., "Modification of Uricaemia and the Excretion of Uric Acid Nitrogen by an Enzyme of Fungal Origin," Nature, Jan. 6, 1968, vol. 217, pp. 72-74.

Kito M., et al., "A Simple and Efficient Method for Preparation of Monomethoxypolyethylene Glycol Activated with p-Nitrophenylchloroformate and its Application to Modification of L-Asparaginase," Journal of Clinical Biochemistry and Nutrition, Institute of Applied Biochemistry, Japan, Sep. 1996, vol. 21, pp. 101-111.

Kohler, G., et al., "Pillars Article: Continuous Cultures of Fused Cells Secreting Antibody of Predefined Specificity," Nature, Mar. 1975, vol. 256, No. 5517, pp. 495-497. The Journal of Immunology, Mar. 2005, 1:174(5):2453-2455.

Kontsek, P., et al., "Forty Years of Interferon," Acta Virologica, Slovak Academic Press, Slovak Republic, Dec. 1997, vol. 41, pp. 349-353.

Kozbor D., et al., "The Production of Monoclonal Antibodies From Human Lymphocytes," Immunology Today, Mar. 1983, vol. 4 (3), pp. 72-79.

Kozma et al., "Anti-PEG antibodies: Properties, formation, testing and role in adverse immune reactions to PEGylated nano-biopharmaceuticals," Advanced Drug Delivery Reviews, vols. 154-155, 2020, pp. 163-175.

Kozma E.M., et al., "An Accumulation of Proteoglycans in Scarred Fascia," Molecular and Cellular Biochemistry, Jan. 2000, vol. 203, pp. 103-112.

Kral L.G., et al., "Cloning a cDNA for *Drosophila melanogaster* Urate Oxidase," Gene, Elsevier Science Publishers B.V, Netherlands, 1986, vol. 45, pp. 131-137.

Krieckaert, C.L. et al. "Methotrexate reduces immunogenicity in adalimumab treated rheumatoid arthritis patients in a dose dependent manner" Ann Rheum Dis, 71(11):1914-1915 (2012).

Krystexxa (pegloticase) [prescribing information] Horizon, Apr. 2012, 14 pages.

"Krystexxa plus methotrexate approved for uncontrolled gout," MedMDS, Jul. 8, 2022, 4 pages.

"Krystexxa plus methotrexate approved for uncontrolled gout," MPR, Jul. 8, 2022, 4 pages.

Kunitani M., et al., "Classical Light Scattering Quantitation of Protein Aggregates: Off-line Spectroscopy Versus HPLC Detection," Journal of Pharmaceutical and Biomedical Analysis, Elsevier Science B.V., Netherlands, Dec. 1997, vol. 16, 16 Pages.

Kunitani M., et al., "On-Line Characterization of Polyethylene Glycol-Modified Proteins," Journal of Chromatography, Elsevier Science Ltd., Dec. 27, 1991, vol. 588, pp. 125-137.

Larsen K., "Purification of Nodule-Specific Uricase From Soybean by Arginine-Sepharose Affinity Chromatography," Preparative Biochemistry and Biotechnology, 1990, vol. 20, No. 1, 1 Page, (Abstract Only).

Laurent T.C., et al., "Fractionation of Hyaluronic Acid: The Polydispersity of Hyaluronic Acid from the Bovine Vitreous Body," Biochimica et Biophysica Acta, Aug. 26, 1960, vol. 42, pp. 476-485.

Lawrence R.C., et al., "Estimates of the Prevalence of Arthritis and Selected Musculoskeletal Disorders in the United States," Arthritis & Rheumatology, May 1998, vol. 41, No. 5, pp. 778-799.

Leach, M., et al., "Efficacy of Urate Oxidase (Uricozyme) in Tumor Lysis Induced Urate Nephropathy," Clinical & Laboratory Haematology, Blackwell Science Limited, Jun. 1998, vol. 20, pp. 169-172.

Leaustic M., et al., "Allergic Manifestation of the Bronchospasm Type After Intravenous Injection of Urate Oxidase in a Female Patient Treated for Myeloma," Rev Rhum Mal Osteoartic, 1983, vol. 50, No. 7, 5 Pages.

Lee et al., "Reduction in Serum Uric Acid May Be Related to Methotrexate Efficacy in Early Rheumatoid Arthritis: Data from the Canadian Early Arthritis Cohort (Catch)," Clinical Medicine Insights: Arthritis and Musculoskeletal Disorders, Jan. 2016, vol. 9, pp. 37-43.

Lee C.C., et al., "Generation of cDNA Probes Directed by Amino Acid Sequence: Cloning of Urate Oxidase," Science, American Association for the Advancement of Science, United States, Mar. 4, 1988, vol. 239, No. 4844, pp. 1288-1291.

Lee et al., "THU0149 does methotrexate lower serum uric acid levels? Data from the catch cohort," Poster Presentations, Annals of the Rheumatic Diseases, Jun. 2015, vol. 74, pp. 248.

Lee, S-S., "Studies on Glycosaminoglycans in Tissues," Fukushima Journal of Medical Sciences, Jan. 1973, vol. 19, No. 1-4, pp. 33-39.

Lee T.H., et al., "A Novel Secretory Tumor Necrosis Factor-Inducible Protein (TSG-6) is a Member of the Family of Hyaluronate Binding Proteins, Closely Related to the Adhesion Receptor CD44," The Journal of Cell Biology, Jan. 1, 1992, vol. 116, No. 2, pp. 545-557.

Legoux R., et al., "Cloning and Expression in *Eschericia coli* of the Gene Encoding Aspergillus Flavus Urate Oxidase," The Journal of Biological Chemistry, American Society for Biochemistry and Molecular Biology, United States, Apr. 25, 1992, vol. 267, No. 12, pp. 8565-8570.

Lie et al., "The effect of comedication with conventional synthetic disease modifying antirheumatic drugs on TNF inhibitor drug survival in patients with ankylosing spondylitis and undifferentiated spondyloarthritis: results from a nationwide prospective study," Annals of the Rheumatic Diseases, Jun. 2015;74(6), pp. 970-978.

Lim S.Y., et al., "Trends in Gout and Rheumatoid Arthritis Hospitalizations in the United States, 1993-2011," The Journal of the American Medical Association, Jun. 7, 2016, vol. 315, No. 21, pp. 2345-2347.

Lipsky P.E., et al., "Pegloticase Immunogenicity: The Relationship Between Efficacy and Antibody Development in Patients Treated for Refractory Chronic Gout," Arthritis Research & Therapy, Mar. 4, 2014, vol. 16, No. 2, R60, 8 Pages.

Lit, J-Y., et al., "Mutations at the S1 Sites of methionine Aminopeptidases From *Escherichia coli* and *Homo sapiens* Reveal the Residues Critical for Substrate Specificity," Journal of Biological Chemistry, May 14, 2004, vol. 279, No. 20, pp. 21128-21134.

Li-Yu J., et al., "Treatment of Chronic Gout. Can We Determine When Urate Stores Are Depleted Enough to Prevent Attacks of Gout?," The Journal of Rheumatology, Mar. 2001, vol. 28, No. 3, pp. 577-580.

London M., et al., "Uricolytic Activity of Purified Uricase in Two Human Beings," Science, May 10, 1957, vol. 125, pp. 937-938.

Lundquist et al., "Psoriasis and Normouricemic Gout," Dermatology, 1982, vol. 164, No. 2, pp. 104-108.

Macart M., et al., "An Improvement of the Coomassie Blue Dye Binding Method Allowing an Equal Sensitivity to Various Proteins: Application to Cerebrospinal Fluid," Clinica Chimica Acta, Elsevier Biomedical Press, Jun. 16, 1982, vol. 122, pp. 93-101.

Maccari F., et al., "Glycosaminoglycan Blotting on Nitrocellulose Membranes Treated With Cetylpyridinium Chloride After Agarose-Gel Electrophoretic Separation," Electrophoresis, Sep. 2002, vol. 23, pp. 3270-3277.

Mahler H.R., et al., "Studies of Uricase. 1. Preparation, Purification, and Properties of a Cuproprotein," Journal of Biological Chemistry, American Society for Biochemistry and Molecular Biology, United States, Oct. 1955, vol. 216, pp. 625-641.

Mahmoud H.H., et al., "Advances in the Management of Malignancy-Associated Hyperuricaemia," British Journal of Cancer, Supplement 4, Churchill Livingstone, United Kingdom, Jun. 1998, vol. 77, pp. 18-20.

Majjhoo et al., "Comparison of two corticosteriod pre-infusion regimes for pegloticase in the United States: A retrospective analysis in community rheumatology practices," Drugs Real World Outcomes, Dec. 2019;6(4):165-171.

Malakhova E.A., et al al., "Kinetic Properties of Bacterial Urate Oxidase Entrapped in Hydrated Reversed Micelles," Biologicheskie Membrany, 1991, vol. 8, No. 5, 1 Page, (Abstract Only).

Martin et al., "Methotrexate in Psoriasis: Precipitation of Gout," Arch Dermatol., Oct. 1967, vol. 96, No. 4, pp. 431-433, doi:10.1001/archderm.1967.01610040081015.

Matsumura G., et al., "The Preparation of Hyaluronic Acid from Bovine Synovial Fluid," Short Communications, Biochimica et Biophysica Acta, Mar. 5, 1963, vol. 69, pp. 574-576.

(56) References Cited

OTHER PUBLICATIONS

Mcsweeney et al., "Pre-treatment with high molecular weight free PEG effectively suppresses anti-PEG antibody induction by PEG-liposomes in mice," Journal of Controlled Release, vol. 329, Jan. 10, 2021, pp. 774-781.
Milgroom, A. et al., "Immunosuppressant Use and Gout in the Prevalent Solid Organ Transplant Population," Journal of the American Society of Nephrology, Oct. 2018, 29:152 Abstract TH-P0160, 3 pages.
Miura S., et al., "Urate Oxidase is Imported into Peroxisomes Recognizing the C-terminal SKL Motif of Proteins," European Journal of Biochemistry, Blackwell Science Ltd., United Kingdom, Jul. 1, 1994, vol. 223, pp. 141-146.
Moerschell R.P., et al., "The Specificities of Yeast Methionine aminopeptidase and Acetylation of Amino-terminal Methionine in Vivo," Journal of Biological Chemistry, Nov. 15, 1990, vol. 265, No. 32, pp. 19638-19643.
Monkarsh, S.P., et al., "Positional Isomers of Monopegylated Interferon Alpha-2a: Isolation, Characterization, and Biological Activity," Analytical Biochemistry, Academic Press, United States, May 1997, vol. 247, pp. 434-440.
Montagna, R., et al., "Letter to Editor," Nephrologie, 1990, vol. 11, No. 4, 259, 3 Pages.
Montalbini, P., et al., "Isolation and Characterization of Uricase From Bean Leaves and Its Comparison With Uredospore Enzymes," Plant Science, Elsevier Science Ireland Ltd., Ireland, Sep. 1999, vol. 147, pp. 139-147.
Montalbini, P., et al., "Uricase From Leaves: Its Purification and Characterization From Three Different Higher Plants," Planta, Springer-Verlag, Germany, Jul. 1997, vol. 202, pp. 277-283.
Moolenburgh, J.D., et al, "Rasburicase Treatment in Severe Tophaceous Gout: A Novel Therapeutic Option," Clinical Rheumatology, Sep. 2006, vol. 25, pp. 749-752.
Moore, W.V., et al., "Role of Aggregated Human Growth Hormone (hGH) in Development of Antibodies to hGH," The Journal of Clinical Endocrinology and Metabolism, The Endocrine Society, United States, Oct. 1980, vol. 51, pp. 691-697.
Morrison, S.L., et al., "Chimeric Human Antibody Molecules: Mouse Antigen-binding Domains With Human Constant Region Domains," Proceedings of the National Academy of Sciences of the United States of America, Nov. 1984, vol. 81, pp. 6851-6855.
Motojima, K., et al., "Cloning and Sequence Analysis of cDNA for Rat Liver Uricase," Journal of Biological Chemistry, Nov. 15, 1988, vol. 263, No. 32, pp. 16677-16681.
Mountain View Pharmaceuticals, Inc., "puricase.rtm.," U.S. Trademark Registration No. 2,246,623 (report obtained from U.S. Trademark Electronic Search System (TESS), Dec. 5, 2001), 1 page.
Mourad, G., et al., "Role of Anti-Urate Oxidase Precipitant Antibodies in Urate Oxidase Resistant Hyperuremic," La Presse Medicale, Nov. 24, 1984, vol. 13, No. 42, p. 2585.
Moussy, G., et al., "Inter-Species DNA Polymerase Delta Chimeras Are Functional in *Saccharomyces cerevisiae*," European Journal of Biochemistry, Jul. 1, 1995, vol. 231, No. 1, pp. 45-49.
Myers EW, et al. Optimal alignments in linear space. Bioinformatics. Mar. 1, 1988;4(1):11-17.
"N- and C-Terminally Truncated Pig-Baboon Chimeric Uricase (PBC-NT-CT)," Retrieved from EBI Accession No. GSP: AAY81255, Jun. 19, 2000, 2 Pages, XP002404208.
Nagata S., et al., "Synthesis in *E. coli* of a Polypeptide With Human Leukocyte Interferon Activity," Nature, Mar. 27, 1980, vol. 284, 5 Pages.
Nahm B.H., et al., "Induction and De Novo Synthesis of Uricase, a Nitrogen-Regulated Enzyme in Neurospora Crassa," Journal for Bacteriology, American Society for Microbiology, United States, May 1987, vol. 169, No. 5, pp. 1943-1948.
Needleman, Saul B., et al., "A general method applicable to the search for similarities in the amino acid sequence of two proteins", Journal of Molecular Biology (1970); 48(3): 443-453.
Neuberger M.S., et al., "Recombinant Antibodies Possessing Novel Effector Functions," Nature, Dec. 13, 1984, vol. 312, pp. 604-608.
Ngo, J.T., et al., "Computational Complexity, Protein Structure Prediction, and the Levinthal Paradox," The Protein Folding Problem and Tertiary Structure Prediction, Merz et al., (ed.), Birkhauser, Boston, MA, 1994, pp. 491-495.
Nishida Y., et al., "Hypouricaemic Effect After Oral Administration in Chickens of Polyethylene Glycol-modified Uricase Entrapped in Liposomes," Journal of Pharmacy and Pharmacology, Pharmaceutical Press, United Kingdom, May 1984, vol. 36, pp. 354-355.
Nishimura, H., et al., "Improved Modification of Yeast Uricase with Polyethylene Glycol: Accompanied with Nonimmunoreactivity Towards Anti-Uricase Serum and High Enzymic Activity," Enzyme, Karger, Switzerland, 1981, vol. 26, pp. 49-53.
Nishimura H., et al., "Modification of Yeast Uricase with Polyethylene Glycol: Disappearance of Binding Ability towards Anti-Uricase Serum," Enzyme, Karger, Switzerland, 1979, vol. 24, pp. 261-264.
Nucci M.L., et al., "The Therapeutic Value of Poly(Ethylene Glycol)-Modified Proteins," Advanced Drug Delivery Reviews, Elsevier Science Publishers, Netherlands, Mar.-Apr. 1991, vol. 6, No. 2, pp. 133-151.
"$NZNP—Horizon gets FDA approval for Krystexxa's use with methotrexate for uncontrolled gout," Breaking News @MarketCurrents, Jul. 8, 2022, SANews Twitter, 1 page.
Osman A.M., et al., "Liver Uricase in Camelus Dromedarius: Purification and Properties," Comparative Biochemistry and Physiology B, Pergamon Press, London, GB, Dec. 6, 1989, vol. 94B, No. 3, pp. 469-474, ISSN 0305-0491, XP002125210.
Otta M.E., et al., "Solubilization of Particle-Linked Urate Oxidase by Different Agents," Acta Physiologica Latinoamericana, 1975, vol. 25, pp. 451-457.
Pakula A.A., et al., "Genetic Analysis of Protein Stability and Function," Annual Review of Genetics, 1989, vol. 23, pp. 289-310.
Palleroni A.V., et al., "Interferon Immunogenicity: Preclinical Evaluation of Interferon-alpha.2a," Journal of Interferon and Cytokine Research, Mary Ann Liebert, Inc., United States, Jul. 1997, vol. 17, Supplement 1, pp. S23-S27.
Pearce R.H., et al., "Quantitative Isolation of Purified Acidic Glycosaminoglycans from Rat Skin," Canadian Journal of Biochemistry and Physiology, Oct. 1967, vol. 45, pp. 1565-1576.
Perez-Ruiz F., et al., "Effect of Urate-Lowering Therapy on the Velocity of Size Reduction of Tophi in Chronic Gout," Arthritis & Rheumatology, Aug. 15, 2002, vol. 47, No. 4, pp. 356-360.
Philippovich, Y.B., "The Fundamentals of Biochemistry," AGAR, Moscow, Russia, 1999, pp. 29-30, (with unverified, Partial English language translation).
Pitts O.M., et al., "Uricase: Subunit Composition and Resistance to Denaturants," Biochemistry, American Chemical Society, United States, Feb. 26, 1974, vol. 13, No. 5, pp. 888-892.
Porstmann, B., et al., "Comparison of Chromogens for the Determination of Horseradish Peroxidase as a Marker in Enzyme Immunoassay," Journal of Clinical Chemistry and Clinical Biochemistry, Walter de Gruyter & Co., Germany, Jul. 1981, vol. 19, pp. 435-439.
Potaux L., et al., "Uricolytic Therapy Value of Urate Oxidase in the Treatment of Hyperuricemia," La Nouvelle Presse Medicale, Apr. 12, 1975, vol. 4, No. 15, 10 Pages.
"Prevent—Definition by Merriam-Webster Online Dictionary," pp. 1-3, [Retrieved on Jun. 27, 2013] Retrieved from URL: http://www.merriam-webster.com/dictionary/prevent.
Pui et al., "Recombinant Urate Oxidase for the Prophylaxis or Treatment of Hyperuricemia in Patients With Leukemia or Lymphoma," Journal of Clinical Oncology, vol. 19, Issue 3, Feb. 2001, pp. 697-704.
Pui et al., "Recombinant Urate Oxidase (rasburicase) in the prevention and treatment of malignancy-associated hyperuricemia in pediatric and adult patients: results of a compassionate-use trial," Leukemia 15, Oct. 2001, pp. 1505-1509.
Pui et al., "Urate oxidase in prevention and treatment of hyperusicemia associates with lymphoid malignancies," Leukemia 11, Nov. 1997, pp. 1813-1816.
R&D Focus Drug News: "PEG-uricase BioTechnology General, Duke University, Mountain View licensing agreement," DataStar File IPNR/IPNA, Accession No. 1998:2984 DRUGNL, Aug. 24, 1998, 1 Page.

(56) References Cited

OTHER PUBLICATIONS

Richette P., et al., "Rasburicase for Tophaceous Gout not Treatable with Allopurinol: An Exploratory Study," The Journal of Rheumatology, Oct. 2007, vol. 34, No. 10, pp. 2093-2098.

Richette P., et al., "Successful Treatment with Rasburicase of a Tophaceous Gout in a Patient Allergic to Allopurinol," Nature Clinical Practice Rheumatology, Jun. 2006, vol. 2, No. 6, pp. 338-342.

Rinella J.V., et al., "Elutability of Proteins from Aluminum-Containing Vaccine Adjuvants by Treatment with Surfactants," Journal of Colloid and Interface Science, Jan. 1, 1998, vol. 197, pp. 48-56.

Rosenberg A.S., "Effects of Protein Aggregates: An Immunologic Perspective," The American Association of Pharmaceutical Scientists Journal, United States, Aug. 4, 2006, vol. 8, No. 3, pp. E501-E507.

Rosenberg A.S., et al., "Urate-Oxidase for the Treatment of Tophaceous Gout in Heart Transplant Recipients," Rev Rhum, Eng. Ed., May 1995, vol. 62, No. 5, pp. 392-394.

Rudinger, J., "Characteristics of the Amino Acids as Components of a Peptide Hormone Sequence," Peptide Hormones, JA Parsons Edition, University Park Press, Jun. 1976, pp. 1-7.

Saag et al. "Initial results of a clinical study to determine whether a tolerizing regimen of pegloticase can increase the frequency of subjects having sustained lowering of serum urate," American College of Rheumatology, Abstract 1141, Sep. 2017, 2 pages.

Saag K., et al., "FRI0240: Clinical Trial to Determine Whether Altering the Regimen of Pegloticase Administration Can Increase the Frequency of Subjects Having Sustained Lowering of Serum Urate," Annals of Rheumatic Disease, Friday, Jun. 15, 2018, vol. 77, p. 661.

Saifer M.G.P., et al., "Improved Conjugation of Cytokines Using High Molecular Weight Poly(ethylene glycol): PEG-GM-CSF as a Prototype," Polymer Preprints, American Chemical Society, United States, Apr. 1997, vol. 38, pp. 576-577.

Saifer M.G.P., et al., "Plasma Clearance and Immunologic Properties of Long-Acting Superoxide Dismutase Prepared Using 35,000 to 120,000 Dalton Poly-Ethylene Glycol," Advances in Experimental Medicine and Biology, 1994, vol. 366, pp. 377-387.

Saito, S., "Coagulation and Peptization of Polyelectrolyte Solution by Detergent Ions. I," Kolloid-Zeitschrift, 1955, vol. 143, No. 2, 18 Pages.

Sakane T., et al., "Carboxyl-Directed Pegylation of Brain-Derived Neurotrophic Factor Markedly Reduces Systemic Clearance with Minimal Loss of Biologic Activity," Pharmaceutical Research, Plenum Publishing Corporation, United States, Aug. 1997, vol. 14, pp. 1085-1091.

Sartore L., et al., "Enzyme Modification by mPEG with an Amino Acid or Peptide as Spacer Arms," Applied Biochemistry and Biotechnology, Jan. 1991, vol. 27, No. 1, pp. 45-54.

Savoca K., et al., "Induction of Tolerance in Mice by Uricase and Monomethoxypolyethylene Glycol-Modified Uricase," International Archives of Allergy and Applied Immunology, 1984, vol. 75, pp. 58-67.

Scandella, C.J., et al., "A Membrane-Bound Phospholipase AI Purified from *Escherichia coli*," Biochemistry, Nov. 23, 1971, vol. 10, No. 24, pp. 4447-4456.

Schiavon O., et al., "Therapeutic Proteins: A Comparison of Chemical and Biological Properties of Uricase Conjugated to Linear or Branched Poly(Ethylene Glycol) and Poly(N-Acryloylmorpholine)," II Farmaco, Apr. 2000, vol. 55, No. 4, pp. 264-269.

Schinzel R., et al., "The Phosphate Recognition Site of *Escherichia coli* Maltodextrin Phosphorylase," Federation of European Biochemical Societies, Jul. 1991, vol. 286, No. 1, 2, pp. 125-128.

Schlensinger et al., "Enhancing the response rate to recombinant uricases in patients with gout," BioDrugs, Mar. 2022, 36(2), pp. 95-103.

Schlensinger et al., "Pegloticase," Nature Reviews: Drug Discovery, vol. 10, Jan. 2011, pp. 17-18.

Schlesinger et al., "Evaluation of proposed criteria for remission and evidence-based development of criteria for complete response in patients with chronic refractory gout," ACR Open Rheumatology, Jun. 2019, vol. 1, No. 4, pp. 236-243, doi: 10.1002/acr2.1025.

Schumacher H.R., et al., "Effects of Febuxostat Versus Allopurinol and Placebo in Reducing Serum Urate in Subjects with Hyperuricemia and Gout: A 28-Week, Phase III, Randomized, Double-Blind, Parallel-Group Trial," Arthritis & Rheumatism (Arthritis Care & Research), Nov. 15, 2008, vol. 59, No. 11, pp. 1540-1548.

Schumacher, H.R., et al., "Outcome Evaluations in Gout," The Journal of Rheumatology, Jun. 2007, vol. 34, No. 6, pp. 1381-1385, XP008158539.

Scott, J., "The Precipitation of Polyanions by Long-Chain Aliphatic Ammonium Salts," Journal of Biochemistry, 1961, vol. 81, pp. 418-424.

Scott, J., "The Reaction of Long-Chain Quarternary Ammonium Salts with Acidic Polysaccharides," Chemistry and Industry, Feb. 12, 1955, pp. 168-169.

Scott, J., "The Solubility of Cetylpyridinium Complexes of Biological Polyanions in Solution of Salts," Biochimica et Biophysica Acta, Nov. 1955, vol. 18, pp. 428-429.

Scott, J.E., "Aliphatic Ammonium Salts in the Assay of Acidic Polysaccharides from Tissues," Methods of Biochemical Analysis, Jan. 1960, vol. 8, pp. 145-197.

Serafini-Fracassini A., et al., "The Protein-Polysaccharide Complex of Bovine Nasal Cartilage," Journal of Biochemistry, Nov. 1967, vol. 105, pp. 569-575.

Sharma B., "Immunogenicity of Therapeutic Proteins. Part 3: Impact of Manufacturing Changes," Biotechnology Advances, Elsevier Inc., Netherlands, Jan. 2007, vol. 25, pp. 325-331.

Shearwater Polymers Inc:, "Functionalized Biocompatible Polymers for Research and Pharmaceuticals," Shearwater Polymers, Inc., Catalog, Jul. 1997, 6 Pages.

Sherman, F., et al., "Methionine or Not Methionine at the Beginning of a Protein," Bio Essays, Jul. 1985, vol. 3, Issue 1, pp. 27-31.

Sherman, M., et al., "Conjugation of High-Molecular Weight Poly(ethylene glycol) to Cytokines: Granulocyte-Macrophage Colony-Stimulating Factors as Model Substrates," ACS Symposium Series 680, Poly(ethylene glycol), Chemistry and Biological Applications, Harris J.M., and Zaplipsky S., eds., American Chemical Society, Washington, DC, Aug. 5, 1997, pp. 155-169.

Sherman, M., et al., "PEG-Uricase in the Management of Treatment-Resistant Gout and Hyperuricemia," Advanced Drug Delivery Reviews, Jan. 3, 2008, vol. 60, No. 1, pp. 59-68.

Shoji A., et al., "A Retrospective Study of the Relationship Between Serum Urate Level and Recurrent Attacks of Gouty Arthritis: Evidence for Reduction of Recurrent Gouty Arthritis With Antihyperuricemic Therapy," Arthritis & Rheumatology, Jun. 15, 2004, vol. 51, No. 3, pp. 321-325.

Sigma Catalog, p. 1008, Product Nos. U 3250, 292-8, U3500, U 9375 or U 3377, (1993), 2 pages.

Sigma Genosys: "Designing Custom Peptides," Accessed on Dec. 16, 2004, pp. 1-2.

Smith T., et al., "Human Lung Tryptase," Journal of Biological Chemistry, Sep. 10, 1984, vol. 259, No. 17, pp. 11046-11051.

Smolenska et al., "Effect of methotrexate on blood purine and pyrimidine levels in patients with rheumatoid arthritis," Rheumatology, Oct. 1999, vol. 38, No. 10, pp. 997-1002.

Somack R., et al., "Preparation of Long-Acting Superoxide Dismutase Using High Molecular Weight Polyethylene Glycol (41,000-72,000 Daltons)," Free Radical Research Communications, Harwood Academic Publishers GmBH, Germany, 1991, vol. 12-13, pp. 553-562.

Sorensen L.B., "Suppression of the Shunt Pathway in Primary Gout by Azathioprine," Proceedings of the National Academy of Science of the USA, Mar. 1966, vol. 55, No. 3, pp. 571-575.

Sparks et al., "Effect of Low-Dose Methotrexate on eGFR and Kidney Adverse Events: A Randomized Clinical Trial," Journal of the American Society of Nephrology, Dec. 2021, 32(12):3197-3207.

Stamp et al., "Expert opinion on emerging urate-lowering therapies," Expert Opinion on Emerging Drugs, vol. 23, 2018, pp. 201-209.

(56) References Cited

OTHER PUBLICATIONS

Strand et al., "Immunogenicity of Biologics in Chronic Inflammatory Diseases: A Systematic Review," BioDrugs, Aug. 2017, 31(4):299-316.
Streuli, et al., "Target Cell Specificity of Two Species of Human Interferon—a Produced in *Escherichia coli* and of Hybrid Molecules Derived from them," Proceedings of the National Academy of Sciences, USA, Aug. 1981, vol. 85, pp. 5879-5883.
Sundy J., et al., "A Multicenter Longitudinal Study of Disease Characteristics in Patients With Treatment-Failure Gout," Presented at the Eular-Annual European Congress of Rheumatology, Amsterdam, Netherlands, Poster 518, Jun. 21-24, 2006, 1 Page.
Sundy J., et al., "A Phase 2 Study of Multiple Doses of Intravenous Polyethylene Glycol (PEG)-uricase in Patients with Hyperuricemia and Refractory Gout," Presented at the EULAR—Annual European Congress of Rheumatology, Amsterdam, Netherlands, Poster 516, Jun. 21-24, 2006, 1 Page.
Sundy, J., et al., "A Phase I Study of Pegylated-Uricase (Puricase. RTM.) in Subjects with Gout," Presented at American College of Rheumatology Annual Scientific Meeting at San Antonio, TX, on Oct. 16-21, 2004, Poster 807, 1 page.
Sundy J., et al., "Efficacy and Tolerability of Pegloticase for the Treatment of Chronic Gout in Patients Refractory to Conventional Treatment: Two Randomized Controlled Trials," American Medical Association, Aug. 17, 2011, vol. 306, No. 7, pp. 711-720.
Sundy J., et al., "Pharmacokinetics and Pharmacodynamics of Intravenous PEGylated Recombinant Mammalian Urate Oxidase in Patients With Refractory Gout," Arthritis & Rheumatology, Mar. 2007, vol. 56, No. 3, pp. 1021-1028.
Sundy J., et al., "Quality of Life in Patients With Treatment-Failure Gout," Presented at the EULAR-Annual European Congress of Rheumatology, Amsterdam, Netherlands, Poster 517, Jun. 21-24, 2006, 1 Page.
Sundy J., et al., "Reduction of Plasma Urate Levels Following Treatment with Multiple Doses of Pegloticase in Patients with Treatment-Failure Gout," Arthritis & Rheumatism, Sep. 2008, vol. 58, No. 9, pp. 2882-2891.
Sundy J., et al., "Uricase and Other Novel Agents for the Management of Patients With Treatment-Failure Gout," Current Rheumatology Reports, Jun. 2007, vol. 9, No. 3, pp. 258-264.
Sundy, J.S., et al., "A Phase 2 Study of Multiple Doses of Intravenous Polyethylene Glycol (PEG)-uricase in Patients with Hyperuricemia and Refractory Gout," Presented at American College of Rheumatology 2005 Annual Scientific Meeting at San Diego, CA, #1836 on Nov. 13-17, 2005, 51 pages.
Sundy S., et al., Arthritis & Rheumatism, Sep. 2005, vol. 52, No. 9 (Supplement), Abstract Supplement, Annual Scientific Meeting, San Diego, California, Nov. 12-17, 2005, Abstract #1836, 3 Pages.
Sutterlin, et al., "Mixtures of Quaternary Ammonium Compounds and Anionic Organic Compounds in the Aquatic Environment: Elimination and Biodegradability in the Closed Bottle Test Monitored by LC-MS/MS," Chemosphere, Jun. 2008, vol. 72, No. 3, pp. 479-484, Abstract only.
Suzuki, H., et al., "Soybean Nodule-Specific Uricase (Nodulin-35) is Expressed and Assembled into a Functional Tetrameric Holoenzyme in *Escherichia coli*," Plant Physiology, American Society of Plant Physiologists, United States, Feb. 1991, vol. 95, pp. 384-389.
Takeda, et al., "Construction of Chimaeric Processed Immunoglobulin Genes Containing Mouse Variable and Human Constant Region Sequences," Nature, Apr. 4, 1985, vol. 314, pp. 452-454.
Talkington et al., "High MW polyethylene glycol prolongs circulation of pegloticase in mice with anti-PEG antibodies," Journal of Controlled Release, vol. 338, Oct. 10, 2021, pp. 804-812.
Terkeltaub R., "Gout", Clinical Practice, The New England Journal of Medicine, 2003, vol. 349, No. 17, pp. 1647-1655.
"The @US_FDA's decision on the co-treatment of pegloticase (#Krystexxa) plus methotrexate (#MTX) for patients with uncontrolled #gout was based on the phase 4 Mirror clinical trial," HCPLive Tweet Twitter, Jul. 8, 2022, 1 page.

"The @US_FDA expanded the #pegloticase label to include the co-treatment of pegloticase (Krystexxa) injection plus methotrexate in patients with uncontrolled #gout. @HorizonNews," Rheumatology Network Tweet Tweeter, Jul. 8, 2022, 1 page.
Thomas et al., "Comparative Immunogenicity of TNF Inhibitors: Impact on Clinical Efficacy and Tolerability in the Management of Autoimmune Diseases. A Systematic review and Meta-Analysis," BioDrugs 29, Aug. 2015, pp. 241-258.
Tla S., et al., "Urate Oxidase from Pig Liver: Biochemical and Immunological Properties," Prikl Biokhim Mikrobiol, Izdatesltvo Nauka, Russia, Jul. 1, 1978, vol. 14, pp. 533-542.
Tomanee P., et al., "Fractionation of Protein, RNA, and Plasmid DNA in Centrifugal Precipitation Chromatography Using Cationic Surfactant CTAB Containing Inorganic Salts NaCl and NH4Cl," Wiley InterScience, Sep. 9, 2004, 8 Pages, DOI: 10.1002/bit.20203.
Top 10 Home Remedies: "How to Control Uric Acid Levels," Accessed on Sep. 22, 2015, pp. 1-6, Retrieved from URL: http://www.top10homeremedies.com/how-to/control-uric-acid-levels.html.
Treuheit M., et al., "Inverse Relationship of Protein Concentration and Aggregation," Pharmaceutical Research, Plenum Publishing Corporation, United States, Apr. 2002, vol. 19, pp. 511-516.
Truscoe R., "Effect of Detergents on Extraction and Activity of Ox-Kidney Urate Oxidase," Enzymologia, Jul. 31, 1967, vol. 33, pp. 119-132.
Truscoe R., et al, "Effect of pH on Extraction and Activity of Ox-kidney Urate Oxidase," Biochimica et Biophysica Acta, Elsevier Publishing Co., Netherlands, Jul. 8, 1964, vol. 89, pp. 179-182.
Tsuji J., et al., "Studies on Antigenicity of the Polyethylene Glycol (PEG)-Modified Uricase," International Journal of Immunopharmacology, Elsevier Science, 1985, vol. 7, No. 5, pp. 725-730.
Tsunasawa S., et al., "Amino-terminal Processing of Mutant Forms of Yeast Iso-1-cytochrome c, the Specificities of Methionine Aminopeptidase and Acetyltransferase," The Journal of Biological Chemistry, May 10, 1985, vol. 260, No. 9, pp. 5382-5391.
Tutton, R. et. al., "Pharmacogenomic Biomarkers in Drug Labels: What do they tell us?," Pharmacogenomics, Feb. 2014, 15(3), pp. 297-304.
U.S. Trademark Registration No. 2,246,623, entitled "Puricase," filed on Jul. 15, 1997, 1 Page.
Varelas J., et al., "Expression and Characterization of a Single Recombinant Proteoglycan Tandem Repeat Domain of Link Protein That Binds Zinc and Hyaluronate," Archives of Biochemistry and Biophysics, Aug. 1, 1995, vol. 321, No. 1, pp. 21-30.
Venkataseshan V., et al., "Acute Hyperuricemic Nephropathy and Rental Failure after Transplantation," Nephron, Karger AG, Switzerland, 1990, vol. 56, pp. 317-321.
Verhoef et al., "Potential induction of anti-PEG antibodies and complement activation toward PEGylated therapeutics," Drug Discovery Today, vol. 19, Issue 12, Dec. 2014, pp. 1945-1952.
Verma et al., "Folate Conjugated Double Liposomes Bearing Prednisolone and Methotrexate for Targeting Rheumatoid Arthritis," Pharmaceutical Research, Aug. 2019, 36(8):123, pp. 1-13.
Vermeire et al., "Effectiveness of concomitant immunosuppresive therapy in suppressing the formation of antibodies to infliximab in Crohn's disease," Gut, Jan. 2007, vol. 56, pp. 1226-1231.
Veronese F., "Branched and Linear Poly(Ethylene) Glycol: Influence of the Polymer Structure on Ezymological, Pharmacokinetic, and Immunological Properties of Protein Conjugates," Journal of Bioactive and Compatible Polymers, Tectonic Publishing Co., Inc., United States, Jul. 1, 1997, vol. 12, pp. 196-207.
Veronese F., et al., "New Synthetic Polymers for Enzyme and Liposome Modification," In: ACS Symposium Series 580, Poly(Ethylene Glycol) Chemistry and Biological Applications, Harris J.M., and Zaplipsky S., eds., American Chemical Society, Washington, D.C., 1997, pp. 182-192.
Veronese F., et al., "Surface Modification of Proteins. Activation of Monomethoxy-Polyethylene Glycols by Phenylchloroformates and Modification of Ribonuclease and Superoxide Dismutase," Applied Biochemistry and Biotechnology, The Humana Press, Inc., United States, Apr. 1985, vol. 11, pp. 141-152.

(56) References Cited

OTHER PUBLICATIONS

Veronese F.M., et al., "Preface: Introduction and Overview of Peptide and Protein Pegylation," Advanced Drug Delivery Reviews, 2002, vol. 54, pp. 453-456.
Voet D., et al., Biochemistry, Second Edition, John Wiley & Sons, Inc., Apr. 1995, pp. 235-241.
Voshaar M. et al., "Dutch Translation and Cross-Cultural Adaptation of the Promis Physical Function Item Bank and Cognitive Pre-Test in Dutch Arthritis Patients," Arthritis Research & Therapy, Mar. 5, 2012, vol. 14, No. 2, 7 Pages.
Wallrath L., et al., "Molecular Characterization of the *Drosophila melanogaster* Rate Oxidase Gene, an Ecdysone-Repressible Gene Expressed Only in the Malpighian Tubules," Molecular and Cellular Biology, American Society for Microbiology, United States, Oct. 1990, vol. 10, pp. 5114-5127.
Waltrip R., et al., "Pharmacokinetics and Pharmacodynamics of Peg-Uricase in Patients With Hyperuricemia and Treatment Failure Gout," Presented at the Eular—Annual European Congress of Rheumatology, Barcelona, Spain, Poster 358, Jun. 13-16, 2007, 2 Pages.
Waltrip R., et al., "Weekly Flare Burden Index: A New Metric for Evaluating Gout Treatment," Annals of the Rheumatic Diseases, 2007, vol. 66 (Suppl II), Abstract 748, p. 624.
Wang L., et al., "Purification and Characterization of Uricase, a Nitrogen-Regulated Enzyme, from Neurospora Crassa," Archives of Biochemistry and Biophysics, Academic Press, Inc., United States, Apr. 15, 1980, vol. 201, pp. 185-193.
Wang X., et al., "Rat Urate Oxidase: Cloning and Structural Analysis of the Gene and 5'-Flanking Region," Gene, Elsevier Science Publishers B.V., The Netherlands, Jan. 15, 1991, vol. 97, pp. 223-229.
Wang X.D., et al., NCBI Entrez Protein (PRF) Database, Deposited Sequence for Rat Urate Oxidase (NP 446220), National Library of Medicine, National institutes of Health, Accession No. 20127395, Accessed at http://www.ncbi.nlm.nih.gov/protein/20127395, Accessed on Dec. 10, 2003, 2 pages.
Ward E.S., et al., "Binding Activities of a Repertoire of Single Immunoglobulin Variable Domains Secreted from *Escherichia coli*," Nature, Oct. 12, 1989, vol. 341, No. 6242, pp. 544-546.
Watanabe T., et al., "A Simple Purification Method for Rat Liver Urate Oxidase," Analytical Biochemistry, Academic Press, Inc., United States, Sep. 1978, vol. 89, No. 2, pp. 343-347.
WHO Drug Information, vol. 21, No. 4, 2007, List 98, p. 344.
Wortmann R., et al., "Gout and Hyperuricemia," Kelley's Textbook of Rheumatology, Edited by Ruddy S., Harris E., Sledge C., 6th edn. St. Louis: W.B. Saunders, 2001, pp. 1339-1371.
Wu, E.Q., et al., "Comorbidity Burden, Healthcare Resource Utilization, and Costs in Chronic Gout Patients Refractory to Conventional Urate-Lowering Therapy," American Journal of Therapeutics, Nov. 2012, vol. 19, No. 6, pp. e157-e166.
Wu X., et al., "Hyperuricemia and Urate Nephropathy in Urate Oxidase-Deficient Mice," Proceedings of the National Academy of Sciences, USA, National Academy of Sciences, United States, Jan. 18, 1994, vol. 91, No. 2, pp. 742-746.
Wu X., et al., "Two Independent Mutational Events in the Loss of Urate Oxidase during Hominoid Evolution," Journal of Molecular Evolution, Springer-Verlag, Germany, Jan. 1992, vol. 34, No. 1, pp. 78-84.
Wu X., et al., "Urate Oxidase: Primary Structure and Evolutionary Implications," Proceedings of the National Academy of Sciences, USA, Dec. 1989, vol. 86, No. 23, pp. 9412-9416.
Wuthrich, H. et al., "Guidelines for the Treatment of Gout: A Swiss Perspective," Swiss Medical Weekly 146, (Year: 2016), pp. 1-7.
Yamamoto K., et al., "Nucleotide Sequence of the Uricase Gene from *Bacillus* sp. TB-90," Journal of Biochemistry, Oxford University Press, England, Jan. 1996, vol. 119, No. 1, pp. 80-84.
Yamanaka H., et al., "Optimal Range of Serum Urate Concentrations to Minimize Risk of Gouty Attacks during Anti-Hyperuricemic Treatment," Advances in Experimental Medicine and Biology, 1998, vol. 431, pp. 13-18.
Yasuda Y., et al., "Biochemical and Biopharmaceutical Properties of Macromolecular Conjugates of Uricase with Dextran Polyethylene Glycol," Chemical and Pharmaceutical Bulletin, Pharmaceutical Society of Japan, Jul. 1990, vol. 38, No. 7, pp. 2053-2056.
Yeldandi A.V., et al., "Human Urate Oxidase Gene: Cloning and Partial Sequence Analysis Reveal a Stop Codon within the Fifth Exon," Biochemica et Biophysica Research Communication, Academic Press, United States, Sep. 14, 1990, vol. 171, No. 2, pp. 641-646.
Yelverton, E., et al., "Bacterial Synthesis of a Novel Human Leukocyte Interferon," Nucleic Acids Research, Feb. 11, 1981, vol. 9, No. 3, pp. 731-741.
Yokoyama S., et al., "Rapid Extraction of Uricase from Candida Utilis Cells by Use of Reducing Agent Plus Surfactant," Enzyme and Microbial Technology, Jan. 1988, vol. 10, No. 1, pp. 52-55.
Yue, C.S., et al., Population Pharmacokinetic and Pharmacodynamic Analysis of PEG-uricase in Subjects With Hyperuricemia and Refractory Gout, presented at the American College of Clinical Pharmacy 2006 Annual Meeting on Oct. 26-29, 2006 at St. Louis, Missouri, Poster., 1 page.
Zhang, T., et al., "Affinity Extraction of BSA with Reversed Micellar System Composed of Unbound Cibacron Blue," Biotechnology Progress, Nov.-Dec. 1999, vol. 15, No. 6, pp. 1078-1082.
Zhang, W., et al., "Forward and Backward Extraction of BSA using Mixed Reverse Micellar System of CTAB and Alkyl Halides," Biochemical Engineering Journal, Oct. 2002, vol. 12, No. 1, pp. 1-5.
Zhu J., et al., "Can Dynamic Contrast-Enhanced MRI (DCE-MRI) and Diffusion-Weighted MRI (DW-MRI) Evaluate Inflammation Disease," A Preliminary Study of Crohn's Disease, Medicine (Baltimore), Apr. 2016, vol. 95, No. 14, Article e3239, pp. 1-9.
International Application No. PCT/US2017/061126; International Preliminary Report on Patentability, date of issuance May 23, 2019; 7 pages.
International Application No. PCT/US2017/061126; International Search Report and Written Opinion of the International Searching Authority, date of mailing Feb. 20, 2018; 10 pages.
Liu, C. et al., "Prednisone in Uric Acid Lowering in Symptomatic Heart Failure Patients with Hyperuricemia (PUSH-PATH) Study", Can J Cardiol., 29(9):1048-54, (2013).
Majjhoo, A. et al., "Prophylaxis for Infusion Reactions to Pegloticase: An Analyis of Two Different Corticosteroid Pre-Infusion Regimens in US Community Rheumatology Practices", Arthritis & Rheumatology, vol. 68, NJ, USA: Wiley, Abstract (2016).
Majjhoo, A. et al., "Prophylaxis for Infusion Reactions to Pegloticase: An Analyis of Two Different Corticosteroid Pre-Infusion Regimens in US Community Rheumatology Practices", Arthritis & Rheumatology, vol. 68, NJ, USA: Wiley, Poster, (2016).
Reinders, M., "Practice Research in the Field of Gout: Clinical Pharmacology of Antihyperuricemic Drugs", University of Groningen, Doctoral Thesis, 152 pages; p. 18, table 2; p. 131, paragraph 2; (2008).
Alvarez-Hernandez et al., "Validation of the health assessment questionnaire disability index in patients with gout," Arthritis & Rheumatism, May 2008, vol. 59, No. 5, pp. 665-669.
Cipolleta E., et al., "Association between gout flare and subsequent cardiovascular events among patients with gout," JAMA, Aug. 2022, 328(5), pp. 440-450.
Cipolleta, E., et al., "Risk of venous thromboembolism with gout flares," Arthritis & Rheumatology, Feb. 2023, 75(9): 1638-1647.
Document "Study NCT03303989 as of Oct. 30, 2018" is a pdf of the webpage at ClinicaiTrials.gov at https://classic.clinicaltrials.gov/ct2/history/NCT03303989?A=7&8=7&C=merged#StudyPageTop documenting what was available online as of Oct. 30, 2018, accessed Sep. 14, 2023 (Year: 2018), 10 pages.
Van Groen et al., "Application of the health assessment questionnaire disability index to various rheumatic diseases," Quality of Life Research, Nov. 2010, 19, pp. 1255-1263.

\* cited by examiner

SEQUENCE LISTING

```
<160> NUMBER OF SEQ ID NOS: 8

<210> SEQ ID NO 1
<211> LENGTH: 303
<212> TYPE: PRT
<213> ORGANISM: Candida utilis

<400> SEQUENCE: 1

Met Ser Thr Thr Leu Ser Ser Ser Thr Tyr Gly Lys Asp Asn Val Lys
1               5                   10                  15

Phe Leu Lys Val Lys Lys Asp Pro Gln Asn Pro Lys Lys Gln Glu Val
            20                  25                  30

Met Glu Ala Thr Val Thr Cys Leu Leu Glu Gly Gly Phe Asp Thr Ser
        35                  40                  45

Tyr Thr Glu Ala Asp Asn Ser Ser Ile Val Pro Thr Asp Thr Val Lys
    50                  55                  60

Asn Thr Ile Leu Val Leu Ala Lys Thr Thr Glu Ile Trp Pro Ile Glu
```

```
                65                  70                  75                  80
Arg Phe Ala Ala Lys Leu Ala Thr His Phe Val Glu Lys Tyr Ser His
                    85                  90                  95

Val Ser Gly Val Ser Val Lys Ile Val Gln Asp Arg Trp Val Lys Tyr
                100                 105                 110

Ala Val Asp Gly Lys Pro His Asp His Ser Phe Ile His Glu Gly Gly
                115                 120                 125

Glu Lys Arg Ile Thr Asp Leu Tyr Tyr Lys Arg Ser Gly Asp Tyr Lys
            130                 135                 140

Leu Ser Ser Ala Ile Lys Asp Leu Thr Val Leu Lys Ser Thr Gly Ser
145                 150                 155                 160

Met Phe Tyr Gly Tyr Asn Lys Cys Asp Phe Thr Thr Leu Gln Pro Thr
                165                 170                 175

Thr Asp Arg Ile Leu Ser Thr Asp Val Asp Ala Thr Trp Val Trp Asp
                180                 185                 190

Asn Lys Lys Ile Gly Thr Val Tyr Asp Ile Ala Lys Ala Ala Asp Lys
                195                 200                 205

Gly Ile Phe Asp Asn Val Tyr Asn Gln Ala Arg Glu Ile Thr Leu Thr
            210                 215                 220

Thr Phe Ala Leu Glu Asn Ser Pro Ser Val Gln Ala Thr Met Phe Asn
225                 230                 235                 240

Met Ala Thr Gln Ile Leu Glu Lys Ala Cys Ser Val Tyr Ser Val Ser
                245                 250                 255

Tyr Ala Leu Pro Asn Lys His Tyr Phe Leu Ile Asp Leu Lys Trp Lys
                260                 265                 270

Gly Leu Glu Asn Asp Asn Glu Leu Phe Tyr Pro Ser Pro His Pro Asn
            275                 280                 285

Gly Leu Ile Lys Cys Thr Val Val Arg Lys Glu Lys Thr Lys Leu
            290                 295                 300

<210> SEQ ID NO 2
<211> LENGTH: 304
<212> TYPE: PRT
<213> ORGANISM: Sus scrofa

<400> SEQUENCE: 2

Met Ala His Tyr Arg Asn Asp Tyr Lys Lys Asn Asp Glu Val Glu Phe
1               5                   10                  15

Val Arg Thr Gly Tyr Gly Lys Asp Met Ile Lys Val Leu His Ile Gln
                20                  25                  30

Arg Asp Gly Lys Tyr His Ser Ile Lys Glu Val Ala Thr Ser Val Gln
            35                  40                  45

Leu Thr Leu Ser Ser Lys Lys Asp Tyr Leu His Gly Asp Asn Ser Asp
        50                  55                  60

Val Ile Pro Thr Asp Thr Ile Lys Asn Thr Val Asn Val Leu Ala Lys
65                  70                  75                  80

Phe Lys Gly Ile Lys Ser Ile Glu Thr Phe Ala Val Thr Ile Cys Glu
                85                  90                  95

His Phe Leu Ser Ser Phe Lys His Val Ile Arg Ala Gln Val Tyr Val
                100                 105                 110

Glu Glu Val Pro Trp Lys Arg Phe Glu Lys Asn Gly Val Lys His Val
            115                 120                 125

His Ala Phe Ile Tyr Thr Pro Thr Gly Thr His Phe Cys Glu Val Glu
        130                 135                 140
```

-continued

```
Gln Ile Arg Asn Gly Pro Pro Val Ile His Ser Gly Ile Lys Asp Leu
145                 150                 155                 160

Lys Val Leu Lys Thr Thr Gln Ser Gly Phe Glu Gly Phe Ile Lys Asp
            165                 170                 175

Gln Phe Thr Thr Leu Pro Glu Val Lys Asp Arg Cys Phe Ala Thr Gln
        180                 185                 190

Val Tyr Cys Lys Trp Arg Tyr His Gln Gly Arg Asp Val Asp Phe Glu
    195                 200                 205

Ala Thr Trp Asp Thr Val Arg Ser Ile Val Leu Gln Lys Phe Ala Gly
210                 215                 220

Pro Tyr Asp Lys Gly Glu Tyr Ser Pro Ser Val Gln Lys Thr Leu Tyr
225                 230                 235                 240

Asp Ile Gln Val Leu Thr Leu Gly Gln Val Pro Glu Ile Glu Asp Met
                245                 250                 255

Glu Ile Ser Leu Pro Asn Ile His Tyr Leu Asn Ile Asp Met Ser Lys
            260                 265                 270

Met Gly Leu Ile Asn Lys Glu Glu Val Leu Leu Pro Leu Asp Asn Pro
        275                 280                 285

Tyr Gly Arg Ile Thr Gly Thr Val Lys Arg Lys Leu Thr Ser Arg Leu
    290                 295                 300
```

<210> SEQ ID NO 3
<211> LENGTH: 304
<212> TYPE: PRT
<213> ORGANISM: Papio hamadryas

<400> SEQUENCE: 3

```
Met Ala Asp Tyr His Asn Asn Tyr Lys Lys Asn Asp Glu Leu Glu Phe
1               5                   10                  15

Val Arg Thr Gly Tyr Gly Lys Asp Met Val Lys Val Leu His Ile Gln
            20                  25                  30

Arg Asp Gly Lys Tyr His Ser Ile Lys Glu Val Ala Thr Ser Val Gln
        35                  40                  45

Leu Thr Leu Ser Ser Lys Lys Asp Tyr Leu His Gly Asp Asn Ser Asp
    50                  55                  60

Ile Ile Pro Thr Asp Thr Ile Lys Asn Thr Val His Val Leu Ala Lys
65                  70                  75                  80

Phe Lys Gly Ile Lys Ser Ile Glu Ala Phe Gly Val Asn Ile Cys Glu
                85                  90                  95

Tyr Phe Leu Ser Ser Phe Asn His Val Ile Arg Ala Gln Val Tyr Val
            100                 105                 110

Glu Glu Ile Pro Trp Lys Arg Leu Glu Lys Asn Gly Val Lys His Val
        115                 120                 125

His Ala Phe Ile His Thr Pro Thr Gly Thr His Phe Cys Glu Val Glu
    130                 135                 140

Gln Leu Arg Ser Gly Pro Pro Val Ile Thr Ser Gly Ile Lys Asp Leu
145                 150                 155                 160

Lys Val Leu Lys Thr Thr Gln Ser Gly Phe Glu Gly Phe Ile Lys Asp
                165                 170                 175

Gln Phe Thr Thr Leu Pro Glu Val Lys Asp Arg Cys Phe Ala Thr Gln
            180                 185                 190

Val Tyr Cys Lys Trp Arg Tyr His Gln Cys Arg Asp Val Asp Phe Glu
        195                 200                 205

Ala Thr Trp Gly Thr Ile Arg Asp Leu Val Leu Glu Lys Phe Ala Gly
    210                 215                 220
```

```
Pro Tyr Asp Lys Gly Glu Tyr Ser Pro Ser Val Gln Lys Thr Leu Tyr
225                 230                 235                 240

Asp Ile Gln Val Leu Ser Leu Ser Arg Val Pro Glu Ile Glu Asp Met
            245                 250                 255

Glu Ile Ser Leu Pro Asn Ile His Tyr Phe Asn Ile Asp Met Ser Lys
        260                 265                 270

Met Gly Leu Ile Asn Lys Glu Glu Val Leu Leu Pro Leu Asp Asn Pro
    275                 280                 285

Tyr Gly Lys Ile Thr Gly Thr Val Lys Arg Lys Leu Ser Ser Arg Leu
290                 295                 300
```

<210> SEQ ID NO 4
<211> LENGTH: 304
<212> TYPE: PRT
<213> ORGANISM: Artificial Sequence
<220> FEATURE:
<223> OTHER INFORMATION: PKS chimera

<400> SEQUENCE: 4

```
Met Ala His Tyr Arg Asn Asp Tyr Lys Lys Asn Asp Glu Val Glu Phe
1               5                   10                  15

Val Arg Thr Gly Tyr Gly Lys Asp Met Ile Lys Val Leu His Ile Gln
            20                  25                  30

Arg Asp Gly Lys Tyr His Ser Ile Lys Glu Val Ala Thr Ser Val Gln
        35                  40                  45

Leu Thr Leu Ser Ser Lys Lys Asp Tyr Leu His Gly Asp Asn Ser Asp
    50                  55                  60

Val Ile Pro Thr Asp Thr Ile Lys Asn Thr Val Asn Val Leu Ala Lys
65                  70                  75                  80

Phe Lys Gly Ile Lys Ser Ile Glu Thr Phe Ala Val Thr Ile Cys Glu
                85                  90                  95

His Phe Leu Ser Ser Phe Lys His Val Ile Arg Ala Gln Val Tyr Val
            100                 105                 110

Glu Glu Val Pro Trp Lys Arg Phe Glu Lys Asn Gly Val Lys His Val
        115                 120                 125

His Ala Phe Ile Tyr Thr Pro Thr Gly Thr His Phe Cys Glu Val Glu
    130                 135                 140

Gln Ile Arg Asn Gly Pro Pro Val Ile His Ser Gly Ile Lys Asp Leu
145                 150                 155                 160

Lys Val Leu Lys Thr Thr Gln Ser Gly Phe Glu Gly Phe Ile Lys Asp
                165                 170                 175

Gln Phe Thr Thr Leu Pro Glu Val Lys Asp Arg Cys Phe Ala Thr Gln
            180                 185                 190

Val Tyr Cys Lys Trp Arg Tyr His Gln Gly Arg Asp Val Asp Phe Glu
        195                 200                 205

Ala Thr Trp Asp Thr Val Arg Ser Ile Val Leu Gln Lys Phe Ala Gly
    210                 215                 220

Pro Tyr Asp Lys Gly Glu Tyr Ser Pro Ser Val Gln Lys Thr Leu Tyr
225                 230                 235                 240

Asp Ile Gln Val Leu Thr Leu Gly Gln Val Pro Glu Ile Glu Asp Met
            245                 250                 255

Glu Ile Ser Leu Pro Asn Ile His Tyr Leu Asn Ile Asp Met Ser Lys
        260                 265                 270

Met Gly Leu Ile Asn Lys Glu Glu Val Leu Leu Pro Leu Asp Asn Pro
    275                 280                 285
```

```
Tyr Gly Lys Ile Thr Gly Thr Val Lys Arg Lys Leu Ser Ser Arg Leu
        290                 295                 300
```

<210> SEQ ID NO 5
<211> LENGTH: 298
<212> TYPE: PRT
<213> ORGANISM: Artificial Sequence
<220> FEATURE:
<223> OTHER INFORMATION: PKS?N chimera

<400> SEQUENCE: 5

```
Asp Tyr Lys Lys Asn Asp Glu Val Glu Phe Val Arg Thr Gly Tyr Gly
1               5                   10                  15

Lys Asp Met Ile Lys Val Leu His Ile Gln Arg Asp Gly Lys Tyr His
            20                  25                  30

Ser Ile Lys Glu Val Ala Thr Ser Val Gln Leu Thr Leu Ser Ser Lys
        35                  40                  45

Lys Asp Tyr Leu His Gly Asp Asn Ser Asp Val Ile Pro Thr Asp Thr
    50                  55                  60

Ile Lys Asn Thr Val Asn Val Leu Ala Lys Phe Lys Gly Ile Lys Ser
65                  70                  75                  80

Ile Glu Thr Phe Ala Val Thr Ile Cys Glu His Phe Leu Ser Ser Phe
                85                  90                  95

Lys His Val Ile Arg Ala Gln Val Tyr Val Glu Glu Val Pro Trp Lys
            100                 105                 110

Arg Phe Glu Lys Asn Gly Val Lys His Val His Ala Phe Ile Tyr Thr
        115                 120                 125

Pro Thr Gly Thr His Phe Cys Glu Val Glu Gln Ile Arg Asn Gly Pro
    130                 135                 140

Pro Val Ile His Ser Gly Ile Lys Asp Leu Lys Val Leu Lys Thr Thr
145                 150                 155                 160

Gln Ser Gly Phe Glu Gly Phe Ile Lys Asp Gln Phe Thr Thr Leu Pro
                165                 170                 175

Glu Val Lys Asp Arg Cys Phe Ala Thr Gln Val Tyr Cys Lys Trp Arg
            180                 185                 190

Tyr His Gln Gly Arg Asp Val Asp Phe Glu Ala Thr Trp Asp Thr Val
        195                 200                 205

Arg Ser Ile Val Leu Gln Lys Phe Ala Gly Pro Tyr Asp Lys Gly Glu
    210                 215                 220

Tyr Ser Pro Ser Val Gln Lys Thr Leu Tyr Asp Ile Gln Val Leu Thr
225                 230                 235                 240

Leu Gly Gln Val Pro Glu Ile Glu Asp Met Glu Ile Ser Leu Pro Asn
                245                 250                 255

Ile His Tyr Leu Asn Ile Asp Met Ser Lys Met Gly Leu Ile Asn Lys
            260                 265                 270

Glu Glu Val Leu Leu Pro Leu Asp Asn Pro Tyr Gly Lys Ile Thr Gly
        275                 280                 285

Thr Val Lys Arg Lys Leu Ser Ser Arg Leu
    290                 295
```

<210> SEQ ID NO 6
<211> LENGTH: 13
<212> TYPE: PRT
<213> ORGANISM: Artificial Sequence
<220> FEATURE:
<223> OTHER INFORMATION: Pig-TTKS (Fragment 44-56)

```
<400> SEQUENCE: 6

Ala Thr Thr Val Gln Leu Thr Leu Ser Ser Lys Lys Asp
1               5                   10

<210> SEQ ID NO 7
<211> LENGTH: 299
<212> TYPE: PRT
<213> ORGANISM: Artificial Sequence
<220> FEATURE:
<223> OTHER INFORMATION: Pig-TTKS-ΔN

<400> SEQUENCE: 7

Met Thr Tyr Lys Lys Asn Asp Glu Val Glu Phe Val Arg Thr Gly Tyr
1               5                   10                  15

Gly Lys Asp Met Ile Lys Val Leu His Ile Gln Arg Asp Gly Lys Tyr
            20                  25                  30

His Ser Ile Lys Glu Val Ala Thr Thr Val Gln Leu Thr Leu Ser Ser
        35                  40                  45

Lys Lys Asp Tyr Leu His Gly Asp Asn Ser Asp Val Ile Pro Thr Asp
    50                  55                  60

Thr Ile Lys Asn Thr Val Asn Val Leu Ala Lys Phe Lys Gly Ile Lys
65                  70                  75                  80

Ser Ile Glu Thr Phe Ala Val Thr Ile Cys Glu His Phe Leu Ser Ser
                85                  90                  95

Phe Lys His Val Ile Arg Ala Gln Val Tyr Val Glu Glu Val Pro Trp
            100                 105                 110

Lys Arg Phe Glu Lys Asn Gly Val Lys His Val His Ala Phe Ile Tyr
        115                 120                 125

Thr Pro Thr Gly Thr His Phe Cys Glu Val Glu Gln Ile Arg Asn Gly
    130                 135                 140

Pro Pro Val Ile His Ser Gly Ile Lys Asp Leu Lys Val Leu Lys Thr
145                 150                 155                 160

Thr Gln Ser Gly Phe Glu Gly Phe Ile Lys Asp Gln Phe Thr Thr Leu
                165                 170                 175

Pro Glu Val Lys Asp Arg Cys Phe Ala Thr Gln Val Tyr Cys Lys Trp
            180                 185                 190

Arg Tyr His Gln Gly Arg Asp Val Asp Phe Glu Ala Thr Trp Asp Thr
        195                 200                 205

Val Arg Ser Ile Val Leu Gln Lys Phe Ala Gly Pro Tyr Asp Lys Gly
    210                 215                 220

Glu Tyr Ser Pro Ser Val Gln Lys Thr Leu Tyr Asp Ile Gln Val Leu
225                 230                 235                 240

Thr Leu Gly Gln Val Pro Glu Ile Glu Asp Met Glu Ile Ser Leu Pro
                245                 250                 255

Asn Ile His Tyr Leu Asn Ile Asp Met Ser Lys Met Gly Leu Ile Asn
            260                 265                 270

Lys Glu Glu Val Leu Leu Pro Leu Asp Asn Pro Tyr Gly Lys Ile Thr
        275                 280                 285

Gly Thr Val Lys Arg Lys Leu Ser Ser Arg Leu
    290                 295

<210> SEQ ID NO 8
<211> LENGTH: 298
<212> TYPE: PRT
<213> ORGANISM: Artificial Sequence
<220> FEATURE:
<223> OTHER INFORMATION: Pig-TTKS-ΔN without starting Met
```

-continued

```
<400> SEQUENCE: 8

Thr Tyr Lys Lys Asn Asp Glu Val Glu Phe Val Arg Thr Gly Tyr Gly
1               5                   10                  15

Lys Asp Met Ile Lys Val Leu His Ile Gln Arg Asp Gly Lys Tyr His
            20                  25                  30

Ser Ile Lys Glu Val Ala Thr Thr Val Gln Leu Thr Leu Ser Ser Lys
        35                  40                  45

Lys Asp Tyr Leu His Gly Asp Asn Ser Asp Val Ile Pro Thr Asp Thr
    50                  55                  60

Ile Lys Asn Thr Val Asn Val Leu Ala Lys Phe Lys Gly Ile Lys Ser
65              70                  75                  80

Ile Glu Thr Phe Ala Val Thr Ile Cys Glu His Phe Leu Ser Ser Phe
                85                  90                  95

Lys His Val Ile Arg Ala Gln Val Tyr Val Glu Glu Val Pro Trp Lys
                100                 105                 110

Arg Phe Glu Lys Asn Gly Val Lys His Val His Ala Phe Ile Tyr Thr
            115                 120                 125

Pro Thr Gly Thr His Phe Cys Glu Val Glu Gln Ile Arg Asn Gly Pro
    130                 135                 140

Pro Val Ile His Ser Gly Ile Lys Asp Leu Lys Val Leu Lys Thr Thr
145                 150                 155                 160

Gln Ser Gly Phe Glu Gly Phe Ile Lys Asp Gln Phe Thr Thr Leu Pro
                165                 170                 175

Glu Val Lys Asp Arg Cys Phe Ala Thr Gln Val Tyr Cys Lys Trp Arg
            180                 185                 190

Tyr His Gln Gly Arg Asp Val Asp Phe Glu Ala Thr Trp Asp Thr Val
    195                 200                 205

Arg Ser Ile Val Leu Gln Lys Phe Ala Gly Pro Tyr Asp Lys Gly Glu
210                 215                 220

Tyr Ser Pro Ser Val Gln Lys Thr Leu Tyr Asp Ile Gln Val Leu Thr
225                 230                 235                 240

Leu Gly Gln Val Pro Glu Ile Glu Asp Met Glu Ile Ser Leu Pro Asn
                245                 250                 255

Ile His Tyr Leu Asn Ile Asp Met Ser Lys Met Gly Leu Ile Asn Lys
            260                 265                 270

Glu Glu Val Leu Leu Pro Leu Asp Asn Pro Tyr Gly Lys Ile Thr Gly
    275                 280                 285

Thr Val Lys Arg Lys Leu Ser Ser Arg Leu
    290                 295
```

COMBINATION THERAPIES OF PREDNISONE AND URICASE MOLECULES AND USES THEREOF

CROSS REFERENCE TO RELATED APPLICATIONS

This application claims the benefit of U.S. Provisional Application No. 62/421,079, filed Nov. 11, 2016, the disclosure of which is hereby incorporated by reference in its entirety.

INCORPORATION OF SEQUENCE LISTING

The sequence listing that is contained in the file named "HOR0064401PC_ST25," which is 18.6 kilobytes as measured in Microsoft Windows operating system and was created on Nov. 10, 2017, is filed electronically herewith and incorporated herein by reference.

FIELD OF THE DISCLOSURE

The disclosure generally relates to methods for reducing an antibody response to uricase therapy for treatment of gout.

BACKGROUND OF THE DISCLOSURE

Hyperuricemia is a condition characterized by abnormally high level of uric acid in the blood. Uric acid (UA) is an end metabolite in the human purine catabolic pathway. Under physiological pH conditions, uric acid exists largely as urate, the ion form of UA. The amount of urate in the body depends on the balance between the amount of purines obtained by food intake, the amount of urate synthesized within the body, and the amount of urate that is excreted in urine or through the gastrointestinal tract. In humans, the upper end of the normal range is about 360 μmol/L (about 6 mg/dL) for women and about 400 μmol/L (about 6.8 mg/dL) for men. When the concentration of serum uric acid (SUA) is above the biochemical limit of solubility, e.g., about 6.8 mg/dL, monosodium urate crystals can precipitate in tissues. After years of persistent hyperuricemia, accumulation of monosodium urate crystals can cause symptoms of gout, such as acute inflammation of joints (gout flare), formation of gout tophi, gouty arthritis, and UA nephropathy (including UA renal stones). A total of about 8.3 million patients have been diagnosed with gout in the United States.

The need exists for improving therapies that decrease the level of uric acid in the blood, which can be used to treat hyperuricemia and related conditions.

SUMMARY OF THE DISCLOSURE

This disclosure is based, at least in part, on the discovery that a combination of a steroid and a uricase molecule improves treatment of hyperuricemia and related conditions in a subject, e.g., relative to a uricase molecule alone. In some embodiments, one or more treatment cycles, each treatment cycle comprising administration of a steroid and a uricase molecule. In some embodiments, the steroid molecule is administered prior to, concurrently with, or following the uricase molecule.

Without wishing to be bound by theory, the novel combinations disclosed herein are believed to increase the responsiveness of the subject to a uricase therapy, e.g., a therapy comprising the uricase molecule, e.g., by preventing, e.g., delaying and/or reducing, an infusion reaction. Accordingly, methods, compositions, dosage regimens, and kits are disclosed herein to improve the efficacy of a uricase therapy.

In one aspect, the disclosure provides a method of reducing uric acid levels in a subject in need thereof, comprising: administering to the subject a uricase molecule, and a steroid; wherein the uricase molecule and the steroid together reduce the uric acid levels in the subject to an extent greater than the reduction seen with administration of a uricase and/or steroid alone. In one embodiment, the steroid is administered prior to administration of the uricase molecule. In another embodiment, the steroid is administered 10 days, 9 days, 8 days, 7 days, 6 days, 5 days, 4 days, 4 days, 3 days, 2 days, 1 day, 18 hours, 12 hours, 6 hours, 4 hours, 2 hours, or 1 hour prior to administration of the uricase molecule. In another embodiment, the steroid is administered concurrently with the uricase molecule. In another embodiment, the steroid is administered after administration of the uricase molecule. In another embodiment, the steroid is administered 10 days, 9 days, 8 days, 7 days, 6 days, 5 days, 4 days, 4 days, 3 days, 2 days, 1 day, 18 hours, 12 hours, 6 hours, 4 hours, 2 hours, or 1 hour after administration of the uricase molecule.

In another aspect, the disclosure provides a method of reducing uric acid levels in a subject in need thereof, comprising: administering to the subject a uricase molecule and a steroid, wherein the uricase molecule is administered in a dose amount and/or frequency sufficient to reduce uric acid levels in the subject; discontinuing the administration of the uricase molecule after the uric acid levels are reduced in response to the uricase molecule; and administering a second non-uricase urate-lowering therapy after discontinuing the administration of the uricase molecule. In one embodiment, the second non-uricase urate-lowering therapy is an oral urate-lowering agent (ULA) selected from a xanthanine oxidase inhibitor, allopurinol, and febuxostat.

In another embodiment, the subject's serum uric acid level is ≤6 mg/dL after discontinuing the uricase molecule. In another embodiment, the subject's serum uric acid level is ≤6 mg/dL for six months or more after discontinuing the uricase molecule.

In another embodiment, the treatment period comprises administering a dose of the uricase molecule once every 4-10 days. In another embodiment, the treatment period comprises administering a dose of the uricase molecule once every 7 days. In another embodiment, the treatment period comprises: administering a first dose of the uricase molecule and a first dose of the steroid; and administering a subsequent dose of the uricase molecule and the steroid every 14 days thereafter for the duration of the treatment period. In another embodiment, the method further comprising administering an additional dose of the uricase molecule and the steroid 7 days after the first dose.

In another embodiment, the first dose of the uricase molecule is 12 mg, and the subsequent doses of the uricase molecule are 8 mg; and the first dose and the subsequent doses of the steroid are from about 40 mg to about 200 mg. In another embodiment, the first dose of the uricase molecule is 16 mg, and the subsequent doses of the uricase molecule are 8 mg; and the first dose and the subsequent doses of the steroid are from about 40 mg to about 200 mg. In another embodiment, the uricase molecule is administered at a dose of about 4 mg, about 5 mg, about 6 mg, about 7 mg, about 8 mg, about 12 mg, or about 16 mg; and the steroid is administered at a dose of from about 40 mg to about 200 mg. In another embodiment, the uricase molecule is administered at a dose of about 8 mg, and the steroid is administered at a dose of from about 40 mg to about 200 mg. In another embodiment, the first dose of the uricase molecule and the steroid is administered to patients weighing greater than 120 kg.

In another embodiment, the treatment period comprises administering 1 dose, 2 doses, 3 doses, 4 doses, or 5 doses of the uricase molecule and the steroid. In another embodiment, the treatment period comprises administering 3 doses of the uricase molecule and the steroid.

In another embodiment, the administration of the uricase and the steroid together decreases immune clearance of the uricase molecule, reduces antibody generation in response to the uricase molecule, reduces an immune response to the uricase molecule, increases immunosuppression, increase antigen-specific immunosuppression, and/or reduces an infusion reaction.

In another embodiment, the method comprises administering a dose of the uricase molecule and the steroid once every 11-18 days. In another embodiment, the method comprises administering a dose of the uricase molecule and the steroid once every 14 days.

In another embodiment, the method comprises: administering the uricase molecule at a dose of about 4 mg, about 5 mg, about 6 mg, about 7 mg, about 8 mg, or about 12 mg; and administering the steroid at a dose of from about 40 mg to about 200 mg. In another embodiment, the method comprises administering the uricase molecule at a dose of about 8 mg and the steroid at a dose of from about 40 mg to about 200 mg.

In another embodiment, the method comprises administering 4 doses, 5 doses, 6 doses, 7 doses, 8 doses, 9 doses, 10 doses, 11 doses, 12 doses, 24 doses, or 48 doses of the uricase molecule and the steroid. In another embodiment, the method comprises administering 4 doses of the uricase molecule and the steroid. In another embodiment, the method comprises administering 12 doses of the uricase molecule and the steroid.

In another embodiment, the serum uric acid levels are reduced to ≤6 mg/dL as a result of treatment with the uricase and the steroid. In another embodiment, the serum uric acid levels are reduced to ≤6 mg/dL for at least six months.

In another embodiment, the uricase molecule is a uricase conjugate. In another embodiment, the uricase conjugate comprises one or more of a polyether, polyester, polyamino acid, a polycarbonate, a polyacetal, a polyketal, a polysaccharide, or a combination thereof. In another embodiment, the polyether is selected from polyethylene glycol and polypropylene glycol.

In another embodiment, the uricase molecule comprises a fungal or microbial uricase. In another embodiment, the uricase is selected from *Aspergillus flavus, Arthrobacter globiformis, Bacillus* sp., and *Candida utilis* uricase. In another embodiment, the uricase molecule comprises an invertebrate uricase. In another embodiment, the uricase is selected from the group consisting of *Drosophila melanogaster* and *Drosophila pseudoobscura* uricase. In another embodiment, the uricase molecule comprises a plant uricase. In another embodiment, the uricase is from *Glycine max*. In another embodiment, the uricase molecule comprises a mammalian uricase. In another embodiment, the mammalian uricase is selected from the group consisting of a bovine, a porcine, an ovine, and a baboon uricase. In another embodiment, the uricase molecule comprises a chimeric uricase comprising amino acids from two or more mammalian uricases. In another embodiment, the uricase molecule comprises a recombinant pig-baboon chimeric uricase.

In another embodiment, the uricase molecule comprises a sequence that is at least 90% identical to SEQ ID NO:8. In another embodiment, the uricase molecule comprises the amino acid sequence of SEQ ID NO:8. In another embodiment, the uricase molecule comprises a uricase that is truncated by 3-10 amino acids at its amino terminus, its carboxy terminus, or both. In another embodiment, the uricase molecule comprises a uricase truncated by 4-13 amino acids at its amino terminus, its carboxy terminus, or both. In another embodiment, the uricase molecule comprises a uricase truncated by 6 amino acids at its amino terminus, its carboxy terminus, or both. In another embodiment, the uricase molecule comprises a pig uricase having the amino acid sequence of SEQ ID NO:2. In another embodiment, the uricase molecule comprises a pig uricase having the amino acid sequence of SEQ ID NO:2 modified by amino acid substitutions D7T, S46T, R291K, and T301S. In another embodiment, the uricase molecule comprises the amino acid sequence of any one of SEQ ID NO: 1, SEQ ID NO:2, SEQ ID NO:3, SEQ ID NO:4, SEQ ID NO:5, SEQ ID NO:6, SEQ ID NO:7, or SEQ ID NO:8.

In another embodiment, the uricase molecule is pegylated. In another embodiment, the uricase molecule comprises four identical non-covalently-bound uricase monomeric subunits. In another embodiment, the uricase molecule is a tetramer.

In another embodiment, the uricase molecule comprises the amino acid sequence of des-(1-6)-[7-threonine, 46-threonine, 291-lysine, 301-serine]pig-baboonuricase. In another embodiment, the uricase molecule comprises monomethoxypoly (ethylene glycol) modified recombinant mammalian uricase. In another embodiment, the uricase molecule is pegloticase (KRYSTEXXA®).

In another embodiment, the subject is hyperuricemic. In another embodiment, the subject has gout, chronic gout, refractory gout, or tophaceous gout. In another embodiment, the subject was previously treated with one or more of an oral urate-lowering therapy, a xanthanine oxidase inhibitor, allopurinol, and febuxostat. In another embodiment, the subject has a body weight≥ about 80 kg, 90 kg, 100 kg, 110 kg, or 120 kg. In another embodiment, the subject is ≥55, 60, 65, or 70 years old.

In another embodiment, the method includes ameliorating or reducing at least one symptom or measurable physiological parameter of hyperuricemia in the subject. In another embodiment, the method includes ameliorating or reducing at least one symptom or measurable physiological parameter of gout in the subject. In another embodiment, the method includes reducing the subject's uric acid levels, reducing incidence of gout flares, reducing inflammation of the joints, reducing formation of gout tophi, reducing gout arthritis, and/or reducing uric acid nephropathy. In another embodiment, the method includes reducing the subject's C-reactive protein levels. In another embodiment, the method includes reducing the subject's Health Assessment Questionnaire Disability Index (HAQ-DI). In another embodiment, the method includes ameliorating or reducing gout, chronic gout, refractory gout, or tophaceous gout. In another embodiment, the method includes delaying or preventing an infusion reaction in the subject. In another embodiment, the method includes reducing or preventing an antibody response to the uricase in the subject.

In another embodiment, the method further comprises administering at least one immunosuppressant prior to or concurrently with the administration of the uricase molecule. In another embodiment, the method further comprises administering at least one anti-inflammatory compound prior to or currently with the administration of the uricase molecule. In another embodiment, the inflammatory compound is selected from a corticosteroid, an antihistamine, colchicine, and a nonsteroidal anti-inflammatory drug (NSAID). In another embodiment, the corticosteroid is selected from the group consisting of predisone, hydrocortisone, methylprednisolone, Depo-Medrol, Solu-Medrol.

In another embodiment, the uricase molecule and the steroid are administered in a pharmaceutical composition. In another embodiment, the uricase molecule and the steroid are administered in a nanocarrier formulation. In another embodiment, the uricase molecule and the steroid are administered by intravenous infusion.

In another aspect, the disclosure provides a kit comprising: a uricase molecule; a steroid; and instructions for use in the methods described herein.

In another aspect, the disclosure provides a method of treating chronic gout in a subject, comprising: administering to the subject a uricase molecule and a steroid; wherein the uricase and the steroid together reduce uric acid levels in the subject.

In another aspect, the disclosure provides a method of treating chronic gout in a subject, comprising: administering to the subject a uricase molecule and a steroid, wherein the uricase molecule is administered in a dose amount and/or frequency sufficient to reduce uric acid levels in the subject; discontinuing the administration of the uricase molecule after the uric acid levels are reduced in response to the uricase molecule; and administering a second non-uricase urate-lowering therapy after discontinuing the administration of the uricase molecule.

Additional features and embodiments of the methods, compositions, dosage regimens, and kits disclosed herein include one or more of the following.

Combination Therapies/Administration

In some embodiments, a steroid is administered prior to, concurrently with, or following, a uricase conjugate. In some embodiments, the uricase conjugate may be administered at a dose of about 4 mg, about 5 mg, about 6 mg, about 7 mg, about 8 mg, or about 12 mg, e.g., about 8 mg.

In some embodiments, a steroid as described herein may be predisone, hydrocortisone, methylprednisolone, Depo-Medrol, Solu-Medrol. One of skill will recognize that any steroid may be useful in accordance with the disclosure as described herein, in order to achieve the desired results. For example, a prednisone molecule, e.g., the methylprednisolone, may be administered in an amount ranging from about 0.1 mg/kg to about 5 mg/kg, about 0.2 mg/kg to about 4 mg/kg, about 0.3 mg/kg to about 3 mg/kg, about 0.4 mg/kg to about 2 mg/kg, or about 0.5 mg/kg to about 1.5 mg/kg, or typically about 0.5 mg/kg, about 0.6 mg/kg, about 0.7 mg/kg, about 0.8 mg/kg, about 0.9 mg/kg, about 1.0 mg/kg, about 1.1 mg/kg, about 1.2 mg/kg, about 1.3 mg/kg, about 1.4 mg/kg, or about 1.5 mg/kg. In other embodiments, the methylprednisolone is administered as a flat dose, e.g., about 1 mg to about 500 mg, about 10 mg to about 400 mg, about 20 mg to about 300 mg, about 30 mg to about 200 mg, or about 50 mg to about 150 mg, or typically about 50 mg, about 60 mg, about 70 mg, about 80 mg, about 90 mg, about 100 mg, about 110 mg, about 120 mg, about 130 mg, about 140 mg, or about 150 mg.

In some embodiments, a steroid as described herein may be a hydrocortisone, a methylprednisolone, a prednisone, or any other steroid deemed appropriate in accordance with the present disclosure. In some embodiments, a methylprednisolone as described herein may be, for example, Depo-Medrol, Solu-Medrol, or the like. Dosages for a steroid as described herein may vary as appropriate. For example, hydrocortisone may be administered intravenously (IV) at a dose of 200 mg every two weeks immediately before pegloticase infusions. In some embodiments, methylprednisolone may be administered IV at a dose of 40 mg every two weeks immediately before pegloticase infusions. In some embodiments, methylprednisolone may be administered IV at a dose of 80 mg every two weeks immediately before pegloticase infusions. While such dosages may represent common dosages, one of skill in the art will recognize that other dosages may be give as appropriate and as deemed beneficial in accordance with the present disclosure.

In some embodiments, prednisone may be administered with pegloticase as a prophylactic treatment for gout flare in order to prevent gout flare. In such cases, prednisone may be administered orally (PO) at a dosage of 5 or 10 mg daily. As would be understood by one of skill in the art, in some embodiments, any route of administration may be used as appropriate for the particular drug treatment and/or dosage.

In some embodiments, the prednisone molecule, e.g., the methylprednisolone, is administered prior to the uricase molecule. In some embodiments, the prednisone molecule is administered about 10 minutes or more, about 20 minutes or more, about 30 minutes or more, about 40 minutes or more, about 50 minutes or more, about 1 hour or more, about 2 hours or more, or about 3 hours or more before administration of the uricase molecule. In other embodiments, the prednisone molecule is administered about 10 minutes, about 20 minutes, about 30 minutes, about 40 minutes, about 50 minutes, about 1 hour, about 2 hours, or about 3 hours before administration of the uricase molecule. In other embodiments, the administration of the prednisone molecule and the uricase molecule partially overlap.

In one embodiment, the prednisone molecule is administered intravenously (IV), intramuscularly (IM), by infusion (IV infusion), orally, rectally, or topically.

In some embodiments, the treatment cycle is repeated once every 11 days, 12 days, 13 days, 14 days, 15 days, 16 days, 17 days, or 18 days, e.g., every 14 days, e.g., every other week. In one embodiment, dosage regimen is repeated once every other week.

In some embodiments, the dosage regimen comprises one or more first treatment cycles of prednisone molecule and a uricase molecule, and one or more second treatment cycles of a uricase molecule without prednisone.

In some embodiments, dosage regimen includes 7, 10, 12, 24, 48, or more treatment cycles.

Uricase Molecules

In some embodiments, the uricase molecule is a naturally occurring uricase, or a variant of a naturally occurring uricase (e.g., a mutated form, a truncated form, fragment form, a chimeric form, or a derivative form).

In some embodiments, the uricase molecule is recombinant.

In some embodiments, the uricase molecule is a tetramer, e.g., a homotetramer.

In some embodiments, the uricase molecule is a mammalian uricase. In some embodiments, the uricase molecule is porcine, bovine, or ovine, or baboon uricase, or a chimeric combination thereof. In some embodiments, the uricase molecule comprises substantially the same sequence of porcine, bovine, ovine, or baboon uricase, or a chimeric combination thereof.

In some embodiments, the uricase molecule is a fungal or a microbial uricase, e.g., a yeast uricase. In some embodiments, the fungal or microbial uricase is from *Aspergillus*

*flavus, Arthrobacter globiformus,* or *Candida utilis,* or comprises substantially the same sequence as any of said fungal or microbial uricases.

In some embodiments, the uricase molecule is a plant uricase.

In some embodiments, the uricase molecule is a chimera. In some embodiments, the uricase molecule comprises a portion of porcine liver and baboon liver uricase.

In some embodiments, the uricase molecule comprises a mammalian uricase amino acid sequence truncated at the amino terminus or the carboxy terminus, or both, (e.g., by about 1-13 amino acids), said truncation being relative to a naturally occurring pig uricase having an amino acid sequence of SEQ ID NO:2. In some embodiments, the uricase molecule comprises an amino acid substitution with threonine at position 7 (D7T), an amino acid substitution with threonine at position 46 (S46T), an amino acid substitution with lysine at position 291 (R291K) and an amino acid substitution with serine at position 301 (T301S), said amino acid substitution being relative to a naturally occurring pig uricase having an amino acid sequence of SEQ ID NO:2.

In some embodiments, the amino terminal amino acid of the uricase molecule is alanine, glycine, proline, serine, or threonine. In some embodiments, the amino terminal amino acid of the uricase molecule is threonine.

In some embodiments, the uricase molecule comprises the amino acid sequence of des-(1-6)-[7-threonine, 46-threonine, 291-lysine, 301-serine]pig-baboon uricase.

In some embodiments, the uricase molecule comprises the amino acid sequence of SEQ ID NO:8, or an amino acid sequence substantially identical thereto (e.g., 95-98% identical).

In some embodiments, the uricase molecule comprises four identical non-covalently-bound uricase monomeric subunits.

In some embodiments, the uricase molecule is about 130-140 kDa, e.g., about 135-137 kDa (e.g., about 136.8 kDa).

In some embodiments, the uricase molecule further comprises a polymer. In some embodiments, the uricase molecule is in the form of a conjugate, e.g., a conjugate that includes a uricase sequence (e.g., a mutated form, a truncated form, fragment form, a chimeric form, of a uricase) coupled to, e.g., directly or indirectly (e.g., via a linker) to a polymer.

In some embodiments, the polymer comprises one or more of a polyether, polyester, polyamino acid, a polycarbonate, a polyacetal, a polyketal, a polysaccharide, or a combination thereof. In some embodiments, the polyether comprises polyethylene glycol or polypropylene glycol.

In some embodiments, the conjugate comprises 1 to 40 polymer molecules, e.g., polyethylene glycol molecules, per monomer of the uricase molecule. In other embodiments, the conjugate comprises 5 to 20 polymer molecules, e.g., polyethylene glycol molecules, per monomer of the uricase molecule. In further embodiments, the conjugate comprises 5 to 12 polymer molecules, e.g., polyethylene glycol molecules, per monomer of the uricase molecule. In some embodiments, the conjugate comprises about 10 polymer molecules, e.g., polyethylene glycol molecules, per monomer of the uricase molecule.

In some embodiments, each polymer molecule, e.g., polyethylene glycol molecule, has a molecular weight between about 1 kDa and 100 kDa. In other embodiments, each polymer molecule, e.g., polyethylene glycol molecule, has a molecular weight between about 5 kDa and 50 kDa. In further embodiments, each polymer molecule, e.g., polyethylene glycol molecule, has a molecular weight between about 5 kDa and 20 kDa. In some embodiments, each polymer molecule, e.g., polyethylene glycol molecule, has a molecular weight of about 10 kDa.

In some embodiments, the conjugate has a polymer weight of about 500-600 kDa, e.g., about 540-560 kDa.

In some embodiments, the conjugate the uricase molecule is derivatized using monomethoxypoly(ethylene glycol)-p-nitrophenyl carbonate (mPEG-NPC).

In some embodiments, the conjugate of the uricase molecule comprises a methoxy PEG (mPEG). In one embodiment, each uricase sequence includes a monomethoxypoly (ethylene glycol) (mPEG), e.g., a 5-50 kDa, e.g., a 10 kDa, mPEG moiety.

In some embodiments, the uricase molecule, e.g., the uricase conjugate, is in a pharmaceutical composition, e.g., formulation with a pharmaceutically acceptable carrier or excipient.

In some embodiments, the uricase molecule, e.g., the uricase conjugate, is in a nanocarrier formulation. In further embodiments, the nanocarrier formulation comprises a lipid nanoparticle, a liposome, a polymeric nanoparticle, a dendrimer, or a surfactant based emulsion. In additional embodiments, the polymeric nanoparticle comprises one or more of a polyether, polyester, polyamino acid, a polycarbonate, a polyacetal, a polyketal, a polysaccharide, or a combination thereof. In some embodiments, the polyether comprises polyethylene glycol or polypropylene glycol.

In further embodiments, the pharmaceutical composition, e.g., formulation, includes an immunosuppressant. In additional embodiments, the immunosuppressant is an mTOR inhibitor, e.g., rapamycin or a rapamycin analogue.

In some embodiments, the uricase molecule, e.g., the uricase conjugate, is pegloticase (KRYSTEXXA®).

Prednisone Molecule

In some embodiments, the prednisone molecule is prednisone, or a variant, metabolite or derivative thereof (including a pharmaceutically acceptable form thereof, e.g., a salt thereof).

In one embodiment, the prednisone molecule is compound 17,21-dihydroxypregna-1,4-diene-3,11,20-trione (IUPAC name), or a variant, metabolite or derivative thereof.

In one embodiment, the prednisone molecule is a methylated derivative of prednisone, e.g., meprednisone. In one embodiment, meprednisone is compound (16p)-17,21-dihydroxy-16-methylpregna-1,4-diene-3,11,20-trione (IUPAC name), or a variant, metabolite or derivative thereof (including a pharmaceutically acceptable form thereof, e.g., a salt thereof).

In one embodiment, the prednisone molecule is an active metabolite of prednisone. In one embodiment, the active metabolite of prednisone is prednisolone.

In some embodiments, the prednisone molecule is a prednisolone or a variant, metabolite or derivative thereof (including a pharmaceutically acceptable form thereof, e.g., a salt thereof), collectively referred to herein as a prednisolone molecule. In one embodiment, the prednisolone molecule is chosen from prednisolone acetate, methylprednisolone acetate, or methylprednisolone sodium succinate.

In one embodiment, the prednisolone molecule is compound (11β)-11,17,21-Trihydroxypregna-1,4-diene-3,20-dione (IUPAC name), or a variant, metabolite, or derivative thereof (including a pharmaceutically acceptable form thereof, e.g., a salt thereof). In another embodiment, the prednisolone molecule is a variant of prednisolone, methylated at carbon 6 of the B ring.

In yet another embodiment, the prednisolone molecule is methylprednisolone, e.g., is compound (1S,2R,8S,10S,11S,14R,15S,17S)-14,17-dihydroxy-14-(2-hydroxyacetyl)-2,8,15-trimethyltetracyclo[8.7.0.0$^{2,7}$.0$^{11,15}$]heptadeca-3,6-dien-5-one (IUPAC name), or a variant or derivative thereof (including a pharmaceutically acceptable form thereof, e.g., a salt thereof).

In some embodiments, the prednisone molecule is meprednisone, prednisolone, methylprednisolone, prednisolone acetate, methylprednisolone acetate, or methylprednisolone sodium succinate.

In one embodiment, the prednisone molecule or the prednisolone molecule is not hydrocortisone.

Additional Combination Therapies

In some embodiments, the combinations, e.g., treatment cycle, further include administering a colchicine or a non-steroidal anti-inflammatory drug. In some embodiments, the administration of the colchicine or the non-steroidal anti-inflammatory drug is started prior to administration of the uricase molecule, e.g., the uricase conjugate, e.g., 4 days, 5 days, 6 days, 7 days, 8 days, 9 days, or 10 days prior to administration of the uricase molecule, e.g., the uricase conjugate, e.g., 7 days prior to administration of the uricase molecule, e.g., the uricase conjugate. In some embodiments, colchicine is administered once a day, twice a day, or every other day, e.g., once a day. In further embodiments, colchicine is administered at a dose of 0.6 to 1.2 mg/day.

In some embodiments, the treatment cycle further comprises administering at least one additional anti-inflammatory compound prior to administration of the uricase molecule, e.g., the uricase conjugate. In further embodiments, the anti-inflammatory compound is selected from an antihistamine and a Nonsteroidal Anti-Inflammatory Drug (NSAID). In some embodiments, at least one corticosteroid, at least one antihistamine and at least one NSAID are administered. In some embodiments, the corticosteroid may include, but is not limited to, be predisone, hydrocortisone, methylprednisolone, Depo-Medrol, or Solu-Medrol.

In some embodiments, an NSAID is chosen from ibuprofen, indomethacin, naproxen, aspirin, acetaminophen, celecoxib or valdecoxib. In certain embodiments, the NSAID is acetaminophen. In some embodiments, acetaminophen is administered at a dosage of 500 to 1500 mg. In some embodiments, the acetaminophen is administered 1 to 4 hours prior to administration of the uricase molecule, e.g., the uricase conjugate.

In some embodiments, the antihistamine is selected from azatadine, brompheniramine, cetirizine, chlorpheniramine, clemastine, cyproheptadine, desloratadine, dexchlorpheniramine, dimenhydrinate, diphenhydramine, doxylamine, fexofenadine, hydroxyzine, loratadine and phenindamine. In certain embodiments, the antihistamine is fexofenadine. In some embodiments, fexofenadine is administered at a dosage of 30 to 180 mg. In certain embodiments, the fexofenadine is administered 1 to 4 hours prior to administration of the uricase molecule, e.g., the uricase conjugate. In some embodiments, the fexofenadine is administered the night before administration of the uricase molecule, e.g., the uricase conjugate.

Pharmaceutical Compositions

In some embodiments, the uricase molecule, e.g., the uricase conjugate, is administered by injection, e.g., subcutaneously or intravenously. In one embodiment, the uricase molecule, e.g., the conjugate, is administered by subcutaneous injection.

In some embodiments, the uricase molecule, e.g., the uricase conjugate, is provided in a pharmaceutical composition comprising about 4 to about 12, e.g., about 8, milligrams of conjugate per milliliter of solution. In some embodiments, uricase molecule, e.g., the uricase conjugate, e.g., 8 milligrams of conjugate, is dissolved into 250 milliliters of saline solution for infusion. In further embodiments, wherein the saline solution includes 0.45% or 0.9% sodium chloride.

In some embodiments, the uricase molecule, e.g., the uricase conjugate, is administered over a 100-200, e.g., 120, minute period.

Subjects

In some embodiments, the subject has or is likely to have hyperuricemia, e.g., gout. In some embodiments, the subject has chronic gout. In other embodiments, the subject has refractory or tophaceous gout. In further embodiments, the subject has, or has been identified as having, gout refractory to oral ULA therapy, e.g., has failed to normalize serum uric acid, and/or whose signs and symptoms are inadequately controlled with oral ULA therapy, e.g., xanthanine oxidase inhibitors.

In some embodiments, the subject is hyperuricemic, e.g., has a serum uric acid level ≥6 mg/dl.

In some embodiments, subject was previously treated with oral ULA, e.g., xanthanine oxidase inhibitors, allopurinol, or febuxostat.

In some embodiments, the subject treated shows hyperuricemia, e.g., the subject has gout. In certain embodiments, the subject is refractory, or has reduced responsiveness, to a urate lowering therapy, e.g., oral ULA. In one embodiment, the subject has, or is identified as having, a lower efficacy to a uricase therapy (e.g., shows increased incidence of anti-uricase antibodies (e.g., anti-pegloticase antibodies) and/or increased incidence of an infusion reaction in response to the uricase therapy).

Monitoring of Subjects

In some embodiments, the methods further include measuring the level of an antibody against the uricase molecule, e.g., the uricase conjugate, in the subject, e.g., a blood sample obtained from the subject. In some embodiments, the level of the antibody against the uricase molecule, e.g., the uricase conjugate, is measured by an immunosorbant assay, e.g., enzyme-linked immunosorbant assay (ELISA). In some embodiments, the level of the antibody against the uricase molecule, e.g., the uricase conjugate, is measured before administration of the conjugate, e.g., 72, 48, 24, 12, 6, 4, or 2 hours before administration of the uricase molecule, e.g., the uricase conjugate. In other embodiments, the level of the antibody against the uricase molecule, e.g., the uricase conjugate, is measured after administration of the uricase molecule, e.g., the uricase conjugate, e.g., 0.5, 1, 2, 3, 4, or 5 hours after administration of the uricase molecule, e.g., the uricase conjugate.

In some embodiments, the methods further include measuring the level of uric acid, e.g., a plasma or a serum uric acid level, in the subject. In some embodiments, the level of uric acid is measured before administration of the uricase molecule, e.g., the uricase conjugate, e.g., 72, 48, 24, 12, 6, 4, or 2 hours before administration of the uricase molecule, e.g., the uricase conjugate, e.g., a trough level of uric acid. In other embodiments, the level of uric acid is measured after administration of the uricase molecule, e.g., the uricase conjugate, e.g., 0.5, 1, 2, 3, 4, or 5 hours after administration of the uricase molecule, e.g., the uricase conjugate, e.g., a peak level of uric acid.

In some embodiments, the uric acid level, e.g., the serum or plasma uric acid level, is reduced in the subject relative to a reference, e.g., relative to an untreated subject, or the subject prior to treatment or after a previous treatment. In further embodiments, the uric acid level, e.g., the serum or plasma uric acid levels, is lowered to 6.8 mg/dl or less.

In some embodiments, the subject is a subject with gout refractory to oral ULA therapy, wherein administration of the uricase molecule, e.g., the uricase conjugate, is discontinued and oral ULA therapy is administered after discontinuation of the uricase molecule, e.g., the uricase conjugate, administration, and wherein the uricase molecule, e.g., the uricase conjugate, administration is for a time and in an amount such that the uric acid level of the subject remains below 6.8 mg/dl after discontinuation. In further embodiments, the uricase molecule, e.g., the uricase conjugate, administration is for a time and in an amount such that the uric acid level of the subject remains below 6.0 mg/dl. In some embodiments, the uricase molecule, e.g., the uricase conjugate, administration is for a time and in an amount such that the uric acid level of the subject remains below 6.8 mg/dl for 6 months or more after discontinuation.

In some embodiments, the uric acid level, e.g., the serum or plasma uric acid levels, is lowered to 6.0 mg/dl or less. In some embodiments, the uric acid level is measured before dose of the conjugate and the uric acid level is lowered to 6 mg/dl or less for 3 or more consecutive doses. In further embodiments, the uric acid level, e.g., the serum or the plasma uric acid level, is lowered to 5.0 mg/dl or less.

Headings or numbered or lettered elements, e.g., (a), (b), (i) etc, are presented merely for ease of reading. The use of headings or numbered or lettered elements in this document does not require the steps or elements be performed in alphabetical order or that the steps or elements are necessarily discrete from one another.

All publications, patent applications, patents, and other references mentioned herein are incorporated by reference in their entirety.

Other features, objects, and advantages of the disclosure will be apparent from the description and drawings, and from the claims.

BRIEF DESCRIPTION OF THE SEQUENCES

SEQ ID NO:1—Sequence of uricase from *Candida utilis*.
SEQ ID NO:2—Sequence of uricase from porcine.
SEQ ID NO:3—Sequence of uricase from baboon.
SEQ ID NO:4—Sequence of chimeric pig-K-S or PKS uricase.
SEQ ID NO:5—Sequence of Pig-KS-ΔN, which is the PKS uricase (SEQ ID NO:4) truncated by 6 amino acids at its amino terminus.
SEQ ID NO:6—Sequence of positions 44 to 56 of Pig-KS-ΔN (SEQ ID NO:5) with a threonine at position 46.
SEQ ID NO:7—Sequence of Pig-TTKS-ΔN, which is positions 8 to 287 of the amino acid sequence of Pig-KS-ΔN (SEQ ID NO:5).
SEQ ID NO:8—Sequence of Pig-TTKS-ΔN, which is positions 8 to 287 of Pig-KS-ΔN with the N-terminal methionine removed.

DETAILED DESCRIPTION OF THE DISCLOSURE

Figure 1:
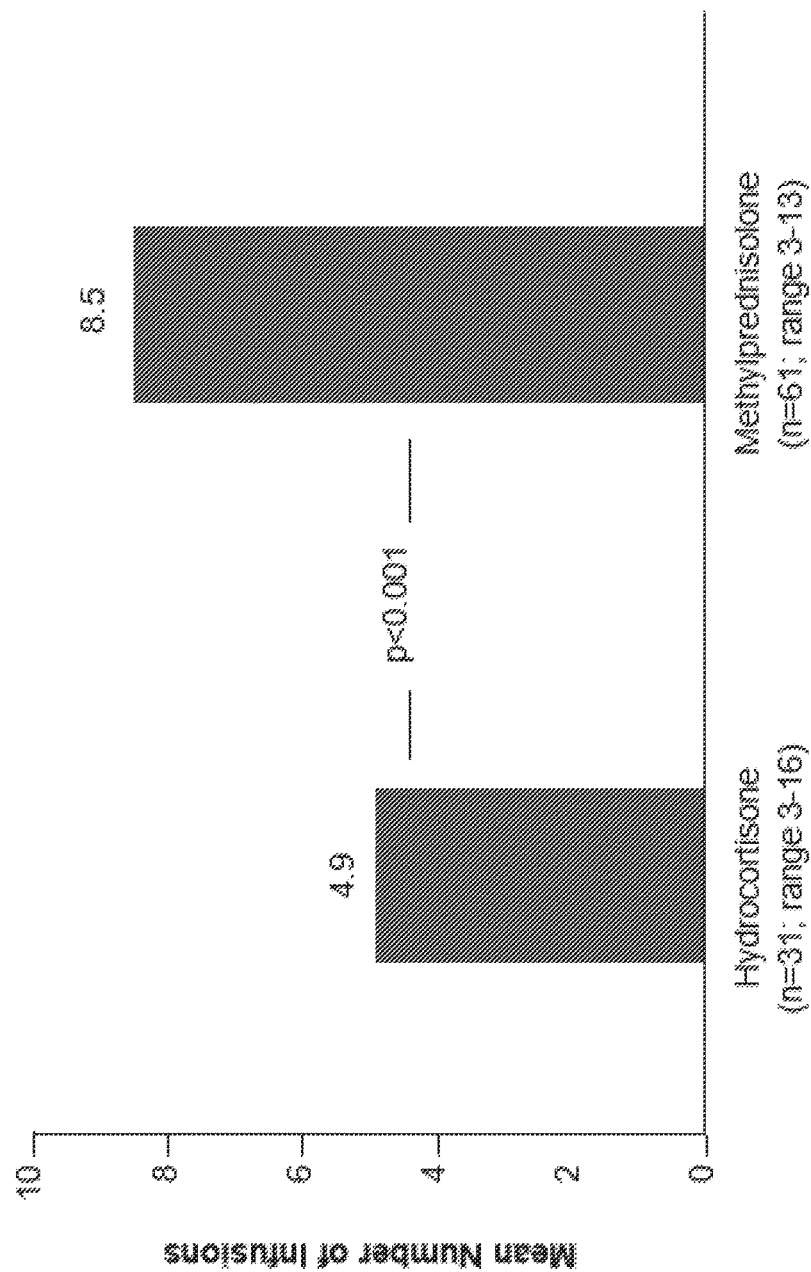
FIG. 1—Shows the number of infusions by corticosteroid prophylaxis type.

Certain terms are defined.

As used herein, the articles "a" and "an" refer to one or to more than one (e.g., to at least one) of the grammatical object of the article.

The term "or" is used herein to mean, and is used interchangeably with, the term "and/or", unless context clearly indicates otherwise.

The term "include" or "comprise" is used interchangeably herein.

"About" and "approximately" shall generally mean an acceptable degree of error for the quantity measured given the nature or precision of the measurements. Exemplary degrees of error are within 20 percent (%), typically, within 10%, and more typically, within 5% of a given value or range of values.

As used herein, the term "uricase molecule" includes full-length, naturally-occurring uricase molecules, as well as variants, e.g., functional variants (e.g., truncations, fragments, mutated forms (e.g., substantially similar sequences) or derivatized form thereof), so long as at least one function and/or activity of the unmodified (e.g., naturally-occurring) molecule remains. In some embodiments, the uricase molecule is derivatized, e.g., is in the form of a conjugate, e.g., a uricase conjugate as described herein.

In some embodiments, the uricase molecule is fungal or microbial uricase, e.g., has a sequence from *Aspergillus flavus, Arthrobacter globiformis, Bacillus* sp. or *Candida utilis*, or substantially identical thereto. In some embodiments, the uricase molecule is an invertebrate uricase, e.g., from *Drosophila melanogaster* or *Drosophila pseudoobscura*. In some embodiments, the uricase molecule is a plant uricase, e.g., from *Glycine max*.

In an embodiment, the uricase molecule is a mammalian uricase molecule. In an embodiment, the mammalian uricase molecule comprises at least a portion of a sequence of porcine, bovine, ovine or baboon liver uricase, or a combination thereof. In an embodiment, the uricase molecule is a chimeric uricase of two or more mammalian uricases selected from a portion of two or more porcine, bovine, ovine or baboon liver uricase.

In an embodiment, the uricase molecule is truncated at the N- or C-terminus. In one embodiment, the uricase molecule is truncated by 3 to 10 amino acids, e.g., 6 amino acids, at its amino terminus. In another embodiment, the uricase molecule is truncated by 3 to 10 amino acids, e.g., 6 amino acids, at its carboxy terminus. In a further embodiment, the uricase molecule is truncated by 3 to 10 amino acids, e.g., 6 amino acids, at both its carboxy and amino termini.

In an embodiment, the amino acid mutations comprise threonine, threonine, lysine, and serine, at positions 7, 46, 291, and 301, of e.g., SEQ ID NO:8, respectively.

In an embodiment, the uricase molecule includes the amino acid sequence of SEQ ID NO:8, or a sequence 90%, 91%, 92%, 93%, 94%, 95%, 96%, 97%, 98%, 99%, or 100% identical, e.g., 95-98% identical thereto.

"Derived from" as that term is used herein, indicates a relationship between a first and a second molecule. It generally refers to structural similarity between the first molecule and a second molecule and does not connotate or include a process or source limitation on a first molecule that is derived from a second molecule.

The terms "polypeptide", "peptide" and "protein" (if single chain) are used interchangeably herein to refer to polymers of amino acids of any length. The polymer can be linear or branched, it can comprise modified amino acids, and it can be interrupted by non-amino acids. The terms also encompass an amino acid polymer that has been modified; for example, disulfide bond formation, glycosylation, lipidation, acetylation, phosphorylation, or any other manipulation, such as conjugation with a labeling component. The polypeptide can be isolated from natural sources, can be a produced by recombinant techniques from a eukaryotic or prokaryotic host, or can be a product of synthetic procedures.

The term "amino acid" is intended to embrace all molecules, whether natural or synthetic, which include both an amino functionality and an acid functionality and capable of being included in a polymer of naturally-occurring amino acids. Exemplary amino acids include naturally-occurring amino acids; analogs, derivatives and congeners thereof; amino acid analogs having variant side chains; and all stereoisomers of any of any of the foregoing. As used herein the term "amino acid" includes both the D- or L-optical isomers and peptidomimetics.

The methods and dosages of the present disclosure encompass polypeptides and nucleic acids having the sequences specified, or sequences substantially identical or similar thereto, e.g., sequences at least 85%, 90%, 95% identical or higher to the sequence specified. In the context of an amino acid sequence, the term "substantially identical" is used herein to refer to a first amino acid that contains a sufficient or minimum number of amino acid residues that are i) identical to, or ii) conservative substitutions of aligned amino acid residues in a second amino acid sequence such that the first and second amino acid sequences can have a common structural domain and/or common functional activity. For example, amino acid sequences that contain a common structural domain having at least about 85%, 90%, 91%, 92%, 93%, 94%, 95%, 96%, 97%, 98% or 99% identity to a reference sequence, e.g., a sequence provided herein.

In the context of nucleotide sequence, the term "substantially identical" is used herein to refer to a first nucleic acid sequence that contains a sufficient or minimum number of nucleotides that are identical to aligned nucleotides in a second nucleic acid sequence such that the first and second nucleotide sequences encode a polypeptide having common functional activity, or encode a common structural polypeptide domain or a common functional polypeptide activity. For example, nucleotide sequences having at least about 85%, 90%, 91%, 92%, 93%, 94%, 95%, 96%, 97%, 98% or 99% identity to a reference sequence, e.g., a sequence provided herein.

Calculations of homology or sequence identity between sequences (the terms are used interchangeably herein) are performed as follows.

To determine the percent identity of two amino acid sequences, or of two nucleic acid sequences, the sequences are aligned for optimal comparison purposes (e.g., gaps can be introduced in one or both of a first and a second amino acid or nucleic acid sequence for optimal alignment and non-homologous sequences can be disregarded for comparison purposes). In one embodiment, the length of a reference sequence aligned for comparison purposes is at least 30%, preferably at least 40%, more preferably at least 50%, 60%, and even more preferably at least 70%, 80%, 90%, 100% of the length of the reference sequence. The amino acid residues or nucleotides at corresponding amino acid positions or nucleotide positions are then compared. When a position in the first sequence is occupied by the same amino acid residue or nucleotide as the corresponding position in the second sequence, then the molecules are identical at that position (as used herein amino acid or nucleic acid "identity" is equivalent to amino acid or nucleic acid "homology").

The percent identity between the two sequences is a function of the number of identical positions shared by the sequences, taking into account the number of gaps, and the length of each gap, which need to be introduced for optimal alignment of the two sequences.

The comparison of sequences and determination of percent identity between two sequences can be accomplished using a mathematical algorithm. In one embodiment, the percent identity between two amino acid sequences is determined using the Needleman and Wunsch ((1970) J. Mol. Biol. 48:444-453) algorithm which has been incorporated into the GAP program in the GCG software package (available at http://www.gcg.com), using either a Blossum 62 matrix or a PAM250 matrix, and a gap weight of 16, 14, 12, 10, 8, 6, or 4 and a length weight of 1, 2, 3, 4, 5, or 6. In yet another embodiment, the percent identity between two nucleotide sequences is determined using the GAP program in the GCG software package (available at http://www.gcg.com), using a NWSgapdna.CMP matrix and a gap weight of 40, 50, 60, 70, or 80 and a length weight of 1, 2, 3, 4, 5, or 6. One set of parameters (and the one that should be used unless otherwise specified) are a Blossum 62 scoring matrix with a gap penalty of 12, a gap extend penalty of 4, and a frameshift gap penalty of 5.

The percent identity between two amino acid or nucleotide sequences can be determined using the algorithm of E. Meyers and W. Miller ((1989) CABIOS, 4:11-17) which has been incorporated into the ALIGN program (version 2.0), using a PAM120 weight residue table, a gap length penalty of 12 and a gap penalty of 4.

The nucleic acid and protein sequences described herein can be used as a "query sequence" to perform a search against public databases to, for example, identify other family members or related sequences. Such searches can be performed using the NBLAST and XBLAST programs (version 2.0) of Altschul, et al. (1990) J. Mol. Biol. 215: 403-10. BLAST nucleotide searches can be performed with the NBLAST program, score=100, wordlength=12 to obtain nucleotide sequences homologous to a nucleic acid molecules of the disclosure. BLAST protein searches can be performed with the XBLAST program, score=50, wordlength=3 to obtain amino acid sequences homologous to protein molecules of the disclosure. To obtain gapped alignments for comparison purposes, Gapped BLAST can be utilized as described in Altschul et al., (1997) Nucleic Acids Res. 25:3389-3402. When utilizing BLAST and Gapped BLAST programs, the default parameters of the respective programs (e.g., XBLAST and NBLAST) can be used. See http://www.ncbi.nlm.nih.gov.

It is understood that the uricase molecules can have additional conservative or non-essential amino acid substitutions, which do not have a substantial effect on their functions.

In the context of the present disclosure, the following abbreviations for the commonly occurring nucleic acid bases are used. "A" refers to adenosine, "C" refers to cytosine, "G" refers to guanosine, "T" refers to thymidine, and "U" refers to uridine.

A "conservative mutation", as used herein, is a mutation of one or more amino acids, at or around a position that does not substantially alter the protein's behavior. In one embodiment, the uricase molecule comprising at least one conservative mutation has the same uricase activity as does uricase molecule without such mutation. In alternate embodiments, the uricase molecule comprising at least one conservative mutation has substantially the same uricase activity, within 5% of the activity, within 10% of the activity, or within 30% of the activity of uricase molecule without such mutation.

Conservative amino acid substitution is defined as a change in the amino acid composition by way of changing amino acids of a peptide, polypeptide or protein, or fragment thereof. In some embodiments, the uricase molecule has one, two, three or four conservative mutations. The substitution is of amino acids with generally similar properties (e.g., acidic, basic, aromatic, size, positively or negatively charged, polar, non-polar) such that the substitutions do not substantially alter peptide, polypeptide or protein characteristics (e.g., charge, IEF, affinity, avidity, conformation, solubility) or activity. Typical substitutions that can be performed for such conservative amino acid substitution can be among the groups of amino acids as follows:

glycine (G), alanine (A), valine (V), leucine (L) and isoleucine (I);
aspartic acid (D) and glutamic acid (E);
alanine (A), serine (S) and threonine (T);
histidine (H), lysine (K) and arginine (R);
asparagine (N) and glutamine (Q);
phenylalanine (F), tyrosine (Y) and tryptophan (W).

The protein having one or more conservative substitutions retains its structural stability and can catalyze a reaction even though its DNA sequence is not the same as that of the original protein.

Ranges: throughout this disclosure, various aspects of the disclosure can be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. As another example, a range such as 95-99% identity, includes something with 95%, 96%, 97%, 98% or 99% identity, and includes subranges such as 96-99%, 96-98%, 96-97%, 97-99%, 97-98% and 98-99% identity. This applies regardless of the breadth of the range.

Various aspects of the disclosure are described in further detail below. Additional definitions are set out throughout the specification.

Uricase Molecules

The methods and dosage regimens disclosed herein include the use of uricase molecules, e.g., uricase conjugates, administered in tolerizing and therapeutic dosage regimens, alone or in combination with other therapies, to, for example, reduce uric acid levels, treat gout, prevent (e.g., delaying) infusion reactions, and/or reduce an antibody response against a uricase. Uricases suitable for the methods and dosage regimens disclosed herein include naturally occurring urate oxidases isolated from bacteria, fungi and the tissues of plants and animals, both vertebrates and invertebrates, as well as recombinant forms of uricase, including mutated, hybrid, and/or truncated enzymatically active variants of uricase.

The uricase molecule can be fungal or microbial uricase. In one aspect of this embodiment, the fungal or microbial uricase molecule can be a naturally occurring or recombinant form of uricase from *Aspergillus flavus, Arthrobacter globiformis, Bacillus* sp. In some embodiments, the uricase molecule is from *Candida utilis* (SEQ ID NO:1). Alternatively, the uricase molecule can be an invertebrate uricase, such as, for example, a naturally occurring or recombinant form of uricase from *Drosophila melanogaster* or *Drosophila pseudoobscura*. The uricase molecule disclosed herein can also be a plant uricase, for example, a naturally occurring or recombinant form of uricase from soybean root nodule (*Glycine max*).

Uricase molecule, as used herein, includes individual subunits, as well as the tetramer, unless otherwise indicated. In some embodiments, the uricase molecule is a homotetramer. In some embodiments, the uricase molecule comprises four identical non-covalently-bound uricase monomeric subunits.

"Truncated uricase molecule", as used herein, refers to uricase molecules having shortened primary amino acid sequences. Amongst the possible truncations are truncations at or around the amino and/or carboxy termini. Specific truncations of this type can be such that the ultimate amino acids (those of the amino and/or carboxy terminus) of the naturally occurring protein are present in the truncated protein. Amino terminal truncations can begin at position 1, 2, 3, 4, 5 or 6. In some embodiments, the amino terminal truncations begin at position 2, thereby leaving the amino terminal methionine. This methionine can be removed by post-translational modification. In some embodiments, the amino terminal methionine is removed after the uricase is produced. In one embodiment, the methionine is removed by endogenous bacterial aminopeptidase.

A truncated uricase molecule, with respect to the full length sequence, has one or more amino acid sequences excluded. A protein comprising a truncated uricase can include any amino acid sequence in addition to the truncated uricase sequence. In some embodiments, a uricase protein comprising a truncated uricase wherein the truncation begins at position 6 (i.e., the truncated uricase begins at position 7) does not have, immediately upstream from the truncated uricase, whatever amino acid that the wild type uricase has at position 6.

Unless otherwise indicated by specific reference to another sequence or a particular SEQ ID NO, reference to the numbered positions of the amino acids of the uricase molecules described herein is made with respect to the numbering of the amino acids of the pig uricase sequence. As used herein, reference to amino acids or nucleic acids "from position X to position Y" means the contiguous sequence beginning at position X and ending at position Y, including the amino acids or nucleic acids at both positions X and Y.

In an embodiment, the uricase molecule is truncated by 4-13 amino acids at its amino terminus. In another embodiment, the uricase molecule is truncated by 4-13 amino acids at its carboxy terminus. In a further embodiment, the uricase molecule is truncated by 4-13 amino acids at both its carboxy and amino termini.

In an embodiment, the uricase molecule is truncated by 6 amino acids at its amino terminus. In another embodiment, the uricase molecule is truncated by 6 amino acids at its carboxy terminus. In a further embodiment, the uricase molecule is truncated by 6 amino acids at both its carboxy and amino termini.

One exemplary mammalian uricase molecule is recombinant pig-baboon chimeric uricase, composed of portions of the sequences of pig liver and baboon liver uricase, both of which were first determined by Wu, et al., (1989). One example of such a chimeric uricase molecule contains the first 288 amino acids from the porcine sequence (SEQ ID NO:2) and the last 16 amino acids from the baboon sequence (SEQ ID NO:3). Since the latter sequence differs from the porcine sequence at only two positions, having a lysine (K) in place of arginine at residue 291 and a serine (S) in place of threonine at residue 301, this mutant is referred to as pig-K-S or PKS uricase (SEQ ID NO:4). In some embodiments, PKS uricase is truncated by 6 amino acids at its amino terminus and is referred to as "Pig-KS-ΔN" (SEQ ID NO:5).

In a one embodiment, the uricase molecule comprises the amino acid sequence from position 13 to position 292 of the amino acid sequence of pig uricase (SEQ ID NO:5). In another embodiment, the uricase molecule comprises the amino acid sequence from position 8 to position 287 of the amino acid sequence of Pig-KS-ΔN (SEQ ID NO:5).

In another embodiment, the uricase molecule comprises the amino acid sequence from position 44 to position 56 of Pig-KS-ΔN comprising a threonine at position 46 (SEQ ID NO:6). This region of uricase has homology to sequences within the tunneling fold (T-fold) domain of uricase, and has within it a mutation at position 46 with respect to the native pig uricase sequence.

In a one embodiment, the uricase molecule comprising threonine, threonine, lysine, and serine, at positions 7, 46, 291, and 301 comprises the amino acid sequence from position 13 to position 292 of the amino acid sequence of pig uricase. In another embodiment, the uricase molecule comprising threonine, threonine, lysine, and serine, at positions 7, 46, 291, and 301 comprises the amino acid sequence from position 8 to position 287 of the amino acid sequence of Pig-KS-ΔN (Pig-TTKS-ΔN) (SEQ ID NO:7). In another embodiment, the uricase molecule comprising threonine, threonine, lysine, and serine, at positions 7, 46, 291, and 301 comprises the amino acid sequence from position 8 to position 287 of the amino acid sequence of Pig-KS-ΔN and the N-terminal methionine has been removed (Pig-TTKS-ΔN) (SEQ ID NO:8).

In an embodiment, the uricase molecule comprises the sequence of SEQ ID NO. 8 or a sequence 90%, 91%, 92%, 93%, 94%, 95%, 96%, 97%, 98%, 99%, or 100% identical, e.g., 95-98% identical thereto.

In embodiments, the uricase molecule comprises the amino acid sequence of des-(1-6)-[7-threonine, 46-threonine, 291-lysine, 301-serine]pig-baboon uricase.

The truncated mammalian uricase molecules disclosed herein can further comprise a methionine at the amino terminus. The penultimate amino acid can be one that allows removal of the N-terminal methionine by bacterial methionine aminopeptidase (MAP). Amino acids allowing the most complete removal of the N-terminal methionine are alanine, glycine, proline, serine, and threonine. In one embodiment, the uricase molecule comprises two amino terminal amino acids, wherein the two amino terminal amino acids are a methionine followed by an amino acid selected from the group consisting of alanine, glycine, proline, serine, and threonine. In another embodiment, the amino acid is threonine.

In an embodiment, the uricase molecule is a mammalian uricase molecule. Uricase genes and proteins have been identified in several mammalian species, for example, pig, baboon, rat, rabbit, mouse, and rhesus monkey. The sequences of various uricase proteins are described herein by reference to their public data base accession numbers, as follows: gi|50403728|sp|P25689; gi|20513634|dbj|B-AB91555.1; gi|1766101gb|AAA35395.1; gi|2051365-4|dbj|BAB91557.1; gi|47523606|ref|NP_999435.1; gi|6678509|ret]NP 033500.1; gi|57463|emb|CAA31490.1; gi|20127395|rer]NP_446220.1; gi|137107|sp|P11645; gi|51458661|refjXP_497688.1; gi|207619|gb|AAA42318.1; gi|26340770|dbj|BAC34047.1; and gi|57459| emb-|CAA30378.1. Each of these sequences and their annotations in the public databases accessible through the National Center for Biotechnology Information (NCBI) is incorporated by reference in its entirety.

In an embodiment, the mammalian uricase molecule comprises the sequence of porcine, bovine, ovine or baboon liver uricase.

In one embodiment, the uricase molecule can be baboon liver uricase in which tyrosine 97 has been replaced by histidine, whereby the specific activity of the uricase molecule can be increased by at least about 60%.

In an embodiment, the uricase molecule is a chimeric uricase of two or more mammalian uricases.

In an embodiment, the mammalian uricases of the chimeric uricase are selected from porcine, bovine, ovine, or baboon liver uricase.

In an embodiment, the uricase molecule comprises the sequence of SEQ ID NO. 8 or a sequence 90%, 91%, 92%, 93%, 94%, 95%, 96%, 97%, 98%, 99%, or 100% identical, e.g., 95-98% identical thereto.

In embodiments, the uricase molecule comprises the amino acid sequence of des-(1-6)-[7-threonine, 46-threonine, 291-lysine, 301-serine]pig-baboon uricase.

In embodiments, the uricase molecule is 80-200 kDa. In embodiments, the uricase molecule is 100-160 kDa. In embodiments, the uricase molecule is 110-150 kDa. In embodiments, the uricase molecule is 120-180 kDa. In embodiments, the uricase molecule is 130-140 kDa, e.g., about 135-137 kDa (e.g., about 136.8 kDa).

In one embodiment, the uricase molecule is isolated. In another embodiment, the uricase molecule is purified. In a further embodiment, the uricase molecule is isolated and purified.

The uricase molecule can be isolated and/or purified by any method known to those of skill in the art. Expressed polypeptides can generally be isolated in substantially pure form. In some embodiments, the polypeptides are isolated to a purity of at least 80% by weight. In further embodiments, the polypeptides are isolated to a purity of at least 95% by weight. In additional embodiments, the polypeptides are isolated to a purity of at least 99% by weight. In general, such purification can be achieved using, for example, the standard techniques of ammonium sulfate fractionation, SDS-PAGE electrophoresis, and affinity chromatography. The uricase molecule can be isolated using a cationic surfactant, for example, cetyl pyridinium chloride (CPC) according to the method described in United States patent publication US 2009/0317889, entitled Purification of Proteins With Cationic Surfactant, incorporated herein by reference in its entirety.

Methods for expressing the uricase molecule in a host cell are known in the art. For example, a host cell can be treated so as to cause the expression of the uricase molecule. Transfection of cells with a vector can be accomplished using DNA precipitated with calcium ions, though a variety of other methods can be used (e.g. electroporation). A vector expressing the uricase molecule can be under the control of an osmotic pressure sensitive promoter. A promoter is a region of DNA to which RNA polymerase binds before initiating the transcription of DNA into RNA. An osmotic pressure sensitive promoter initiates transcription as a result of increased osmotic pressure as sensed by the cell. In an embodiment, the promoter is a modified osmB promoter.

Uricase Conjugates

In certain embodiments, the uricase molecule is in conjugate form. The uricase molecule disclosed herein can be conjugated to one or more polymers, e.g., water-soluble polymers (e.g., one or more PEG moieties).

Disclosed herein are conjugates, e.g., uricase conjugates, comprising uricase molecules. These conjugates are substantially non-immunogenic can and retain at least 75%, 85%, or 95% or more of the uricolytic activity of the unmodified enzyme. In embodiments, the polymer comprises one or more of a polyether, polyester, polyamino acid, a polycarbonate, a polyacetal, a polyketal, a polysaccharide, or a combination thereof. In embodiments, the polymer is polypropylene glycol. In embodiments, the polymer is polyethylene glycol. Water-soluble polymers suitable for use in the methods disclosed herein include linear and branched poly(ethylene glycols) or poly(ethylene oxides), all commonly known as PEGs. Examples of branched PEG are the subject of U.S. Pat. No. 5,643,575. One example of linear PEG is monomethoxyPEG, of the general structure CH3O—(CH2CH2O)nH, where n varies from about 100 to about 2,300.

In embodiments, each polymer molecule, e.g., polyethylene glycol molecule, has a molecular weight between about 1 kDa and 100 kDa. In embodiments, each polymer molecule, e.g., polyethylene glycol molecule, has a molecular weight between about 5 kDa and 50 kDa. In embodiments, each polymer molecule, e.g., polyethylene glycol molecule, has a molecular weight between about 5 kDa and 20 kDa. In embodiments, each polymer molecule, e.g., polyethylene glycol molecule, has a molecular weight of about 20 kDa. In embodiments, each polymer molecule, e.g., polyethylene glycol molecule, has a molecular weight of about 10 kDa. In embodiments, each polymer molecule, e.g., polyethylene glycol molecule, has a molecular weight of about 10 kDa.

In embodiments, the conjugate has a polymer weight of 300-800 kDa. In embodiments, the conjugate has a polymer weight of 400-700 kDa. In embodiments, the conjugate has a polymer weight of about 500-600 kDa, e.g., about 540-560 kDa.

In embodiments, the conjugate comprises 1 to 40 polymer molecules, e.g., polyethylene glycol molecules, per monomer of the uricase molecule. In embodiments, the conjugate comprises 5 to 20 polymer molecules, e.g., polyethylene glycol molecules, per monomer of the uricase molecule. In embodiments, the conjugate comprises 5 to 12 polymer molecules, e.g., polyethylene glycol molecules, per monomer of the uricase molecule. In embodiments, the conjugate comprises about 10 polymer molecules, e.g., polyethylene glycol molecules, per monomer of the uricase molecule.

Uricase molecules can be conjugated via a biologically stable, nontoxic, covalent linkage to a relatively small number of strands of PEG. Such linkages can include urethane (carbamate) linkages, secondary amine linkages, and amide linkages.

Urethane linkages to uricase can be formed by incubating uricase in the presence of the succinimidyl carbonate (SC) or p-nitrophenyl carbonate (NPC) derivative of PEG. SC-PEG can be synthesized using the procedure described in U.S. Pat. No. 5,612,460, which is hereby incorporated by reference. NPC-PEG can be synthesized by reacting PEG with p-nitrophenyl chloroformate according to methods described in Veronese, F M, et al., (1985) Appl Biochem Biotechnol 11:141-152, and in U.S. Pat. No. 5,286,637, which is hereby incorporated by reference. The methods described in U.S. Pat. No. 5,286,637 are adapted to PEGs of higher molecular weight by adjusting the concentrations of the reactants to maintain similar stoichiometry. An alternative method of synthesis of NPC-PEG is described by Büttner, W, et al., East German Patent Specification DD 279 486 A1. In embodiments, the uricase molecule of the conjugate is derivatized using monomethoxypoly(ethylene glycol)-p-nitrophenyl carbonate (mPEG-NPC).

Amide linkages to uricase can be obtained using an N-hydroxysuccinimide ester of a carboxylic acid derivative of PEG (Shearwater Polymers). Secondary amine linkages can be formed using 2,2,2-trifluoroethanesulfonyl PEG (tresyl PEG; Shearwater Polymers) or by reductive alkylation using PEG aldehyde (Shearvater Polymers) and sodium cyanoborohydride.

As described in U.S. Pat. No. 6,783,965, in conjugates containing PEG with a molecular weight of 10 kDa, the maximum number of strands of PEG that were coupled per subunit, while retaining at least 75% of the uricolytic activity of the unmodified enzyme, was about 12 strands for mammalian uricases (e.g. PKS uricase, a mutein of porcine uricase; see assay conditions in Example 5). The latter extent of PEGylation corresponds to about 40% of the total amino groups. There are several factors that can affect the choice of the optimal molecular weight and number of strands of PEG for coupling to a given form of uricase. In general, the reduction or elimination of immunogenicity without substantial loss of uricolytic activity can require the coupling of relatively more strands of PEG of lower molecular weight, compared to relatively fewer strands of PEG of higher molecular weight. Likewise, each different form of uricase can have a different optimum with respect to both the size and number of strands. The optimal number of strands of PEG and PEG molecular weight can be readily determined using art known methods.

In another embodiment, substantially all large aggregates of the uricase conjugate have been removed. Methods for removal include ion-exchange chromatography or size-exclusion chromatography at a pH between about 9 and 10.5, e.g., 10.2, prior to conjugation of the resulting substantially aggregate-free preparation of uricase to PEG. The molecular weight of the uricase in each fraction from the preparative column can be monitored by any size-dependent analytical technique, including, for example, HPLC, conventional size-exclusion chromatography, centrifugation, light scattering, capillary electrophoresis or gel electrophoresis in a non-denaturing buffer. For aggregate-free uricase isolated using size-exclusion chromatography, fractions containing only the 140-kDa and 280-kDa forms of the enzyme can be pooled and used for conjugation to PEG. For tetrameric plus octameric uricase isolated using ion-exchange chromatography, fractions from the ion-exchange column can be analyzed with respect to size to determine which fractions contain substantial amounts of the tetrameric and octameric forms without the large aggregates detected by light scattering. In the purified product, the undesirable large aggregates can thus constitute as little as about 1%, or less, of the total uricase.

In some embodiments, the uricase conjugate is pegloticase (KRYSTEXXA®). Pegloticase is a recombinant mammalian uricase conjugated to polyethylene glycol approved for the treatment of chronic gout in adult patients refractory to conventional therapy.[1] The recommended dose and regimen of pegloticase for adult patients is 8 mg (uricase protein) given as an intravenous infusion every two weeks.[1] Pre-infusion prophylaxis (antihistamines, corticosteroids) is indicated to minimize the risk of infusion reactions when administering pegloticase.[1] Hydrocortisone (200 mg IV) was administered during the randomized controlled trials, and has typically been used as a component of pre-infusion prophylaxis for pegloticase.[2] Methylprednisolone has been successfully used for pre-infusion prophylaxis for a number of biologic proteins including infliximab.[3] Methylprednisolone is now being employed by some providers as an alternative pre-infusion prophylaxis corticosteroid for pegloticase. Methylprednisolone as prophylaxis for pegloticase infusion has not been systematically evaluated. Other types of corticosteroids that may be used as described herein may include, but are not limited to, predisone, hydrocortisone, methylprednisolone, Depo-Medrol, and/or Solu-Medrol.

Uses of Combination Therapies

Treatment

Elevated serum urate can be a biochemical marker of gout. Persistently elevated plasma uric acid (PUA) or serum uric acid (SUA) levels can result deposition of uric acid in joints and soft tissues. As the total body burden of uric acid increases, signs and symptoms of gout result, including arthritis, characterized by recurrent painful gout flares, development of tophi and joint deformities with resultant chronic pain/inflammation and consequent loss of physical function.

As used herein, and unless otherwise specified, the terms "treat," "treating" and "treatment" refer to both therapeutic treatment and prophylactic or preventative measures, wherein the object is to prevent or slow down (lessen) an undesired physiological change or disorder, such as the development or worsening of a condition or disorder, e.g., hyperuricemia (e.g., gout). Beneficial or desired clinical results include, but are not limited to, alleviation of symptoms, diminishment of extent of disease, stabilized (i.e., not worsening) state of disease, delay or slowing of disease progression, amelioration or palliation of the disease state, whether detectable or undetectable. Those in need of treatment include those already with the condition or disorder, as well as those prone to have the condition or disorder or those in which the condition or disorder is to be prevented.

For example, in the case of treating gout, in some embodiments, therapeutic treatment can refer to reducing the uric acid level after administration in accordance with the methods or administration with the pharmaceutical compositions described herein. For example, the uric acid level is reduced by at least about 10%, at least about 15%, at least about 20%, at least about 30%, at least about 40%, or at least about 50%, after treatment. In another embodiment, the uric acid level is reduced by more than 50%, e.g., at least about 60%, or at least about 70%, after treatment. In one embodiment, the uric acid level is reduced by at least about 80%, at least about 90% or greater, as compared to a control (e.g. in the absence of the pharmaceutical composition described herein).

In another embodiment, the therapeutic treatment refers to alleviation of at least one symptom associated with gout. Measurable lessening includes any statistically significant decline in a measurable marker or symptom, such as serum/plasma uric acid levels in a blood sample, after treatment. In one embodiment, at least one marker or symptom is alleviated by at least about 10%, at least about 15%, at least about 20%, at least about 30%, at least about 40%, or at least about 50%. In another embodiment, at least one marker or symptom is alleviated by more than 50%, e.g., at least about 60%, or at least about 70%. In one embodiment, at least one marker or symptom is alleviated by at least about 80%, at least about 90% or greater, as compared to a control (e.g. in the absence of the pharmaceutical composition described herein).

As used herein, unless otherwise specified, the terms "prevent," "preventing" and "prevention" refers to an action that occurs before the subject begins to have a detectably symptom or suffer from the condition, or relapse of the condition. In one embodiment, the condition is gout. Prevention need not result in a complete prevention of the condition; partial prevention or reduction of the condition or a symptom of the condition, or reduction of the risk of developing the condition, is encompassed by this term.

As used herein, and unless otherwise specified, a "therapeutically effective amount" of a compound, e.g., a uricase molecule in combination, is an amount sufficient to provide a therapeutic benefit in the treatment of the disorder (e.g., gout, or one or more symptoms associated with gout), or to delay or minimize one or more symptoms associated with the disorder (e.g., gout, or one or more symptoms associated with gout). A therapeutically effective amount of a compound means an amount of therapeutic agent, alone or in combination with other therapeutic agents, which provides a benefit in the treatment or management of the disorder. The term "therapeutically effective amount" can encompass an amount that improves overall therapy, reduces or avoids one or more symptoms or causes of the disorder (e.g., gout, or one or more symptoms associated with gout), or enhances the therapeutic efficacy of another therapeutic agent. In some embodiments, a therapeutically effective amount is an amount that achieves a reduction in uric acid levels. In some embodiments, a therapeutically effective amount is an amount that achieves uric acid levels less or about 6 mg/dl.

As used herein, and unless otherwise specified, a "prophylactically effective amount" of a compound is an amount sufficient to prevent a disorder (e.g., gout, or one or more symptoms associated with gout). A prophylactically effective amount of a compound means an amount of the compound, alone or in combination with other therapeutic agents, which provides a prophylactic benefit in the prevention of the disorder. The term "prophylactically effective amount" can encompass an amount that improves overall prophylaxis or enhances the prophylactic efficacy of another prophylactic agent.

As described herein, "gout" is a chronic disorder of urate metabolism resulting in deposition of monosodium urate crystals in the joints and soft tissues, with accompanying inflammation and eventually, in some patients, destructive, chronic arthropathy. Gout is a prevalent form of arthritis in men and is increasing in incidence and prevalence among older persons of both genders. Treatments for gout includes oral ULA (urate lowering agents), e.g., xanthine oxidase inhibitors, including allopurinol and febuxostat, and uricase. In some embodiments, patients who are unresponsive to oral ULA are treated with uricase.

"Refractory gout" refers to gout in a subject, e.g., a patient, who is unresponsive or poorly responsive to one or more oral urate-lowering agents (ULA), for example, xanthanine oxidase inhibitors, or have experienced or are at an increased risk of experiencing an adverse event therefrom. Approximately, 2% of patients treated with allopurinol develop allergic reactions and a severe hypersensitivity syndrome occurs in about 0.4% of the patients (Arellano et al., Ann Pharmacother 1993; 27:337-43). Patients with medical contraindications to xanthine oxidase inhibitors due to allergy/hypersensitivity, or who have failed to normalize SUA at maximum medically appropriate doses of these medications, can go on to develop chronic gout.

"Chronic gout refractory to Conventional Therapy (GRT)" is an uncommon, but severe outcome of progressive gout. Chronic gout results from demonstrated intolerance of or refractoriness to available therapy to prevent urate crystal deposition by reducing and maintaining serum urate levels in a subsaturating range.

Subjects who have repeated attacks of gout or persistent hyperuricemia for many years can develop tophaceous gout. Tophaceous gout describes the accumulation of large numbers of urate crystals in masses called tophi. Subjects with this form of gout can develop tophi in joints, bursae (the fluid-filled sacs that cushion and protect tissues), bones, and cartilage, or under the skin. Tophi may cause erosion of the bone and eventually joint damage and deformity (called gouty arthropathy).

In some embodiments, the uricase molecule used in the methods and dosage regimens disclosed herein is pegylated uricase. Pegylated uricase is a monomethoxypoly (ethylene glycol) (PEG) modified recombinant mammalian uricase (urate oxidase) which reduces levels of UA in the serum (or plasma) by catalyzing its conversion to allantoin, a water-soluble metabolite more readily excreted in the urine than uric acid. Pegylated uricase provides a therapeutic mechanism to reduce SUA in patients with gout. Pegylated uricase provides medical benefits in patients who respond by lowering SUA and by reducing tophus burden.

Described herein are tolerizing and therapeutic dosage regimens of uricase conjugates, e.g., pegylated uricase. Among other things, the combination of these dosing regimens provide for improved reduction of uric acid levels, improved treatment of gout, reduced antibody response, and prevention (e.g., delay of) infusion reactions relative to conventional dosage schemes.

Infusion Reactions

In the case of PEGylated uricase therapy, it has been shown that infusion reactions (IRs) are associated with an increase in anti-PEGylated uricase antibody titer, loss of responsiveness to PEGylated uricase therapy, or both.

As used herein, the term "infusion reaction" is an undesired and/or unintended effect, e.g., an adverse event, of a therapy, e.g., a uricase therapy, occurring during or after the therapy. In some embodiments, the infusion reaction occurs during a uricase therapy. In other embodiments, the infusion reaction occurs after a uricase therapy. In further embodiments, the infusion reaction occurs within 2 hours after the uricase therapy.

In some embodiments, the uricase therapy comprises infusion, e.g., intravenous infusion, of uricase. An infusion reaction can be any adverse event. In some embodiments, an infusion reaction is a gout flare. In some embodiments, an infusion reaction comprises urticaria, dyspnea, chest discomfort, chest pain, erythema, or pruritus. In some embodiments, an infusion reaction is allergic. In some embodiments, an infusion reaction is non-allergic.

In some embodiments, an infusion reaction comprises anaphylaxis. Symptoms of anaphylaxis include generalized hives; pruritus or flushing; swollen lips, tongue, or uvula; Respiratory compromise (e.g., dyspnea, wheeze-bronchospasm, stridor, reduced peak expiratory flow, hypoxemia); and reduced blood pressure.

In some embodiments, an infusion reaction comprises an immune complex-related disorder. Immune complex-related disorders can be caused by the deposition of immune complexes in small blood vessels in the body. Immune complex-related disorders include glomerulonephritis, skin vasculitis, or arthritis.

Combination Therapies

Disclosed herein are methods for treating gout, or reducing an infusion reaction, in response to a uricase therapy. In some embodiments, the methods disclosed herein include administration of a prednisone molecule and a uricase molecule in combination. Administered "in combination", as used herein, means that two (or more) different treatments are delivered to the subject during the course of the subject's affliction with the disorder, e.g., the two or more treatments are delivered after the subject has been diagnosed with the disorder and before the disorder has been cured or eliminated or treatment has ceased for other reasons. In some embodiments, the delivery of one treatment is still occurring when the delivery of the second begins, so that there is overlap in terms of administration. This is sometimes referred to herein as "simultaneous" or "concurrent delivery". In other embodiments, the delivery of one treatment ends before the delivery of the other treatment begins. In some embodiments of either case, the treatment is more effective because of combined administration. For example, the second treatment is more effective, e.g., an equivalent effect is seen with less of the second treatment, or the second treatment reduces symptoms to a greater extent, than would be seen if the second treatment were administered in the absence of the first treatment, or the analogous situation is seen with the first treatment. In some embodiments, delivery is such that the reduction in a symptom, or other parameter related to the disorder is greater than what would be observed with one treatment delivered in the absence of the other. The effect of the two treatments can be partially additive, wholly additive, or greater than additive. The delivery can be such that an effect of the first treatment delivered is still detectable when the second is delivered.

In some embodiments, the uricase molecule, e.g., uricase conjugate, is administered at a dose of about 4 mg, about 5 mg, about 6 mg, about 7 mg, about 8 mg, or about 12 mg, e.g., about 8 mg.

In some embodiments, the prednisone molecule, e.g., the methylprednisolone, is administered in an amount ranging from about 0.1 mg/kg to about 5 mg/kg, about 0.2 mg/kg to about 4 mg/kg, about 0.3 mg/kg to about 3 mg/kg, about 0.4 mg/kg to about 2 mg/kg, or about 0.5 mg/kg to about 1.5 mg/kg, or typically about 0.5 mg/kg, about 0.6 mg/kg, about 0.7 mg/kg, about 0.8 mg/kg, about 0.9 mg/kg, about 1.0 mg/kg, about 1.1 mg/kg, about 1.2 mg/kg, about 1.3 mg/kg, about 1.4 mg/kg, or about 1.5 mg/kg. In other embodiments, the methylprednisolone is administered as a flat dose, e.g., about 1 mg to about 500 mg, about 10 mg to about 400 mg, about 20 mg to about 300 mg, about 30 mg to about 200 mg, or about 50 mg to about 150 mg, or typically about 50 mg, about 60 mg, about 70 mg, about 80 mg, about 90 mg, about 100 mg, about 110 mg, about 120 mg, about 130 mg, about 140 mg, or about 150 mg.

In some embodiments, the prednisone molecule, e.g., the methylprednisolone, is administered prior to the uricase molecule. In some embodiments, the prednisone is administered about 10 minutes or more, about 20 minutes or more, about 30 minutes or more, about 40 minutes or more, about 50 minutes or more, about 1 hour or more, about 2 hours or more, or about 3 hours or more before administration of the uricase molecule. In other embodiments, the methylprednisone is administered about 10 minutes, about 20 minutes, about 30 minutes, about 40 minutes, about 50 minutes, about 1 hour, about 2 hours, or about 3 hours before administration of the uricase molecule. In other embodiments, the administration of the prednisone and the uricase molecule partially overlap.

In one embodiment, the prednisone molecule is administered intravenously (IV), intramuscularly (IM), by infusion (IV infusion), orally, rectally, or topically.

In some embodiments, the treatment cycle is repeated once every 11 days, 12 days, 13 days, 14 days, 15 days, 16 days, 17 days, or 18 days, e.g., every 14 days, e.g., every other week. In one embodiment, dosage regimen is repeated once every other week.

In some embodiments, the dosage regimen comprises one or more first treatment cycles of prednisone and a uricase molecule, and one or more second treatment cycles of a uricase molecule without prednisone.

In some embodiments, dosage regimen includes 7, 10, 12, 24, 48, or more treatment cycles.

Subjects

The methods described herein are useful for treating subjects, e.g., human subjects. In some embodiments, the subject is a patient, e.g., a human patient. In some embodiments, the subject has gout, e.g., is a patient with gout. In some embodiments, the subject is diagnosed with gout. In some embodiments, the subject treated shows hyperuricemia, e.g., the subject has gout. In certain embodiments, the subject is refractory, or has reduced responsiveness, to a urate lowering therapy, e.g., oral ULA. In one embodiment, the subject has, or is identified as having, a lower efficacy to a uricase therapy (e.g., shows increased incidence of anti-uricase antibodies (e.g., anti-pegloticase antibodies) and/or increased incidence of an infusion reaction in response to the uricase therapy). In some embodiments, the subject is overweight or obese, e.g., has a baseline body weight of >100 kg.

A diagnosis of gout can be based on inflamed joints as determined by MRI, X-ray, or ultrasound, the presence of crystals in the synovial fluid analysis, elevated serum uric acid as determined by blood or urine test, and/or tophi. In some embodiments, the subject is likely to have gout. In some embodiments, gout is chronic. In some embodiments, gout is tophaceous gout. In some embodiments, gout is acute. In some embodiments, gout is severe. In some embodiments, gout is moderate.

In some embodiments, the subject has refractory gout, e.g., has failed to normalize serum uric acid, and/or has signs and symptoms inadequately controlled with ULA, e.g., xanthanine oxidase inhibitors. In some embodiments, the subject was previously treated with oral ULA, e.g., xanthanine oxidase inhibitors, allopurinol, or febuxostat.

The serum urate saturation point can be approximately 6.8 mg/dL. Without wishing to be bound by theory, it is thought that the risk for the development of gout symptoms increases steadily at concentrations higher than 6 mg/dL. In some embodiments, the subject is hyperuricemic, e.g., has a serum uric acid level ≥4 mg/dl, ≥4.1 mg/dl, ≥4.2 mg/dl, ≥4.3 mg/dl, 4.4 mg/dl, ≥4.5 mg/dl, ≥4.5 mg/dl, ≥4.6 mg/dl, ≥4.7 mg/dl, ≥4.8 mg/dl, ≥4.9 mg/dl, ≥5.0 mg/dl, ≥5.1 mg/dl, ≥5.2 mg/dl, ≥5.3 mg/dl, ≥5.4 mg/dl, ≥5.5 mg/dl, ≥5.6 mg/dl, ≥5.7 mg/dl, 5.8 mg/dl, ≥5.9 mg/dl, ≥6.0 mg/dl, ≥6.1 mg/dl, ≥6.2 mg/dl, ≥6.3 mg/dl, ≥6.4 mg/dl, ≥6.5 mg/dl, ≥6.6 mg/dl, ≥6.7 mg/dl, ≥6.8 mg/dl, e.g., has a serum uric acid level ≥6 mg/dl.

One category of patients who can benefit from the claimed methods are overweight or obese patients. Without wishing to be bound by theory, in such patients, the dosage of the uricase conjugate expressed as mg/kg can be reduced relative to a normal weight patient and this can reduce the efficacy of the treatment. A therapeutic dosage regimen with increased dosage or increased frequency of dosages at the beginning of a treatment period can increase responsiveness to uricase therapy in these patients. As used herein, "treatment period" refers to the length or duration of treatment for a particular individual, i.e., the length of time a particular patient or individual is given a uricase molecule for lowering uric acid levels. Treatment period may refer to a period of weeks of administration of a uricase molecule as described herein, or may refer to the length of time of an individual administration (i.e., infusion) of a uricase molecule. Treatment period may vary depending on the individual as described herein. Treatment period also refers to the period of administration of a steroid, either prior to, concurrently with, or after administration of a uricase molecule in a patient. A treatment period may vary depending on the individual In some embodiments, the subject has a body weight greater than or equal to 80 kg, 90 kg, 100 kg, 110 kg, 120 kg, e.g., 100 kg. In some embodiments, the subject has been identified as having a body weight greater than or equal to 80 kg, 90 kg, 100 kg, 110 kg, 120 kg, e.g., 100 kg.

Assessment of overweight and obesity can be determined by the classification of body mass index (BMI) as defined by "Clinical Guidelines on the Identification, Evaluation, and Treatment of Overweight and Obesity in Adults" from the National Institutes of Health. Body mass index is obtained by dividing a subject's weight, e.g., in kilograms (kg) by the square of the subject's height, e.g., in meters (m). Subjects with a BMI 18.5 to 24.9 are typically classified as normal weight, while subjects with a BMI 25.0 to 29.9 are classified as overweight. Subjects with a BMI 30.0 or greater are classified as obese, and can be subdivided into three classes: Class I (BMI=30.0 to 34.9; Class II (BMI=35.0 to 39.9); and Class III (BMI is greater or equal to 40).

In one embodiment, the subject is overweight, e.g., the subject has a BMI of greater than or equal to 25.0 but less than or equal to 29.9.

In another embodiment, the subject is, or is identified as being, obese, e.g., the subject has a BMI of greater than or equal to 30, e.g., greater than 30, greater than 35, greater than 40, greater than 45, or greater than 50.

In some embodiments, the subject is 55 years old or older, 60 years old or older, 65 years old or older, or 70 years old or older, e.g., 65 years old or older. In some embodiments, the subject is younger than 70, 65, 60, or 55 years old, e.g., younger than 65 years old.

Monitoring of Subjects

Suitable indicators for assessing effectiveness of a given dosage regimen are known to those of skill in the art. Examples of such indicators include normalization or lowering of serum uric acid (SUA) or plasma uric acid levels (PUA) and lowering or maintenance of the uric acid level. It is known that persistently elevated plasma uric acid (PUA) or serum uric acid (SUA) levels result in deposition of uric acid in joints and soft tissues. As the total body burden of uric acid increases, signs and symptoms of gout result, including arthritis, characterized by recurrent painful gout flares, development of tophi and joint deformities with resultant chronic pain/inflammation and consequent loss of physical function.

In embodiments, the uric acid level, e.g., the serum or plasma uric acid level, can be lowered to 6.8 mg/dL or less, 6.7 mg/dL or less, 6.6 mg/dL or less, 6.5 mg/dL or less, 6.4 mg/dL or less, 6.3 mg/dL or less, 6.2 mg/dL or less, 6.1 mg/dL or less, 6.0 mg/dL or less, 5.9 mg/dL or less, 5.8 mg/dL or less, 5.7 mg/dL or less, 5.6 mg/dL or less, 5.5 mg/dL or less, 5.4 mg/dL or less, 5.3 mg/dL or less, 5.2 mg/dL or less, 5.1 mg/dL or less, 5.0 mg/dL or less, 4.9 mg/dL or less, 4.8 mg/dL or less, 4.7 mg/dL or less, 4.6 mg/dL or less, 4.5 mg/dL or less, 4.4 mg/dL or less, 4.3 mg/dL or less, 4.2 mg/dL or less, 4.1 mg/dL or less, or 4.0 mg/dL or less. In embodiments, the uric acid level, e.g., the serum or plasma uric acid level, can be lowered to 6.8 mg/dL or less. In embodiments, the uric acid level, e.g., the serum or plasma uric acid level, can be lowered to 6 mg/dL or less. In embodiments, the uric acid level is measured before dose of the conjugate and the uric acid level can be lowered to 6 mg/dl or less for 3 or more consecutive doses. In embodiments, the uric acid level, e.g., the serum or the plasma uric acid level, can be lowered to 5.0 mg/dl or less. In embodiments, the subject being treated with the compositions disclosed herein has a SUA or PUA of 6 mg/ml or less for at least 70%, at least 80%, or at least 90% of the total treatment period. For example, for a 24-week treatment period, the subject has a SUA or PUA of 6 mg/ml or less for at least 80% of the 24 week treatment period, i.e., for at least a time equal to the amount of time in 134.4 days (24 weeks×7 days/week×0.8=134.4 days). In embodiments, the uric acid level, e.g., the serum or plasma uric acid level, can be reduced in the subject relative to a reference, e.g., relative to an untreated subject, or the subject prior to treatment or after a previous treatment.

In embodiments, the uric acid level can be measured by an immunosorbant assay, e.g., enzyme-linked immunosorbant assay (ELISA). In embodiments, a trough level of uric acid can be measured before administration of the uricase conjugate, e.g., 72, 48, 24, 12, 6, 4, or 2 hours before administration of the conjugate. In embodiments, a peak level of uric acid can be measured after administration of the conjugate, e.g., 0.5, 1, 2, 3, 4, or 5 hours after administration of the conjugate.

Another measure of effectiveness of a given dosage regimen is measuring the level of an antibody against the conjugate in the subject. Anti-conjugate antibodies, e.g., anti-PEGylated uricase antibodies, can be measured, for example, in the blood of a subject. Methods for measuring levels of antibodies are well known in the art and include, for example, enzyme-linked immunosorbant assays (ELISAs). In embodiments, the level of the antibody against the conjugate can be measured before administration of the conjugate, e.g., 72, 48, 24, 12, 6, 4, or 2 hours before administration of the conjugate. In embodiments, the level of the antibody against the conjugate can be measured after administration of the conjugate, e.g., 0.5, 1, 2, 3, 4, or 5 hours after administration of the conjugate.

Another measure of effectiveness of a given dosage regimen is measuring is the Health Assessment Questionnaire Disability Index (HAQ-DI) in the subject. The HAQ-DI is designed to assess level of functional ability in 8 categories (Bruce and Fries, 2003). It consists of 20 questions representing a comprehensive set of functional activities (dressing and grooming, arising, eating, walking, hygiene, reach, grip, and activities). Responses are scored on a scale from 0 (no disability) to 3 (completely disabled). The HAQ also includes self-assessments of severity of pain and overall functional ability. In embodiments, the HAQ-DI of the subject can be reduced relative to a reference. In some embodiments, the reference is the subject at an earlier time point. In some embodiments, the earlier time point is prior to treatment. In some embodiments, the earlier time point is immediately prior to treatment. In some embodiments, the earlier time point is earlier in treatment. In some embodiments, the earlier time point is after a previous treatment. In embodiments, the HAQ-DI of the subject can be reduced by 1 point or more in 1, 2, 3 or more categories.

Another measure of effectiveness of a given dosage regimen is the level of C-reactive protein in the subject. C-reactive protein (CRP) is an annular (ring-shaped), pentameric protein found in blood plasma, whose levels rise in response to inflammation, including inflammatory conditions such as gout. Methods for measuring levels of proteins, e.g., CRP, are well known in the art. In embodiments, the level of C-reactive protein can be reduced relative to a reference. In some embodiments, the reference is a subject is an untreated subject. In some embodiments, the reference is a subject being treated with uricase. In some embodiments, the subject is receiving only the therapeutic dosage regimen, e.g., 8 mg of polyethylene glycol-uricase conjugate every two weeks.

In embodiments, the level of C-reactive protein can be reduced relative to the level of C-reactive protein in the subject at an earlier time point. In some embodiments, the earlier time point is prior to administration of the conjugate. In some embodiments, the earlier time point is immediately prior to administration of the conjugate. In some embodiments, the level of C-reactive protein can be reduced by 10%, 20%, 30%, or more, relative to the levels of C-reactive protein in the subject prior to administration of the conjugate.

Another measure of effectiveness of a given dosage regimen is the frequency of gout flares. In embodiments, the subject has a decreased frequency of gout flares. In embodiments, the subject has a decreased frequency of gout flares relative to a reference. In some embodiments, the reference is a subject is an untreated subject. In some embodiments, the reference is a subject being treated with uricase. In some embodiments, the subject is receiving only the therapeutic dosage regimen, e.g., 8 mg of polyethylene glycol-uricase conjugate every two weeks.

In embodiments, the subject shows a decreased in the frequency of gout flares relative to the frequency of gout flares in the subject relative to an earlier time point. In some embodiments, the earlier time point is an earlier time during treatment with the conjugate. In some embodiments, the earlier time point is prior to treatment with the conjugate. In some embodiments, the earlier time point is immediately prior to treatment with the conjugate. In embodiments, the subject shows a 5%, 10%, 20%, 30%, 40%, 50%, 60%, 70%, 80%, or 90% reduction in the frequency of gout flares relative to the frequency of gout flares in the subject prior to administration of the conjugate.

Pharmaceutical Compositions

Pharmaceutical formulations containing uricase molecules or uricase conjugates, e.g., pegylated uricase, can be prepared by conventional techniques, e.g., as described in Gennaro, AR (Ed.) (1990) Remington's Pharmaceutical Sciences, 18th Edition, Easton, Pa.: Mack Publishing Co. Suitable excipients for the preparation of injectable solutions include, for example, phosphate buffered saline, lactated Ringer's solution, water, polyols and glycerol. Pharmaceutical compositions for parenteral injection comprise pharmaceutically acceptable sterile aqueous or non-aqueous liquids, dispersions, suspensions, or emulsions as well as sterile powders for reconstitution into sterile injectable solutions or dispersions just prior to use. These formulations can contain additional components, such as, for example, preservatives, solubilizers, stabilizers, wetting agents, emulsifiers, buffers, antioxidants and diluents.

Uricase molecules or uricase conjugates can also be provided as controlled-release compositions for implantation into an individual to continually control elevated uric acid levels in body fluids. For example, polylactic acid, polyglycolic acid, regenerated collagen, poly-L-lysine, sodium alginate, gellan gum, chitosan, agarose, multilamellar liposomes and many other conventional depot formulations comprise bioerodible or biodegradable materials that can be formulated with biologically active compositions. These materials, when implanted or injected, gradually break down and release the active material to the surrounding tissue. For example, one method of encapsulating PEG-uricase comprises the method disclosed in U.S. Pat. No. 5,653,974, which is hereby incorporated by reference. In some embodiments, the conjugate is provided as a bioerodible, biodegradable or other depot formulation. In embodiments, infusion pumps and matrix entrapment systems are used for delivery of uricase molecules or uricase conjugates. Uricase molecules or uricase conjugates can also advantageously be enclosed in micelles or liposomes. Liposome encapsulation technology is well known in the art. See, e.g., Lasic, D, et al., (Eds.) (1995) Stealth Liposomes. Boca Raton, Fla.: CRC Press.

In some embodiments, the uricase conjugate is provided in a nanocarrier formulation. In some embodiments, the nanocarrier formulation comprise a lipid nanoparticle, a liposome, a polymeric nanoparticle, a dendrimer, or a surfactant based emulsion. In some embodiments, the polymeric nanoparticle comprises one or more of a polyether, polyester, polyamino acid, a polycarbonate, a polyacetal, a polyketal, a polysaccharide, or a combination thereof.

In some embodiments, the nanocarrier formulation comprises an immunosuppressant. In some embodiments, the immunosuppressant is an mTOR inhibitor, e.g., rapamycin or a rapamycin analogue.

The compositions disclosed herein can decrease the need for hemodialysis in patients at high risk of urate-induced renal failure, e.g., organ transplant recipients (see Venkataseshan, V S, et al., (1990) Nephron 56:317-321) and patients with some malignant diseases. In patients with large accumulations of crystalline urate (tophi), such pharmaceutical compositions can improve the quality of life more rapidly than currently available treatments.

In one embodiment, the composition is a solution of uricase. In another embodiment, the solution is sterile and suitable for injection. In one embodiment, such composition comprises uricase as a solution in phosphate buffered saline. In one embodiment, the composition is provided in a vial, optionally having a rubber injection stopper. In some embodiments, the composition comprises uricase in solution at a concentration of from 2 to 16 milligrams of uricase per milliliter of solution, from 4 to 12 milligrams per milliliter or from 6 to 10 milligrams per milliliter. In another embodiment, the composition comprises uricase at a concentration of 8 milligrams per milliliter. In embodiments, the mass of uricase is measured with respect to the protein mass.

The uricase can be administered in any appropriate way known to one of skill in the art, for example, intravenously, intramuscularly or subcutaneously. In some embodiments, when the administration is intravenous, 0.5 mg to 12 mg of uricase is administered. In further embodiments, when the administration is subcutaneous, 4 to 24 mg of uricase is administered. In one embodiment, the uricase is administered by intravenous infusion over a 30 to 240 minute period. In some embodiments, the infusion can be performed using 100 to 500 mL of saline solution. In some embodiments, the uricase is dissolved in 250 mL of saline solution for infusion. In some embodiments, saline solution comprises 0.45% or 0.9% sodium chloride. In some embodiments, the uricase administrations take place over a treatment period of 3 months, 6 months, 8 months or 12 months. In other embodiments, the treatment period is 12 weeks, 24 weeks, 36 weeks or 48 weeks. In one embodiment, the treatment period is for an extended period of time, e.g., 2 years or longer, for up to the life of subject being treated. In addition, multiple treatment periods can be utilized interspersed with times of no treatment, e.g., 6 months of treatment followed by 3 months without treatment, followed by 6 additional months of treatment, etc.

EXAMPLES

Example 1: Prophylaxis for Infusion Reactions to Pegloticase: An Analysis of Two Different Corticosteroid Pre-Infusion Regimens in US Community Rheumatology Practices The effects on duration of therapy and infusion reactions in pegloticase administration were studied using methylprednisolone compared to hydrocortisone for pre-infusion prophylaxis. It was hypothesized that use of methylprednisolone compared to hydrocortisone will lead to fewer infusion reactions and longer duration of therapy.

Design and Procedures

Retrospective chart abstraction was performed of patients treated with pegloticase between January 2013 and March 2016 and whose treatment course was complete. Charts of 92 qualifying patients were included in the data analysis. Nineteen geographically-dispersed US community-based rheumatology practices were represented in the analysis sample.

The variables collected included demographics, co-morbidities, duration of disease, sUA (prior to each infusion), pegloticase infusion dates and times, pre-infusion prophylaxis (including both steroids and antihistamines), and pre- and post-pegloticase gout therapies.

Data Analysis

The number of infusions was treated as the response variable. Age, sUA prior to the last infusion and type of pre-infusion corticosteroid (hydrocortisone or methylprednisolone) were treated as predictor variables. Analyses were carried out by multiple logistic regression with significance $p<0.01$ as the accepted significance level.

Results

Data from 96 patients were collected. Of these, the data from 92 patients met study inclusion criteria. The records of three patients were dropped from the analyses due to failure to meet study inclusion criteria, and one patient represented an extreme outlier. The demographic characteristics of the study sample (summarized in Table 1) were similar to the general population of patients with chronic refractory gout. The mean dose of hydrocortisone used conforms with the standard pre-infusion prophylaxis used during the randomized controlled clinical trials.

TABLE 1

| Patient Demographics and Characteristics. | | |
|---|---|---|
| Age (years) | Mean | 61.5 |
|  | Range | 38-77 |
| Sex, n (%) | Male | 74 (82%) |
|  | Female | 18 (18%) |
| Race, n (%) | Caucasian | 73 (79%) |
|  | Black | 11 (12%) |
|  | Asian | 6 (7%) |
|  | Other/NA | 1 (1%) |
| Disease Duration (years) | Mean | 13.5 |
|  | Range | 4-30 |

TABLE 1-continued

Patient Demographics and Characteristics.

| | | |
|---|---|---|
| Number of Infusions (n) | Median Per Patient | 7 |
| | Total Corticosteroid | 670 |
| Hydrocortisone | Number of patients (n) | 31 |
| | Mean Dose | 198 mg |
| | Modal Dose | 200 mg |
| | Range | 150-200 mg |
| Methylprednisolone | Number of patients (n) | 61 |
| | Mean Dose | 77 mg |
| | Modal Dose | 50 mg |
| | Range | 40-120 mg |

Regression Analysis

Multiple logistic regression analysis was conducted using type of corticosteroid prophylaxis, patient age (<65 vs ≥65) and terminal sUA (sUA prior to final infusion) as predictor variables with duration of therapy (number of infusions) as the dependent variable. Use of methylprednisolone and terminal sUA were highly significant (p<0.001) predictors of therapy duration. Use of methylprednisolone entered the model first as a predictor of therapy duration. In a linear model containing both type of corticosteroid prophylaxis and pre-infusion sUA, pre-infusion sUA was a significant predictor of infusion reaction (p<0.001). There was no significant difference between sUA levels prior to initiation of pegloticase therapy for the two groups. In a linear model containing just type of corticosteroid, type of corticosteroid prophylaxis was a significant (p<0.001) predictor of infusion reaction.

Number of Infusions

Mean number of pegloticase infusions for patients receiving methylprednisolone as prophylaxis was significantly (p<0.001) higher than for patients receiving hydrocortisone as prophylaxis (FIG. 1). The range of pegloticase infusions was 3-16 for patients receiving hydrocortisone and 3-13 for patients receiving methylprednisolone.

Discontinuation of Therapy

Figure 2:
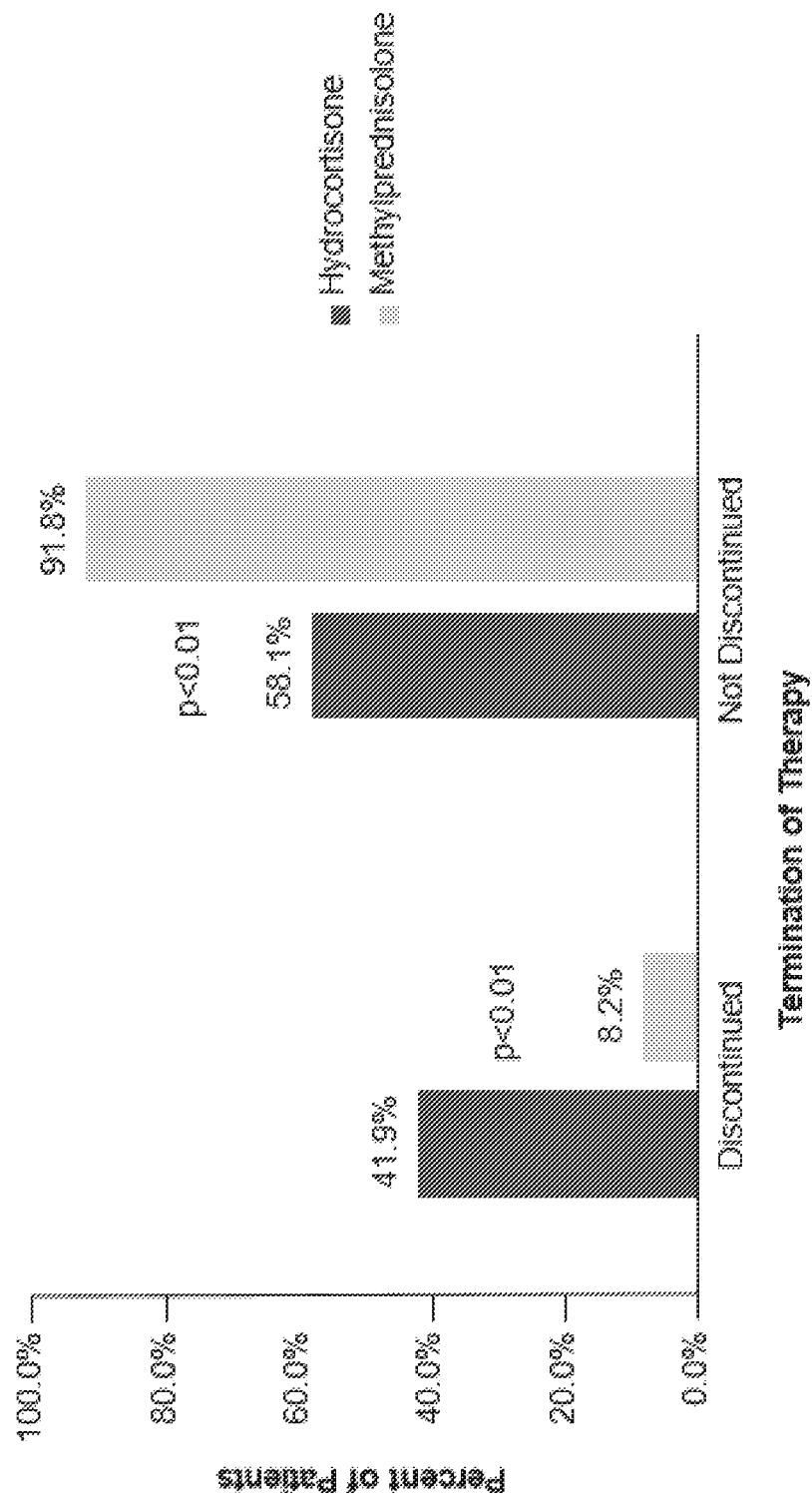
FIG. 2—Shows percentages of patients discontinuing therapy.

Discontinuations of therapy prior to planned treatment end occurred for a number of reasons, including patient choice and infusion reaction. The most frequent reason for premature treatment termination was the presence of an infusion reaction during an infusion. All infusion reactions were characterized as mild or moderate with symptoms similar to the pegloticase pivotal trials. When infusion reactions occurred, infusions were either managed by stopping the infusions or restarting at a slower rate. A significantly lower proportion of patients receiving methylprednisolone as prophylaxis terminated therapy early (8.2%) vs patients receiving hydrocortisone as prophylaxis (41.9%, p<0.01) (FIG. 2).

Number of Infusions by Termination of Therapy

Figure 3:
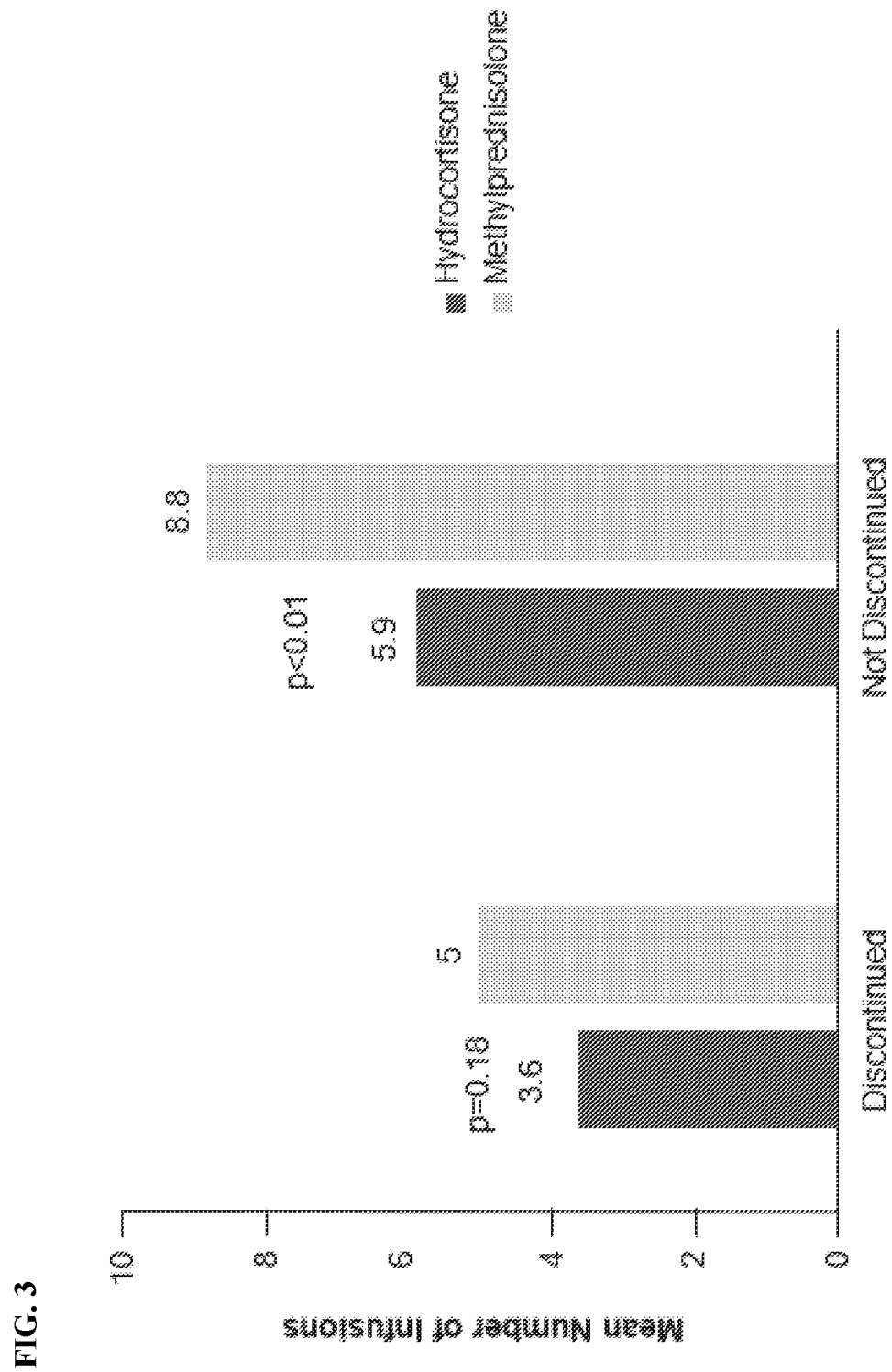
FIG. 3—Shows the mean number of infusions by prophylaxis and therapy termination.

The mean number of infusions was greater for both types of prophylaxis if therapy was continued to the planned duration rather than being terminated by patient choice or infusion reaction (p<0.01). However, for both outcomes, the mean number of infusions was greater for patients receiving methylprednisolone for prophylaxis. The difference in the mean number of infusions for therapy discontinuation was not significant (p=0.18), most likely due to the small n for patients discontinuing on methylprednisolone. For therapy not discontinued, the difference in the mean number of infusions was significant (p<0.01) (FIG. 3).

Conclusions

Patients in the study received a significantly greater number of infusions when methylprednisolone was used as the corticosteroid for pre-infusion prophylaxis. These results indicate that methylprednisolone for pre-infusion prophylaxis may allow for longer pegloticase therapy duration compared to hydrocortisone. This modality imposes a significantly higher glucocorticoid load that may suppress symptoms of infusion reaction and/or inhibit the formation of pegloticase drug antibodies. Methylprednisolone compared to hydrocortisone as a pre-infusion prophylaxis for pegloticase needs further study to determine both efficacy and long-term safety.

EQUIVALENTS

Those skilled in the art will recognize, or be able to ascertain using no more than routine experimentation, many equivalents to the specific embodiments of the disclosure described herein.

What is claimed is:

1. A method of reducing uric acid levels in a subject in need thereof, comprising:
repeatedly administering to the subject both pegloticase and methylprednisolone during a treatment period, wherein the methylprednisolone is administered as a pre-dose prophylaxis prior to each administration of pegloticase;
wherein 8 mg of pegloticase and 40 to 120 mg of methylprednisolone are administered once every 14 days during the treatment period;
wherein pegloticase is administered for at least 12 doses during the treatment period;
wherein no serum uric acid lowering therapeutic besides pegloticase is administered during the course of administering pegloticase; and
wherein a second non-uricase urate-lowering therapy is administered after discontinuing the administration of pegloticase at the end of the treatment period.

2. The method of claim 1, wherein the second non-uricase urate-lowering therapy is an oral urate-lowering agent (ULA) selected from a xanthine oxidase inhibitor, allopurinol, and febuxostat.

3. The method of claim 1, wherein the serum uric acid levels are reduced to ≤6 mg/dL as a result of treatment with pegloticase.

4. The method of claim 1, wherein the subject was previously treated with one or more of an oral urate-lowering therapy, a xanthine oxidase inhibitor, allopurinol, and febuxostat; or wherein the subject has a body weight ≥ about 80 kg, 90 kg, 100 kg, 110 kg, or 120 kg; or wherein the subject is ≥55, 60, 65, or 70 years old.

5. The method of claim 1,
wherein the method includes ameliorating or reducing at least one symptom or measurable physiological parameter of hyperuricemia or gout in the subject;
wherein the method includes reducing the subject's uric acid levels, reducing incidence of gout flares, reducing inflammation of the joints, reducing formation of gout tophi, reducing gout arthritis, and/or reducing uric acid nephropathy;
wherein the method includes reducing the subject's C-reactive protein levels;
wherein the method includes reducing the subject's Health Assessment Questionnaire Disability Index (HAQ-DI);
wherein the method includes ameliorating or reducing gout, chronic gout, refractory gout, or tophaceous gout;
wherein the method includes delaying or preventing an infusion reaction in the subject;
wherein the method includes decreasing immune clearance of the uricase molecule or reducing or preventing an antibody response to the uricase molecule in the subject; or
wherein the method increases immunosuppression or antigen-specific immunosuppression.

6. The method of claim 1,
wherein pegloticase and methylprednisolone are administered by intravenous infusion.

7. The method of claim 1, wherein the methylprednisolone is administered 10 days, 9 days, 8 days, 7 days, 6 days, 5 days, 4 days, 4 days, 3 days, 2 days, 1 day, 18 hours, 12 hours, 6 hours, 4 hours, 2 hours, or 1 hour prior to the administration of the uricase molecule.

* * * * *